(12) United States Patent  
Ravasz et al.

(10) Patent No.: US 12,182,391 B2  
(45) Date of Patent: Dec. 31, 2024

(54) DEVICES, METHODS, AND GRAPHICAL USER INTERFACES FOR INTERACTING WITH THREE-DIMENSIONAL ENVIRONMENTS

(71) Applicant: Apple Inc., Cupertino, CA (US)

(72) Inventors: Jonathan Ravasz, Sunnyvale, CA (US); Israel Pastrana Vicente, Spring, TX (US); Stephen O. Lemay, Palo Alto, CA (US); Kristi E. S. Bauerly, Los Altos, CA (US); Zoey C. Taylor, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/370,324

(22) Filed: Sep. 19, 2023

(65) Prior Publication Data

US 2024/0103712 A1 Mar. 28, 2024

Related U.S. Application Data

(60) Provisional application No. 63/469,797, filed on May 30, 2023, provisional application No. 63/409,622, filed on Sep. 23, 2022.

(51) Int. Cl.
*G06F 3/0488* (2022.01)
*G06F 3/01* (2006.01)
(Continued)

(52) U.S. Cl.
CPC ............ *G06F 3/0488* (2013.01); *G06F 3/013* (2013.01); *G06F 3/016* (2013.01);
(Continued)

(58) Field of Classification Search
CPC ........ G06F 3/04812; G06F 3/01; G06F 3/033; G06F 3/0488; G06F 3/013; G06F 3/016;
(Continued)

(56) References Cited

U.S. PATENT DOCUMENTS 6,211,879 B1 4/2001 Soohoo  
2019/0346988 A1 11/2019 Sullivan et al.  
(Continued)

OTHER PUBLICATIONS

International Search Report and Written Opinion, dated Jan. 4, 2024, received in International Patent Application No. PCT/US2023/033286, 32 pages.

*Primary Examiner* — Michael A Faragalla  
(74) *Attorney, Agent, or Firm* — Morgan, Lewis & Bockius LLP

(57) ABSTRACT

A computer system detects a gaze input directed to a region in an environment and, while detecting the gaze input, detects a touch input. In response, the computer system displays a focus indicator at a location corresponding to the region. The computer system detects a continuation of the touch input that includes movement of the touch input along an input surface while being maintained on the input surface. In response, the computer system moves the focus indicator in accordance with the movement of the touch input: within a user interface of an application, if the movement corresponds to a request to move the focus indicator within the user interface; and within the user interface without moving the focus indicator outside of the boundary of the user interface, if the movement corresponds to a request to move the focus indicator outside of a boundary of the user interface.

54 Claims, 45 Drawing Sheets

(51) Int. Cl.
*G06F 3/04815* (2022.01)
*G06T 17/00* (2006.01)
*G06F 3/04842* (2022.01)

(52) U.S. Cl.
CPC .......... *G06F 3/04815* (2013.01); *G06T 17/00* (2013.01); *G06F 3/04842* (2013.01)

(58) Field of Classification Search
CPC .. G06F 3/04815; G06F 3/04842; G06F 3/017; G06T 17/00; G06T 19/00; G06T 19/20
See application file for complete search history.

(56) References Cited

U.S. PATENT DOCUMENTS

2022/0253194 A1\* 8/2022 Berliner ................. G06V 40/25
2024/0103680 A1 3/2024 Ravasz et al.

\* cited by examiner

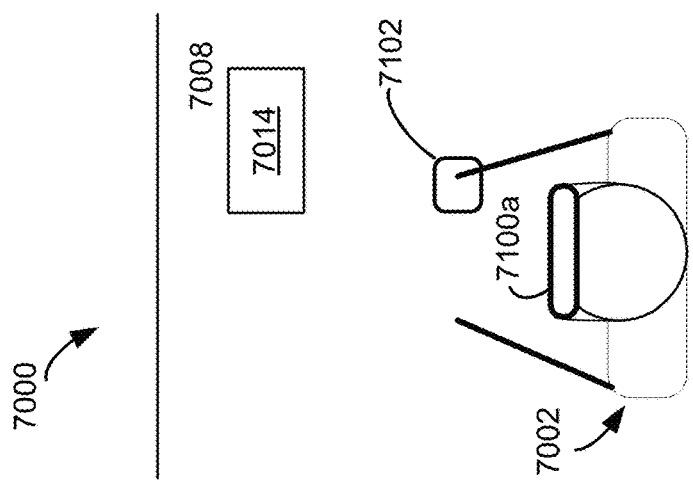
Figure 7C2
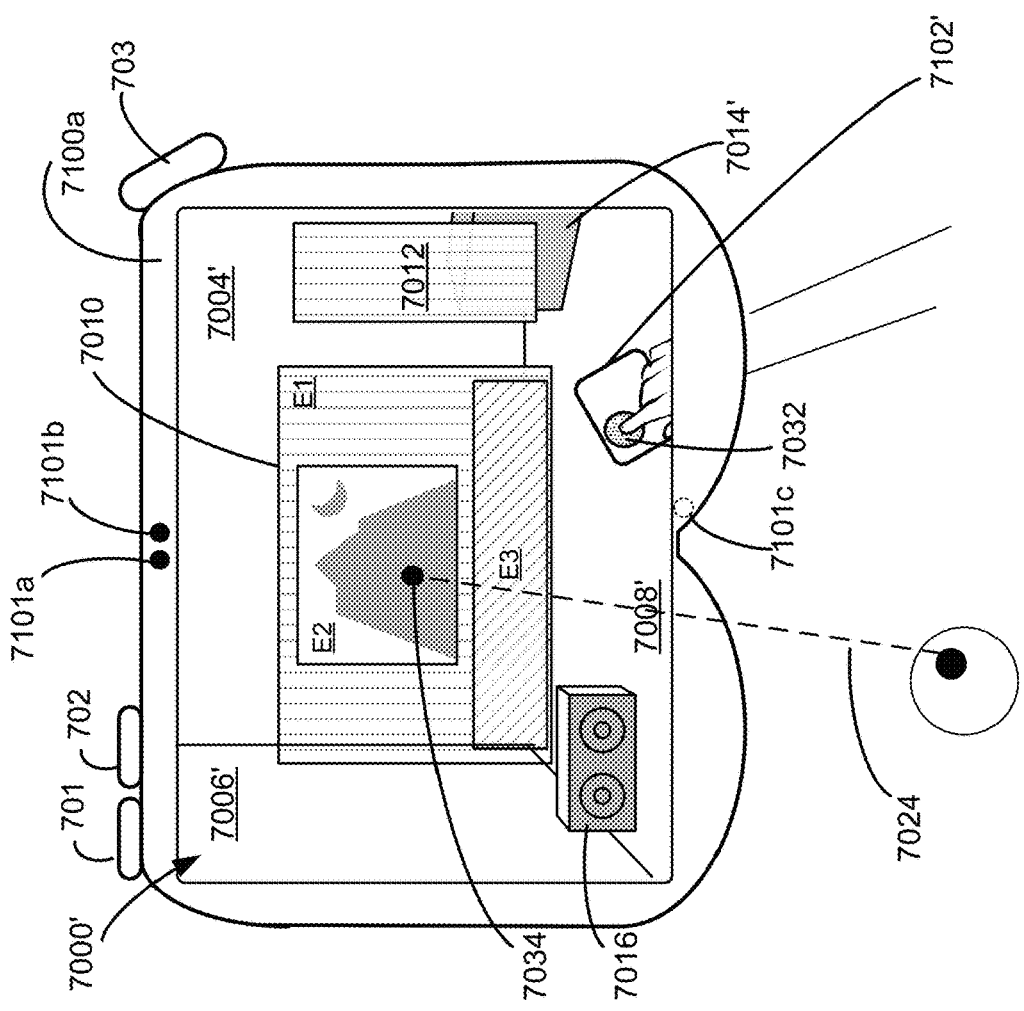
Figure 7C1

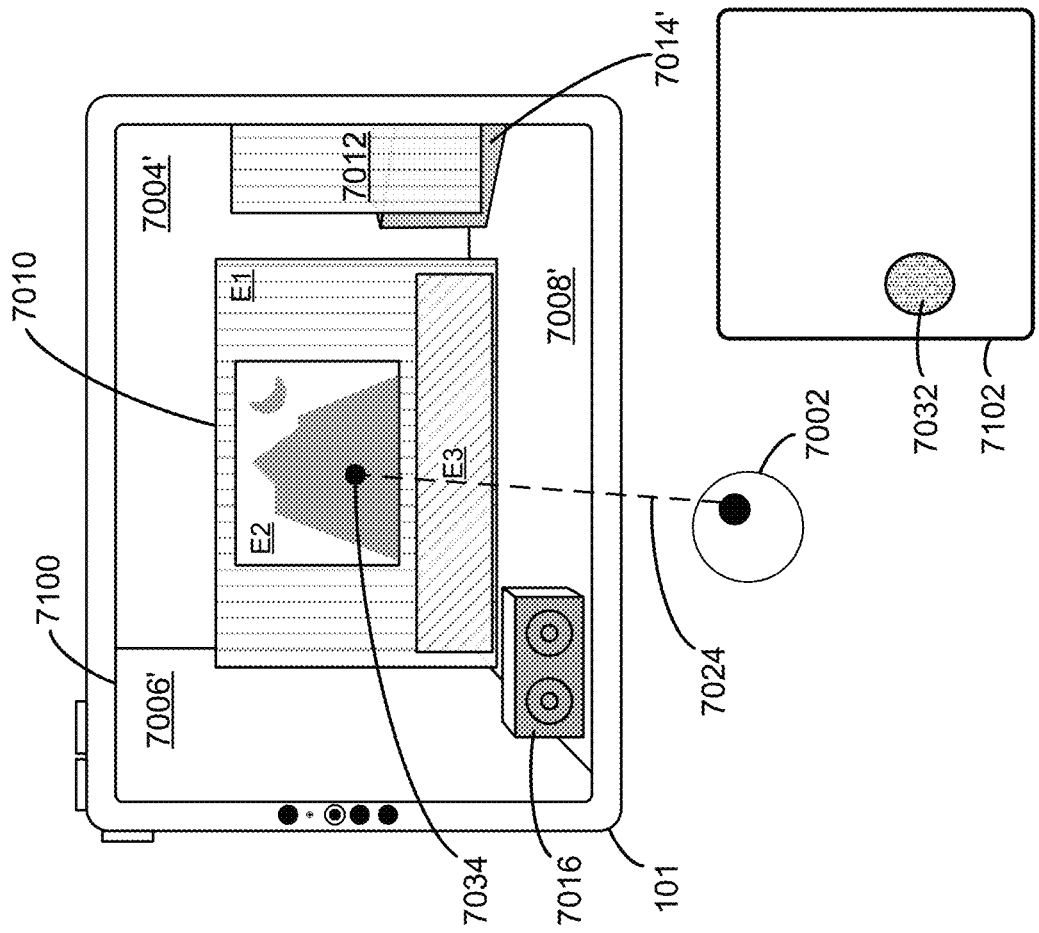
Figure 7C3

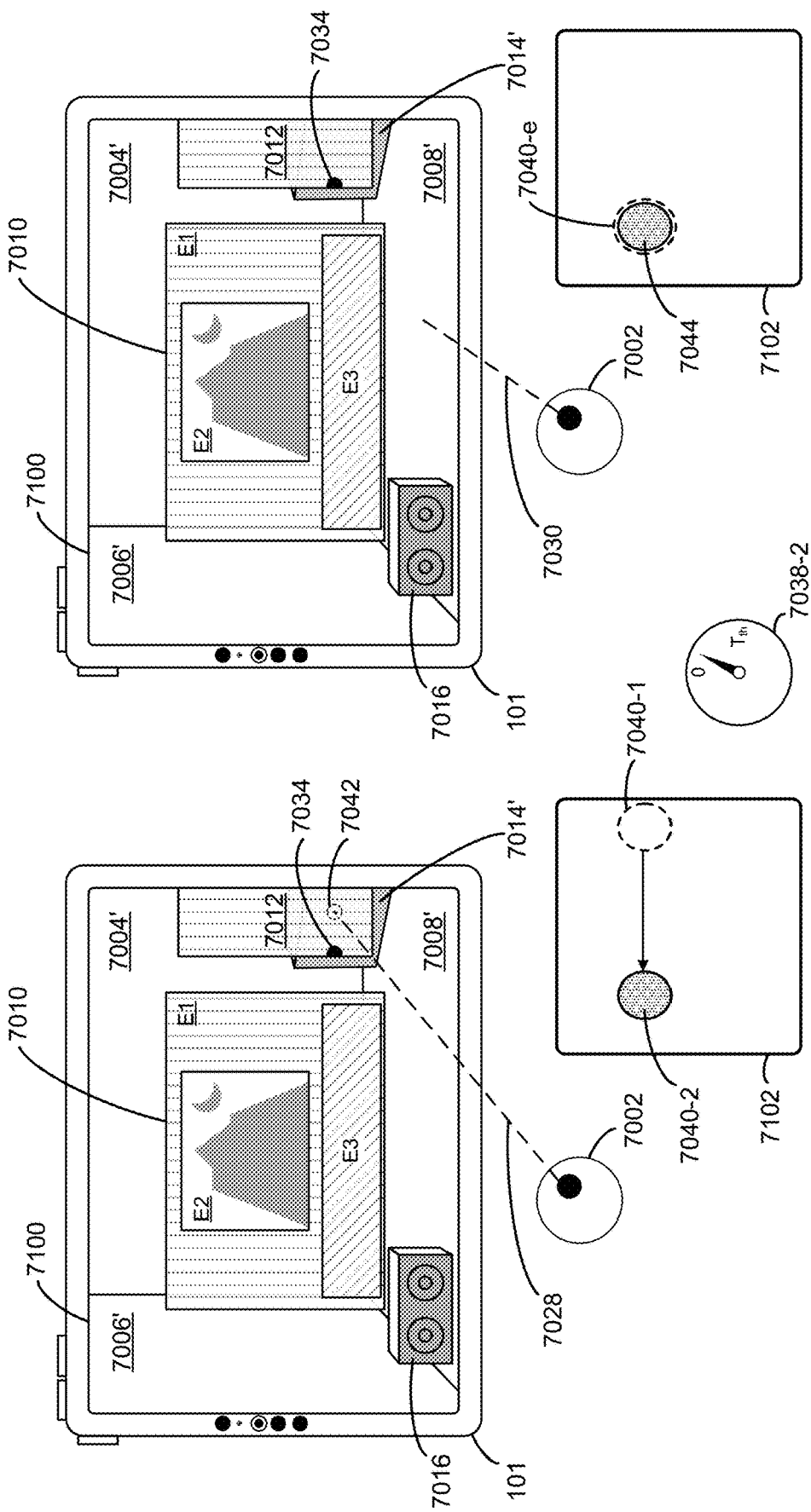

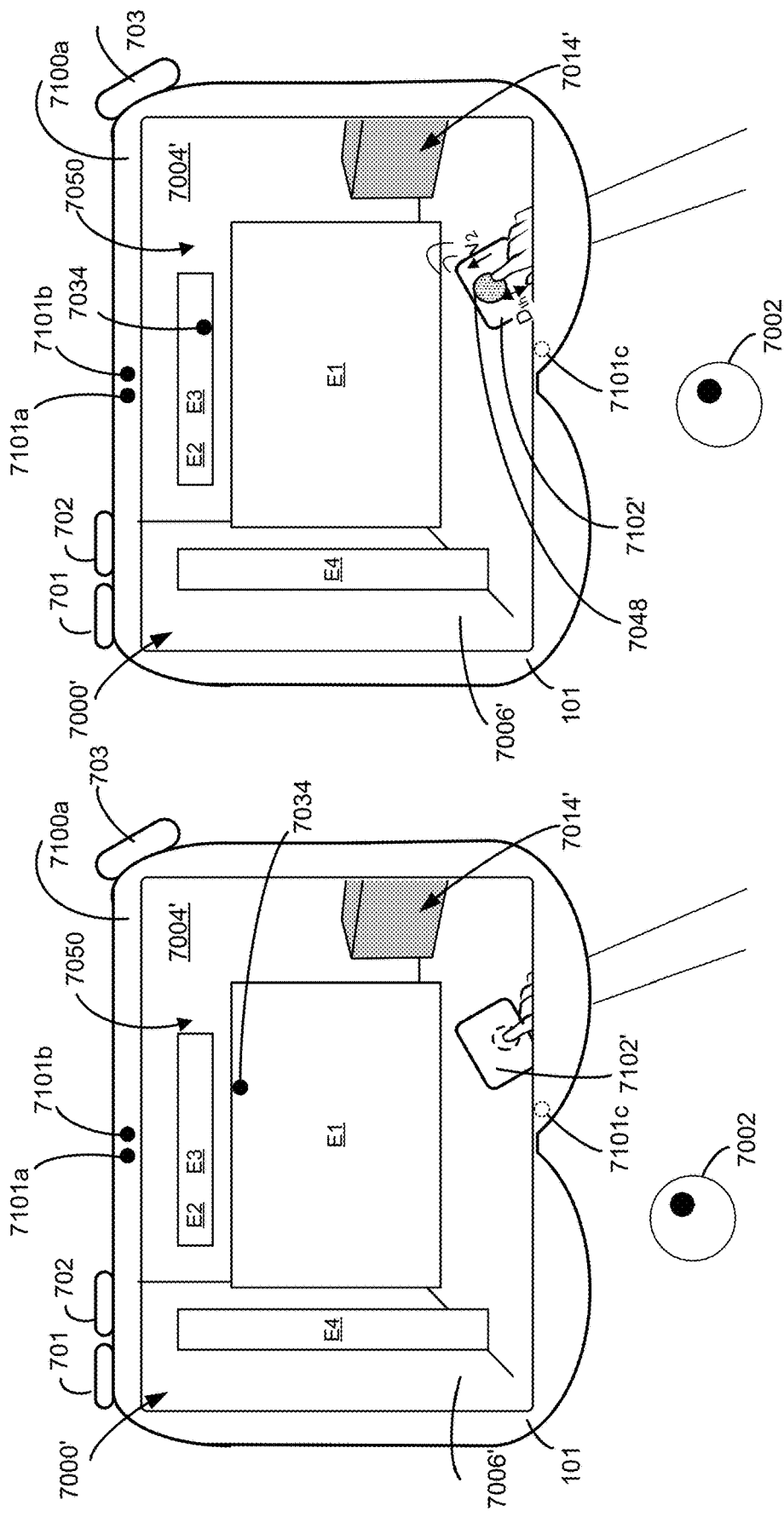

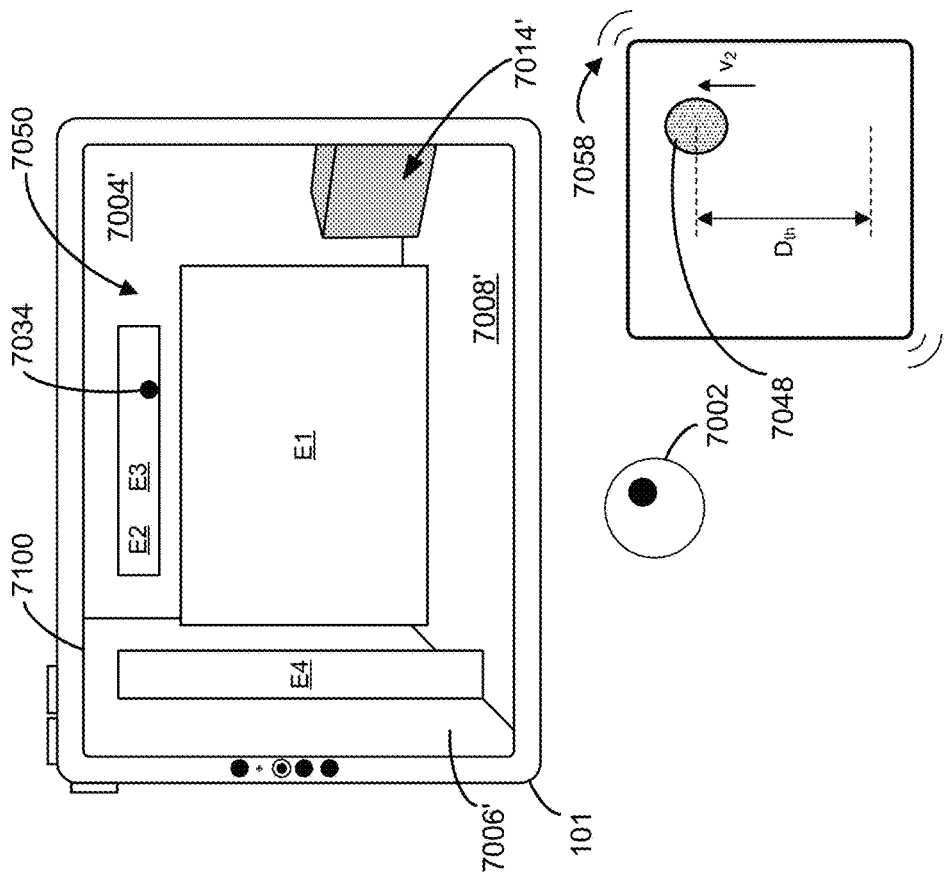
Figure 8D2
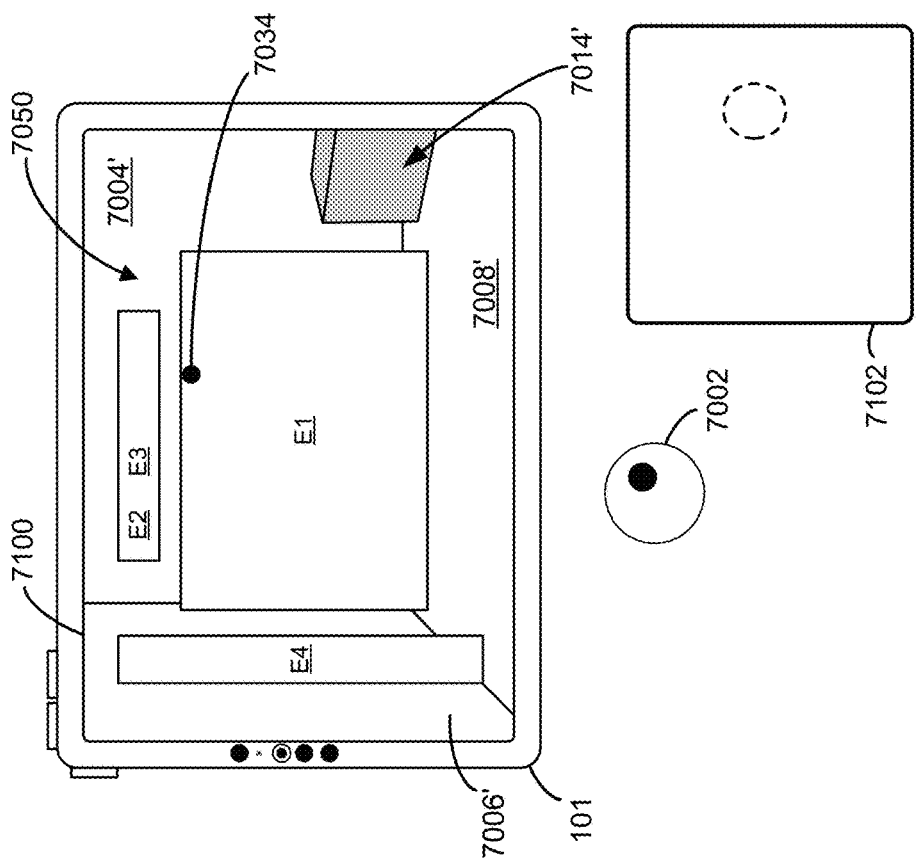
Figure 8C2

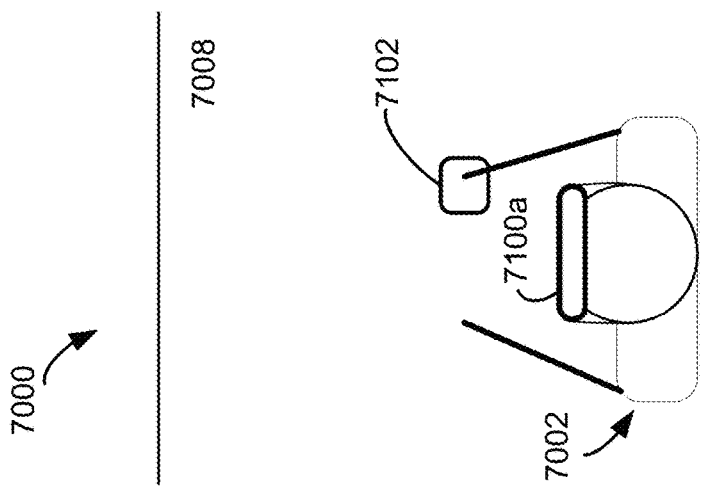
Figure 9B2
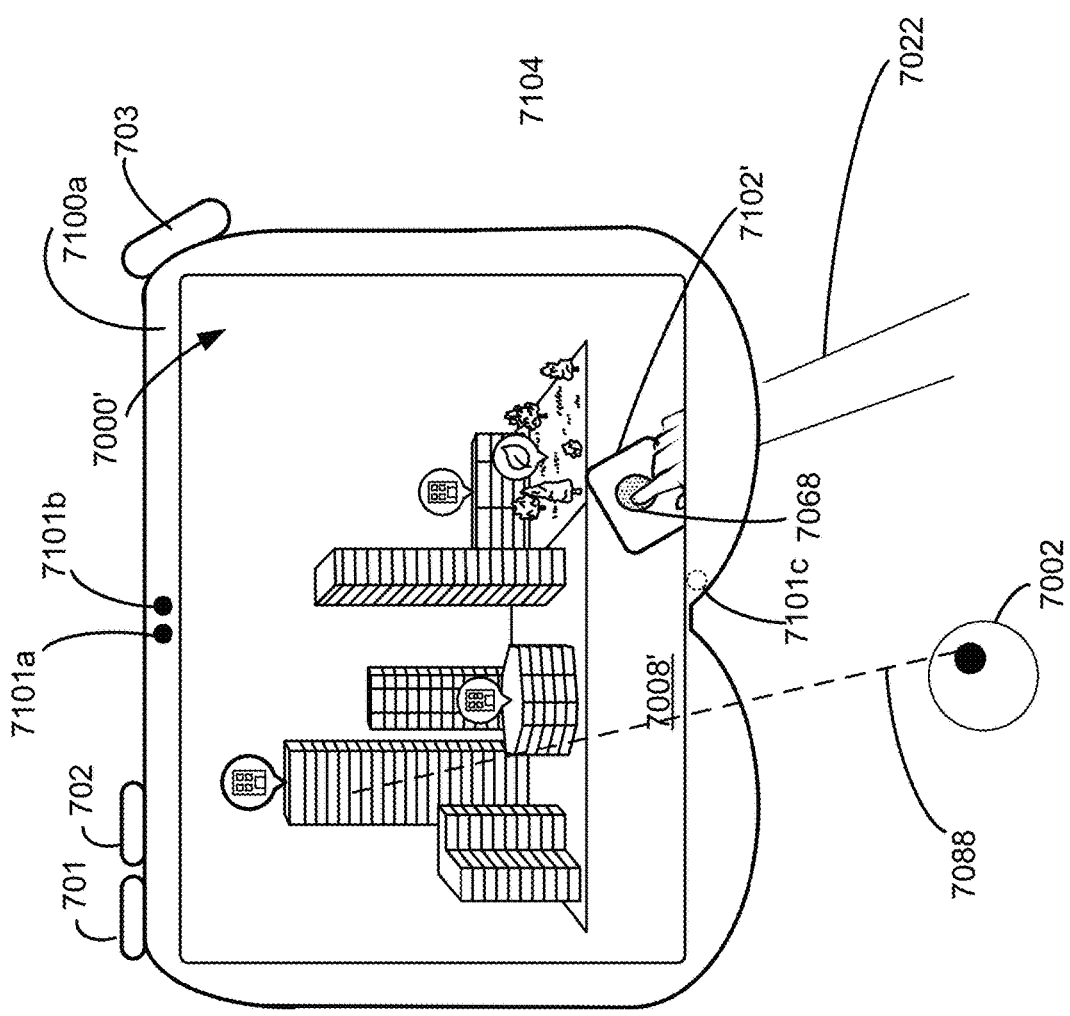
Figure 9B1

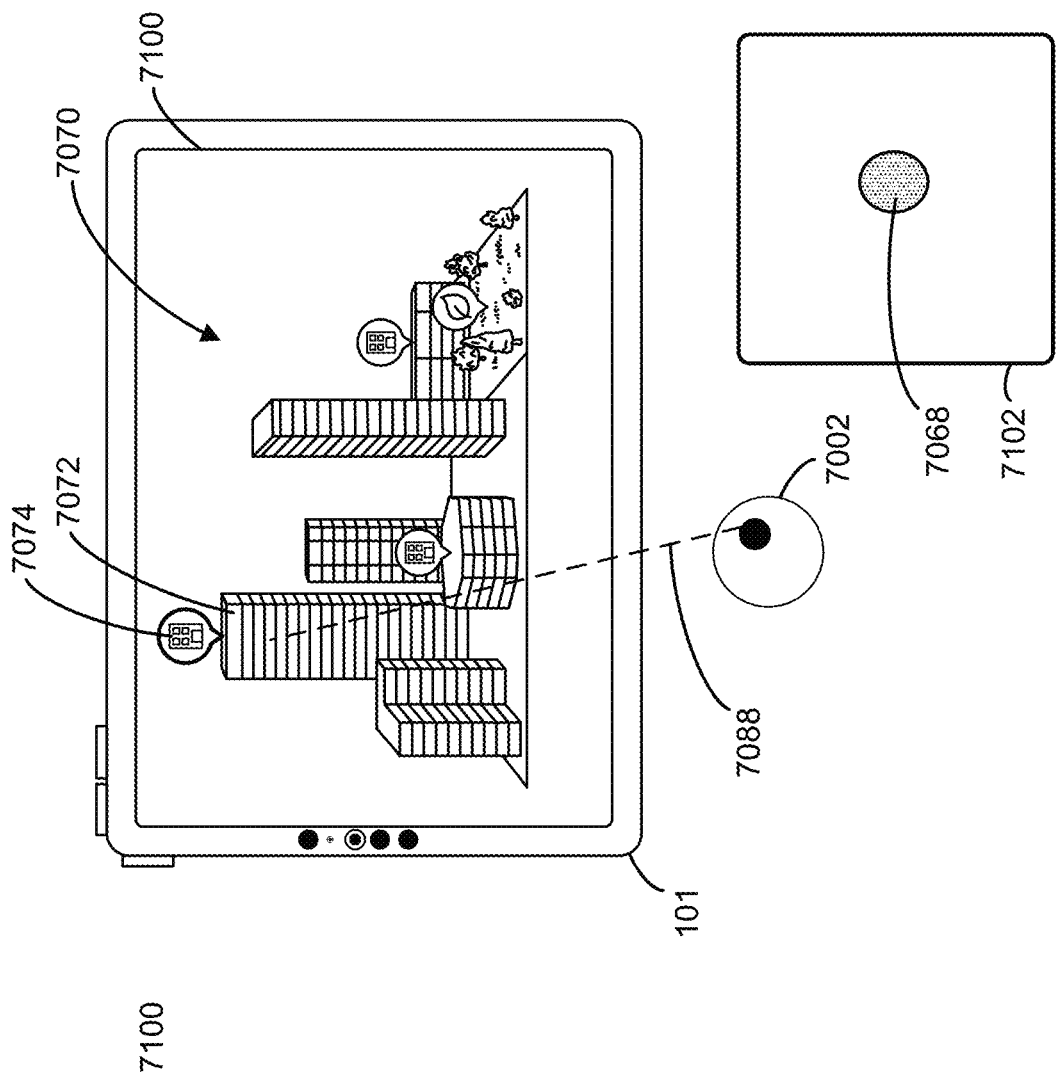
Figure 9B3

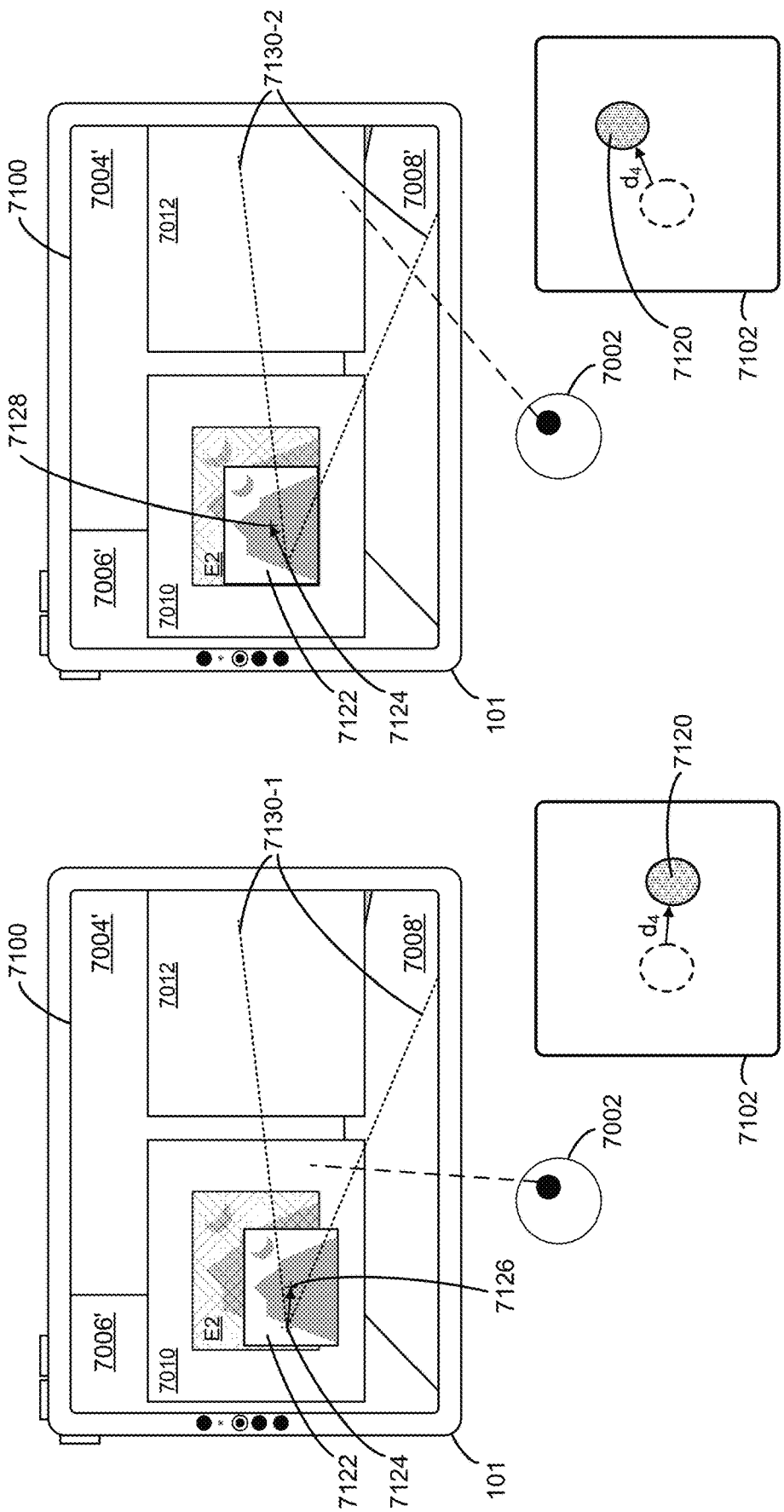

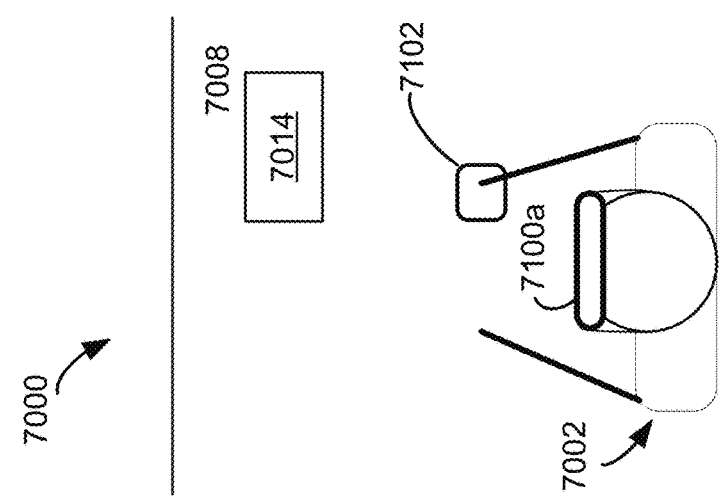
Figure 10E2
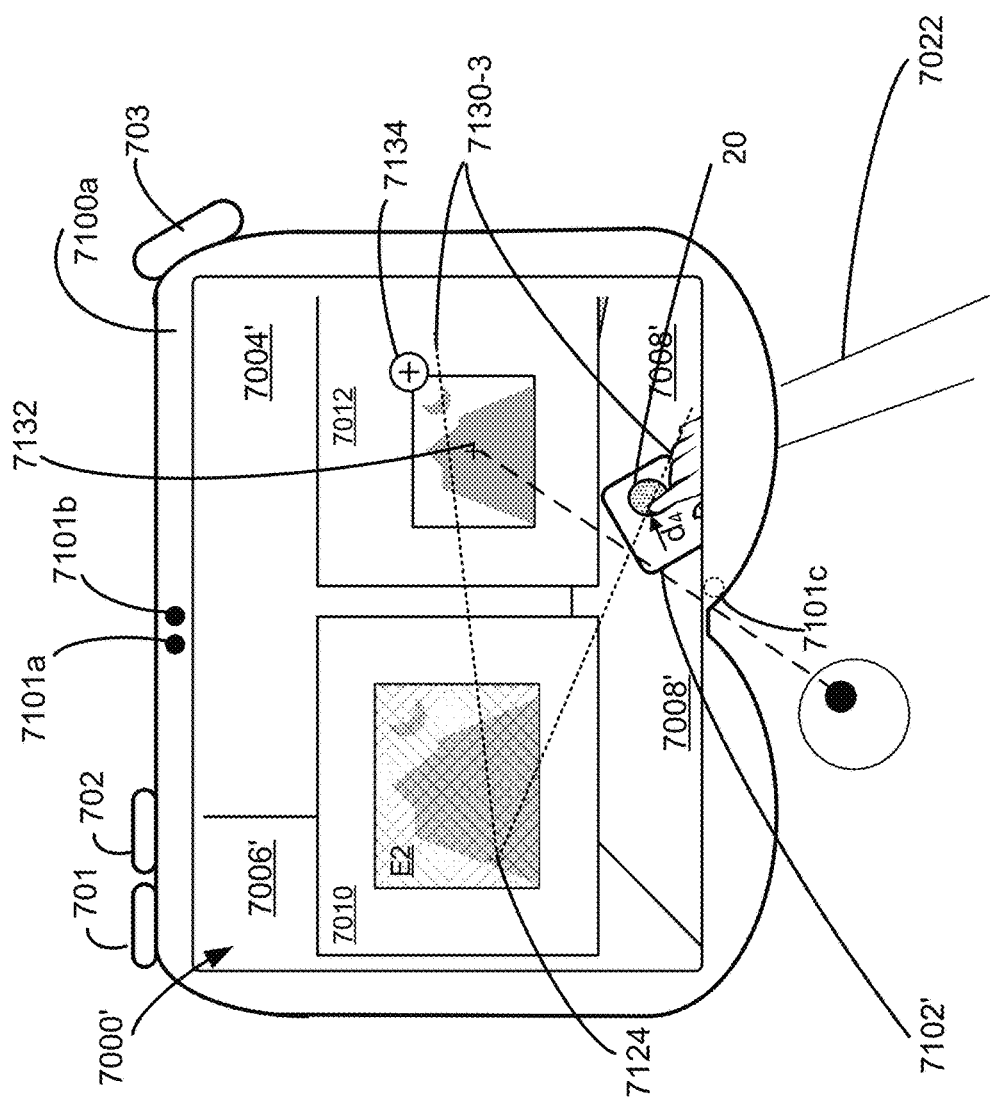
Figure 10E1

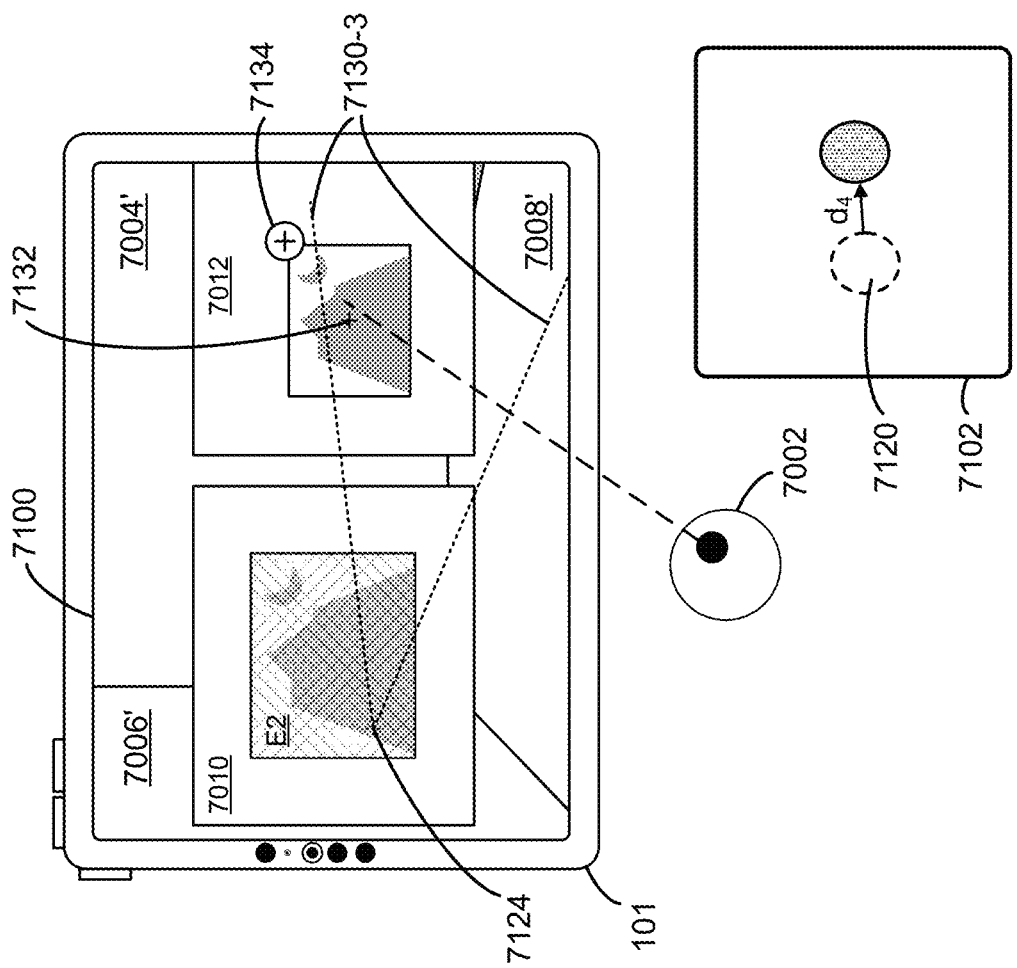
Figure 10E3

1114 In response to detecting the movement of the first touch input along the touch-sensitive surface during the continuation of the first touch input, move the focus indicator in accordance with a magnitude of the movement of the first touch input, including:

1116 In accordance with a determination that the magnitude of the movement of the first touch input during the continuation of the first touch input corresponds to a request to move the focus indicator within a user interface of a first application, moving the focus indicator within the user interface of the first application in accordance with the movement of the first touch input

1118 In accordance with a determination that the magnitude of the movement of the first touch input during the continuation of the first touch input corresponds to a request to move the focus indicator outside of a boundary of the user interface of the first application, moving the focus indicator within the user interface of the first application in accordance with the movement of the first touch input without moving the focus indicator outside of the boundary of the user interface for the first application

Figure 11B

DEVICES, METHODS, AND GRAPHICAL USER INTERFACES FOR INTERACTING WITH THREE-DIMENSIONAL ENVIRONMENTS

RELATED APPLICATIONS

This application claims priority to U.S. Provisional Patent Application No. 63/469,797, filed May 30, 2023, and U.S. Provisional Patent Application No. 63/409,622, filed Sep. 23, 2022, each of which is hereby incorporated by reference in its entirety.

TECHNICAL FIELD

The present disclosure relates generally to computer systems that are in communication with a display generation component and one or more input devices that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that allow only a limited number of ways of providing inputs, systems that require extensive input to move focus and drag objects around in an environment, and systems in which moving focus around an environment is difficult to control, particularly systems in which the available ways of moving focus within an interaction target are inconsistent with the object type of the interaction target are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for enabling the use of additional input mechanisms to move focus and dragging objects around in an environment with increased speed and precision, to make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for enabling the use of additional input mechanisms to move focus and dragging objects around in an environment with increased speed and precision. Such methods and interfaces may complement or replace conventional methods for using such input mechanisms to move focus and drag objects around in an environment. Such methods and interfaces reduce the number, extent, and/or the nature of the inputs from a user and produce a more efficient human-machine interface. For battery-operated computing devices, such methods and interfaces conserve power and increase the time between battery charges.

In accordance with some embodiments, a method is performed at a computer system that is in communication with a display generation component and with one or more input devices that include a touch-sensitive surface. The method includes, while a view of an environment is visible via the display generation component, detecting, via the one or more input devices, a gaze input directed to the environment. The method includes, while detecting the gaze input, detecting, via the touch-sensitive surface, a first touch input; and, in response to detecting the first touch input: in accordance with a determination that a first portion of the first touch input is detected while the gaze input is directed to a first region in the environment, displaying a focus indicator at a location corresponding to the first region in the environment; and in accordance with a determination that the first portion of the first touch input is detected while the gaze input is directed to a second region in the environment, displaying the focus indicator at a location corresponding to the second region in the environment. The method includes detecting a continuation of the first touch input that includes movement of the first touch input along the touch-sensitive surface while the first touch input is maintained on the touch-sensitive surface. The method includes, in response to detecting the movement of the first touch input along the touch-sensitive surface during the continuation of the first touch input, moving the focus indicator in accordance with a magnitude of the movement of the first touch input, including: in accordance with a determination that the magnitude of the movement of the first touch input during the continuation of the first touch input corresponds to a request to move the focus indicator within a user interface of a first application, moving the focus indicator within the user interface of the first application in accordance with the movement of the first touch input; and in accordance with a determination that the magnitude of the movement of the first touch input during the continuation of the first touch input corresponds to a request to move the focus indicator outside of a boundary of the user interface of the first application, moving the focus indicator within the user interface of the first application in accordance with the movement of the first touch input without moving the focus indicator outside of the boundary of the user interface for the first application.

In accordance with some embodiments, a method is performed at a computer system that is in communication with a display generation component and one or more input devices. The method includes, while a view of an environment is visible via the display generation component: displaying a user interface that includes a first user interface region and a second user interface region; and displaying a focus indicator within the first user interface region. The first user interface region and the second user interface region are separated by a third region. The method includes detecting, via the one or more input devices, an input to move the focus indicator relative to the user interface. The input is associated with movement toward the second user interface region. The method includes, in response to detecting the input that is associated with the movement toward the second user interface region, in accordance with a determination that the input meets a first set of one or more criteria based on the movement associated with the input, moving the focus indicator from the first user interface region to the second user interface region in accordance with the movement associated with the input, including transitioning directly from displaying the focus indicator at a position corresponding to a boundary of the first user interface region to displaying the focus indicator at a position corresponding to the second user interface region without displaying the focus indicator in the third region between the first user interface region and the second user interface region. The method includes, in response to detecting the input that is associated with the movement toward the second user interface region, in accordance with a determination that the input does not meet the first set of one or more criteria based on the movement associated with the input, changing an appearance of the focus indicator in accordance with the movement associated with the input while continuing to display at least a portion of the focus indicator within the first user interface region.

In accordance with some embodiments, a method is performed at a computer system that is in communication with a display generation component and one or more input devices. The method includes, while displaying a user interface, detecting an input via the one or more input devices, including detecting a hand of a user. The input is directed to a first location in the user interface. The method includes, in response to detecting the input, displaying a focus indicator corresponding to a user interface object at the first location in the user interface. The method includes, while displaying the focus indicator corresponding to the user interface object, detecting a continuation of the input that includes movement of the hand of the user and movement of a gaze of the user. The method includes, in response to detecting the continuation of the input, moving the focus indicator in accordance with the continuation of the input, including: in accordance with a determination that the user interface object is a first type of user interface object, moving the focus indicator to a second location in the user interface that is selected based on the movement of the gaze of the user, wherein the second location in the user interface is different from the first location in the user interface; and, in accordance with a determination that the user interface object is a second type of user interface object, different from the first type of user interface object, moving the focus indicator to a third location in the user interface that is selected based on the movement of the hand of the user, wherein the third location in the user interface is different from the first location in the user interface and the second location in the user interface.

In accordance with some embodiments, a method is performed at a computer system that is in communication with a display generation component and one or more input devices. The method includes, while a view of an environment is visible via the display generation component, detecting, via the one or more input devices, a first input corresponding to a request to initiate a drag operation with respect to content of an application. The content is displayed in a first region of the environment. The method includes, in response to detecting the first input, initiating the drag operation. In accordance with a determination that the first input is detected while first content of the application is selected, the drag operation is initiated with respect to the first content; and, in accordance with a determination that the first input is detected while second content of the application is selected, the drag operation is initiated with respect to the second content. The method includes, while continuing to detect the first input, detecting, via the one or more input devices, movement of a gaze input to a respective location in a second region of the environment, different from the first region, and detecting movement of the first input. The method includes, in response to detecting the movement of the first input: in accordance with a determination that the movement of the first input meets a first set of one or more criteria, wherein the first set of one or more criteria include a requirement that the movement of the first input is in a direction that is within a directional threshold of the direction of the respective location in the second region of the environment in order for the first set of one or more criteria to be met, moving the content from the first region of the environment to the second region of the environment; and, in accordance with a determination that the movement of the first input does not meet the first set of one or more criteria, moving the content within the first region of the environment.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 7A-7K illustrate example techniques for gaze-assisted display and movement of a focus indicator in an environment, in accordance with some embodiments.

FIGS. 8A-8H illustrate example techniques for moving focus indicators across gaps between user interface regions in an environment, in accordance with some embodiments.

FIGS. 9A-9I illustrate example techniques for interacting with objects in a user interface using gaze and/or hand input differently for different types of objects, in accordance with some embodiments.

FIGS. 10A-10E3 illustrate example techniques for gaze-assisted dragging and dropping of content across different regions in an environment, in accordance with some embodiments.

FIGS. 11A-11B are flow diagrams of methods of gaze-assisted display and movement of a focus indicator in an environment, in accordance with various embodiments.

DESCRIPTION OF EMBODIMENTS

Figure 1A:
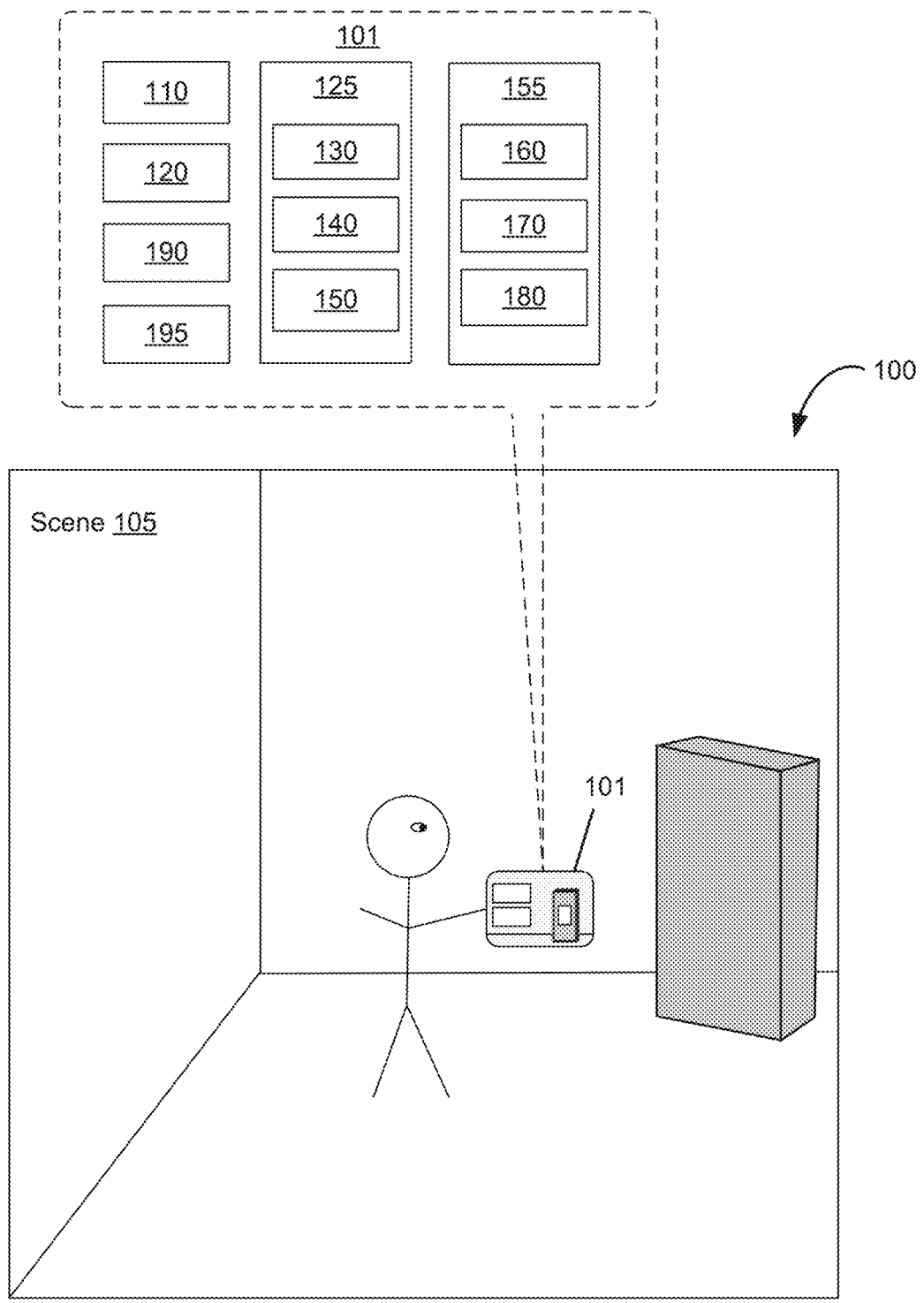
FIG. 1A is a block diagram illustrating an operating environment of a computer system for providing extended reality (XR) experiences in accordance with some embodiments.

The present disclosure relates to user interfaces for providing an extended reality (XR) experience to a user, in accordance with some embodiments.

The systems, methods, and GUIs described herein improve user interface interactions with virtual/augmented reality environments in multiple ways.

In some embodiments, while a user is gazing at a location in an environment (e.g., a two-dimensional or three-dimensional virtual or mixed reality environment), a computer system displays a focus indicator at the location to which the user's gaze is directed when an input is detected on a touch-sensitive surface. The computer system moves the focus indicator in the environment in accordance with movement of the input detected along the touch-sensitive surface, although while the input continues to be detected on the touch-sensitive surface, the computer system constrains the focus indicator to moving within the same user interface in which the focus indicator was initially displayed. The focus indicator can be moved to another user interface in the environment if the computer system detects an end of the input on the touch-sensitive surface and detects a subsequent input on the touch-sensitive surface while the user is gazing at a location in the other user interface. Moving a focus indicator, initially placed based on gaze location, using movement of a touch input, and constraining the movement of the focus indicator within a current window in which the focus indicator is displayed while the touch input is ongoing allows for improved control over the movement of the focus indicator than when gaze movement is used, while automatically limiting the movement of the focus indicator to a relevant context. Moving the focus indicator to another user interface that the user is gazing at if the user ends the current touch input and provides a subsequent touch input reduces an amount of time needed to move the focus indicator across larger distances in the environment.

In some embodiments, a user interface has multiple regions, including a first region and a second region that are separated by a gap. While displaying a focus indicator in the first region, the computer system moves the focus indicator across the gap to the second region, without displaying the focus indicator in the gap, in response to an input that is associated with movement of the focus indicator toward the second region and that meets respective criteria. If the input does not meet the respective criteria, the focus indicator stays within the first region with a changed appearance. Moving a focus indicator directly across a gap between different regions in a user interface allows the different regions of the user interface to be delineated more clearly while still allowing interaction with locations in each of the different regions while limiting interaction with locations outside of a relevant context (e.g., outside of the user interface, such as locations within the gap).

In some embodiments, a computer system moves a focus indicator differently in response to inputs for different types of user interface objects. For some types of user interface objects, the focus indicator is moved between different locations (e.g., interaction points) in the objects in response to movement of a user's hand, such as movement of a touch input on a touch-sensitive surface. For other types of user interface objects, the focus indicator is moved between different locations (e.g., interaction points) in the objects in response to movement of a user's gaze without requiring movement of the user's hand, optionally conditional on the user's hand being engaged in interaction such as by providing a touch input (e.g., contact) on a touch-sensitive surface. Enabling different input mechanisms for moving a focus indicator based on whether a user interface object is one type of object or another enables improved control over the focus indicator and reduces an amount of time needed to move the focus indicator within the user interface object in ways that are consistent with and appropriate for the user interface object's type. For example, because touch-sensitive surfaces primarily offer two-dimensional input control and are better suited for moving a focus indicator within two-dimensional content, requiring movement of an input on a touch-sensitive surface to move a focus indicator would make it harder and more error-prone for a user to interact with three-dimensional content in an intended manner.

In some embodiments, a computer system initiates a drag operation with respect to content of an application from a first region in an environment, in response to an input directed to the content. The computer system detects movement of the input while a user is gazing at a second region in the environment. In response to detecting the movement of the input, and if the movement of the input meets respective criteria that include a requirement that the movement of the input be sufficiently toward the location in the second region to which the user's gaze is directed, the computer system moves the content (or a representation of the content) to the second region. However, if the movement of the input does not meet the respective criteria, such as if the input is not sufficiently toward the location in the second region to which the user's gaze is directed, the computer system moves the content within the first region in accordance with the movement of the input. Enabling a user to move content to another region in a user interface by gazing at the other region and providing an appropriate input reduces an amount of time needed to move content across larger distances in the environment.

Figure 1B:
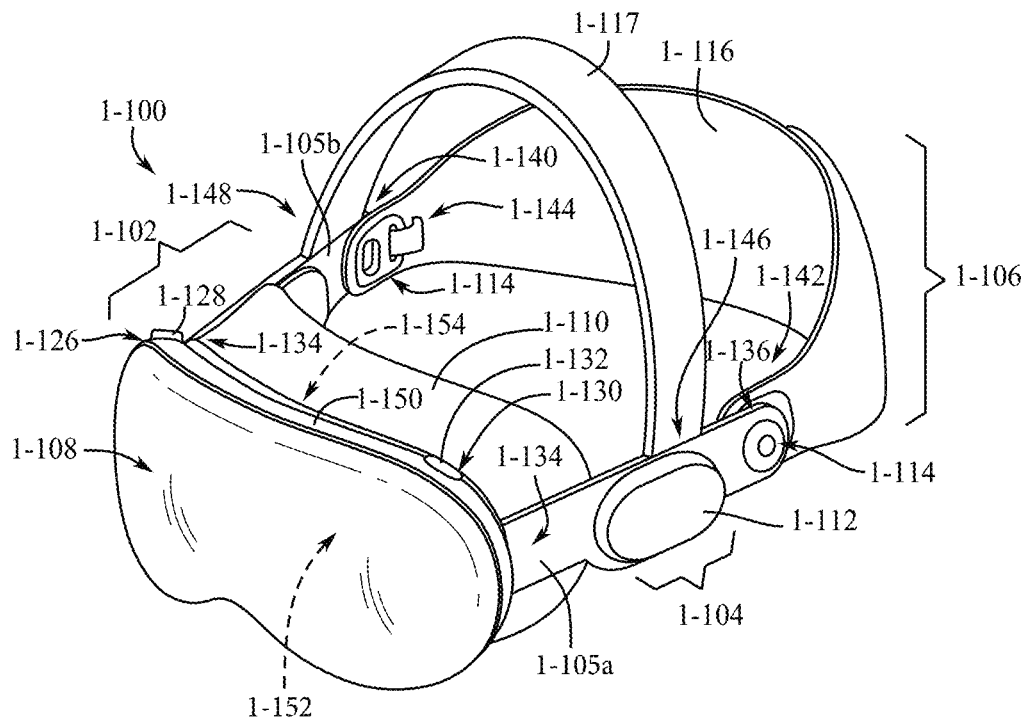
FIGS. 1B-1P are examples of a computer system for providing XR experiences in the operating environment of FIG. 1A.
Figure 1C:
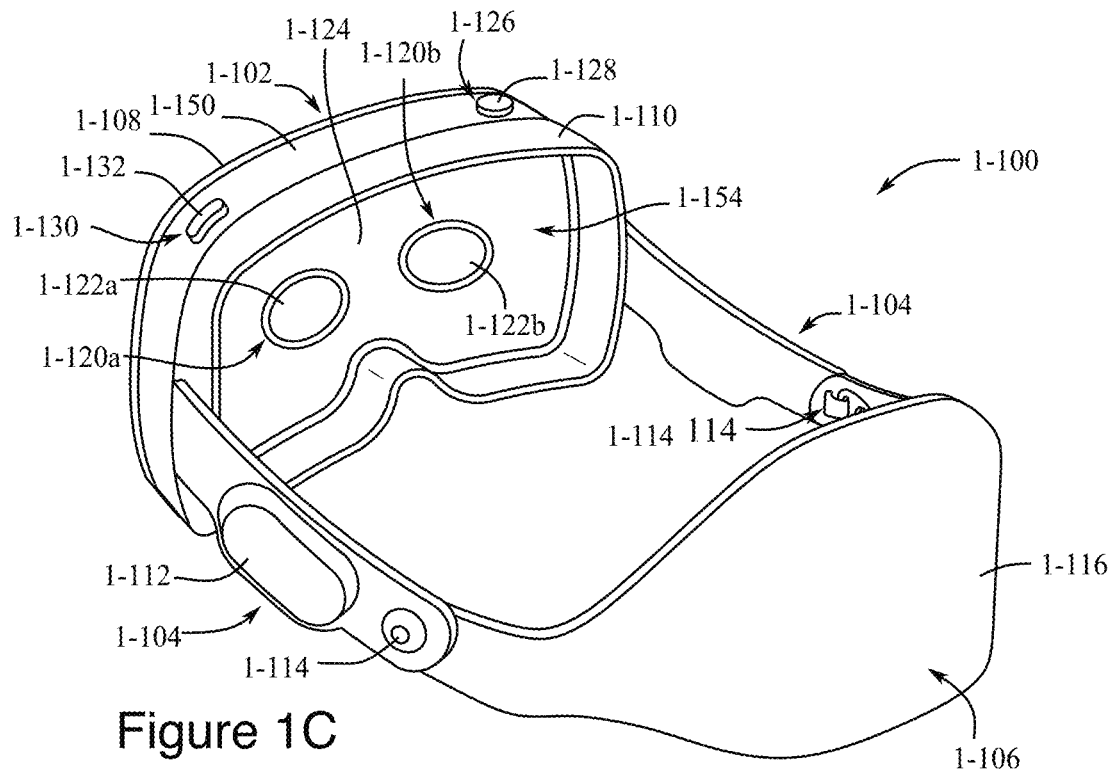
Figure 1D:
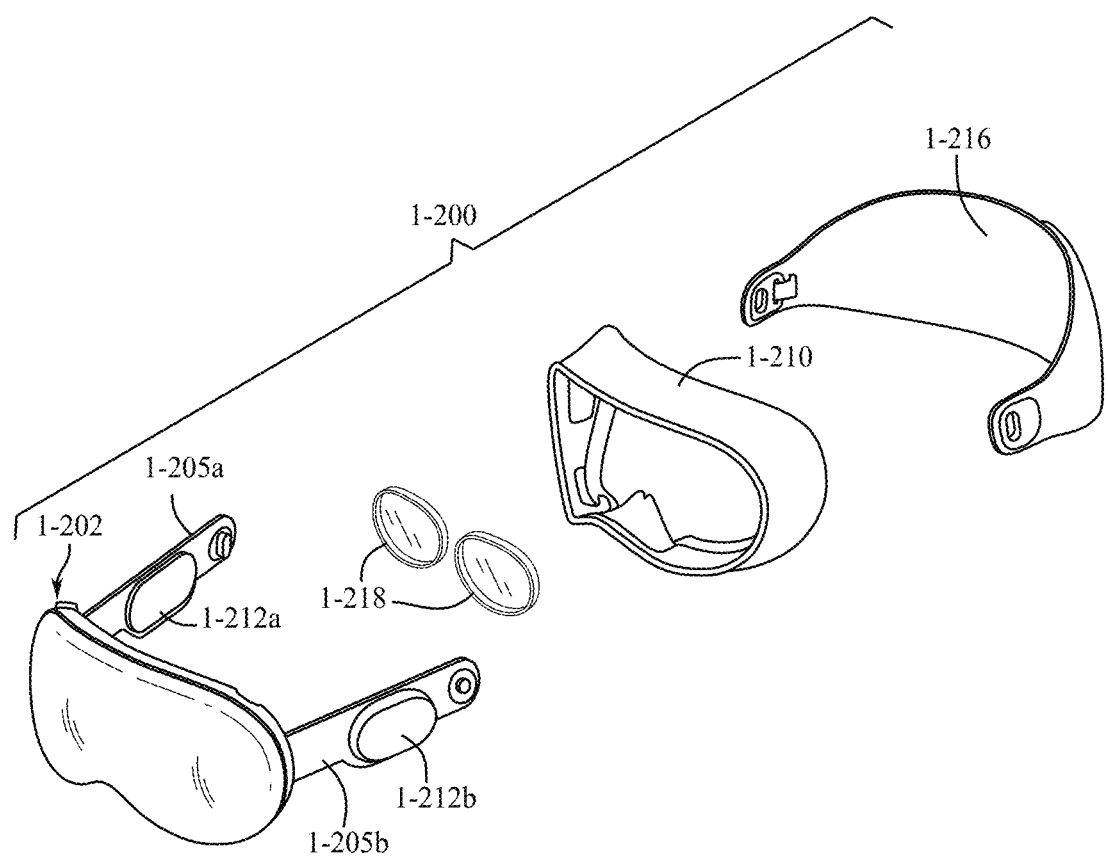
Figure 1E:
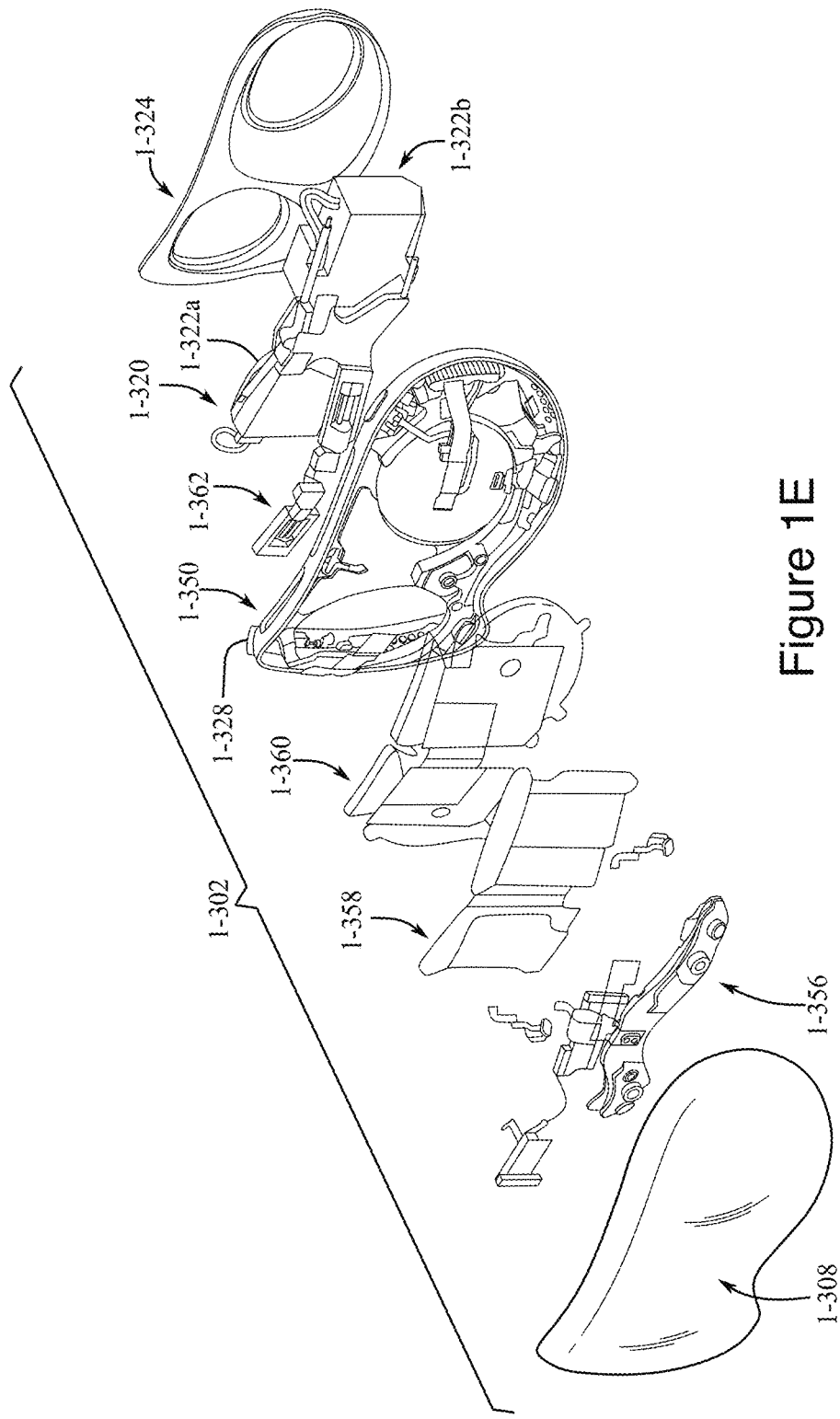
Figure 1F:
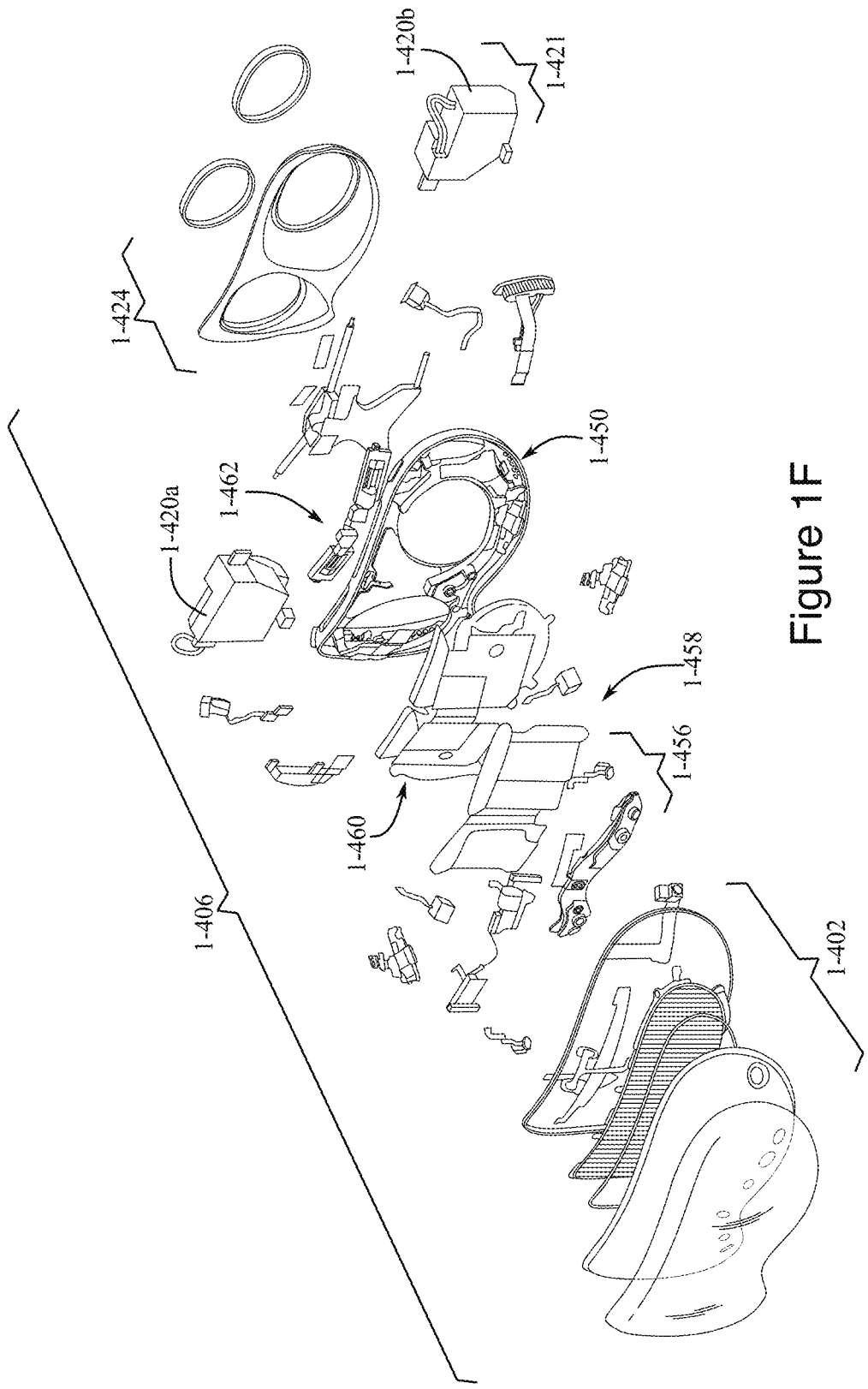
Figure 1G:
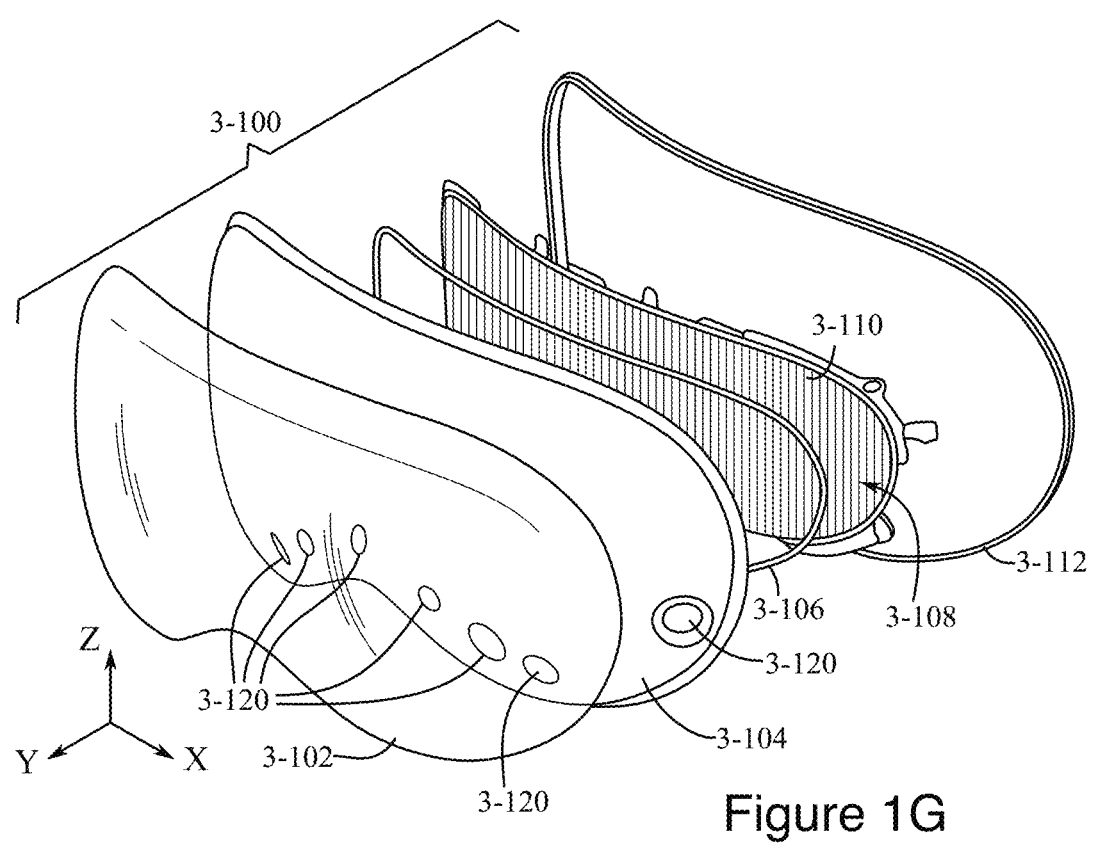
Figure 1H:
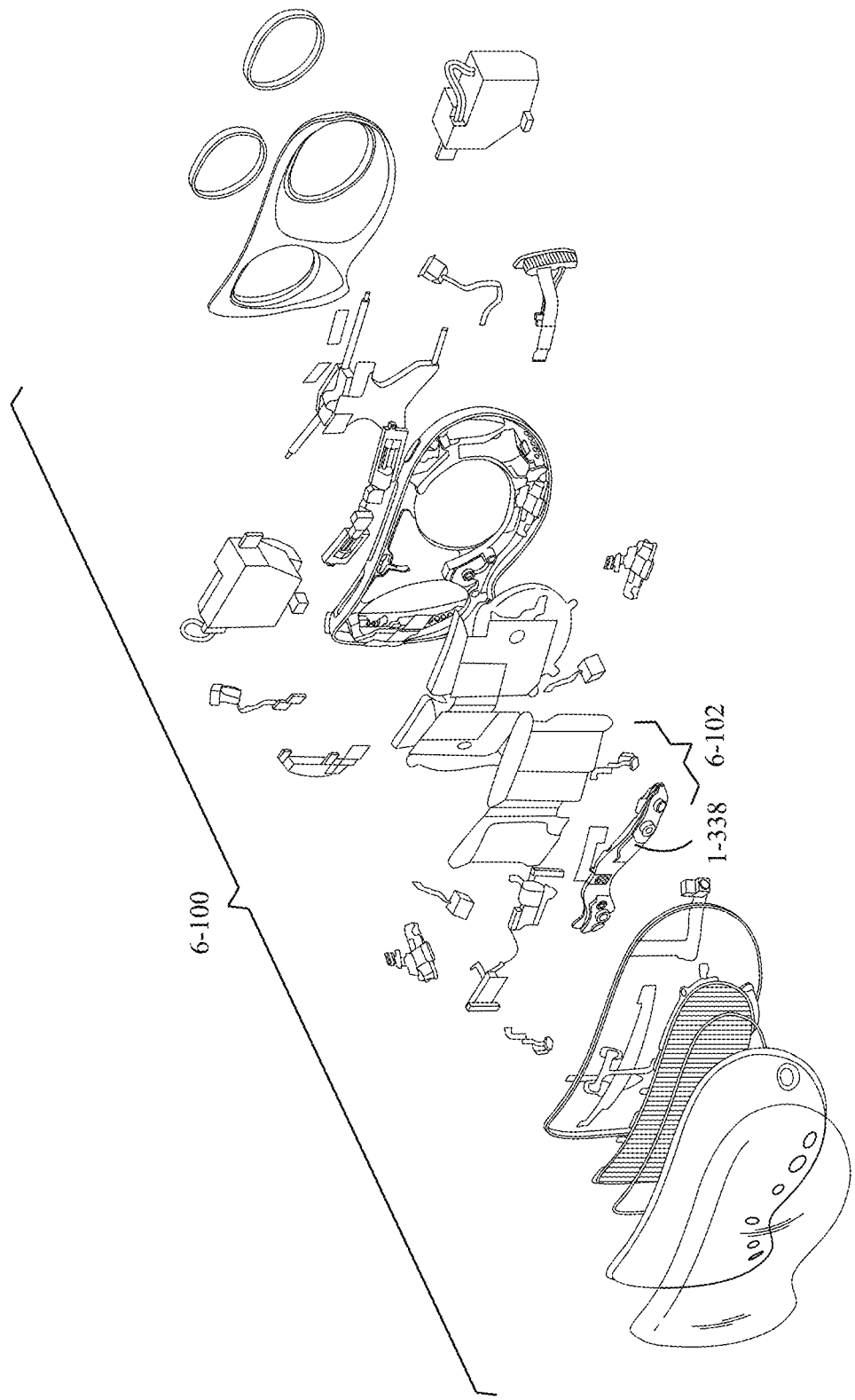
Figure 1I:
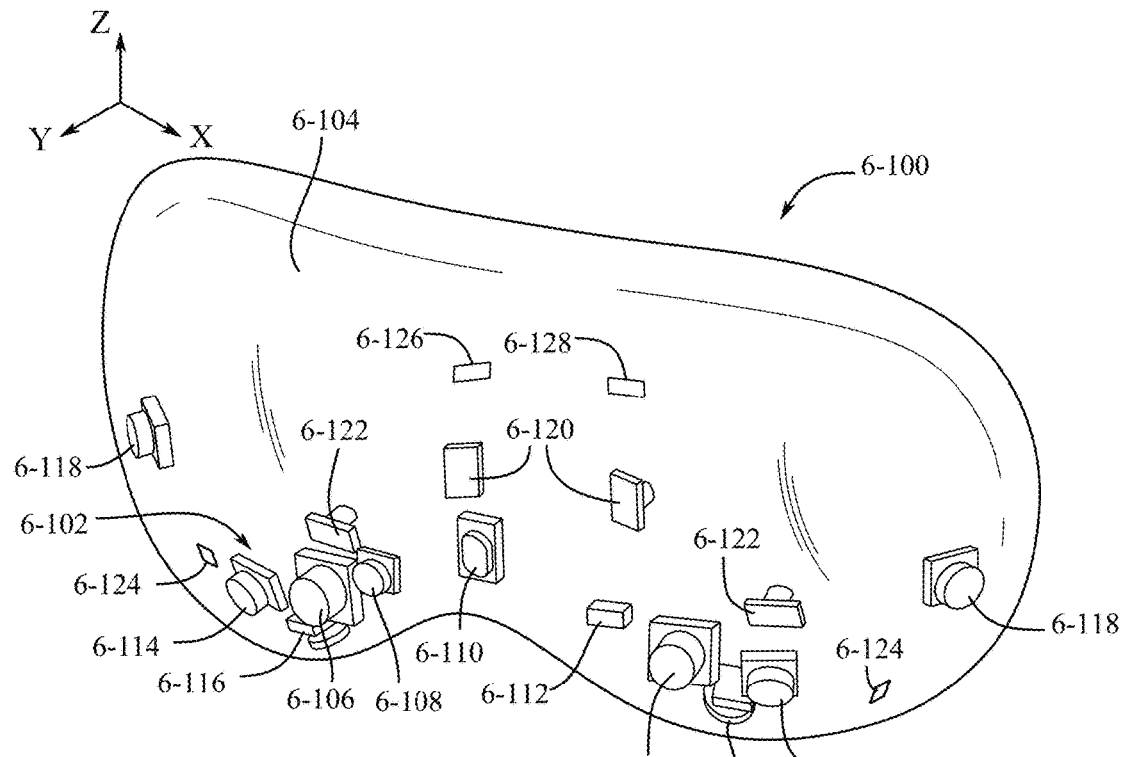
Figure 1J:
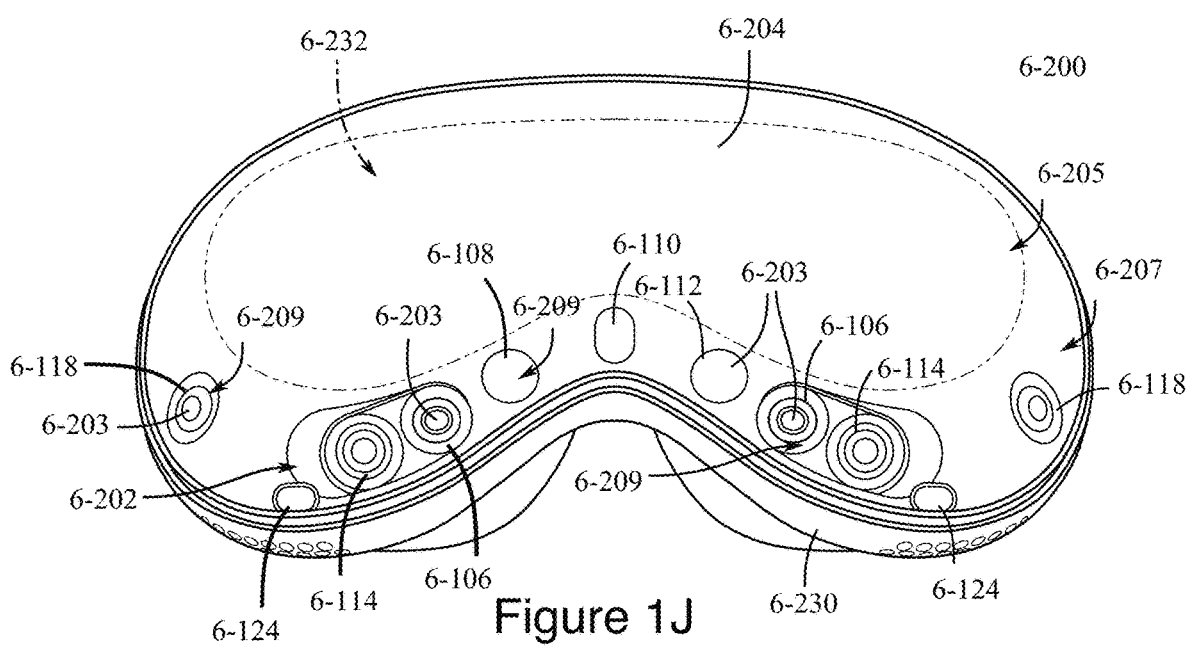
Figure 1K:
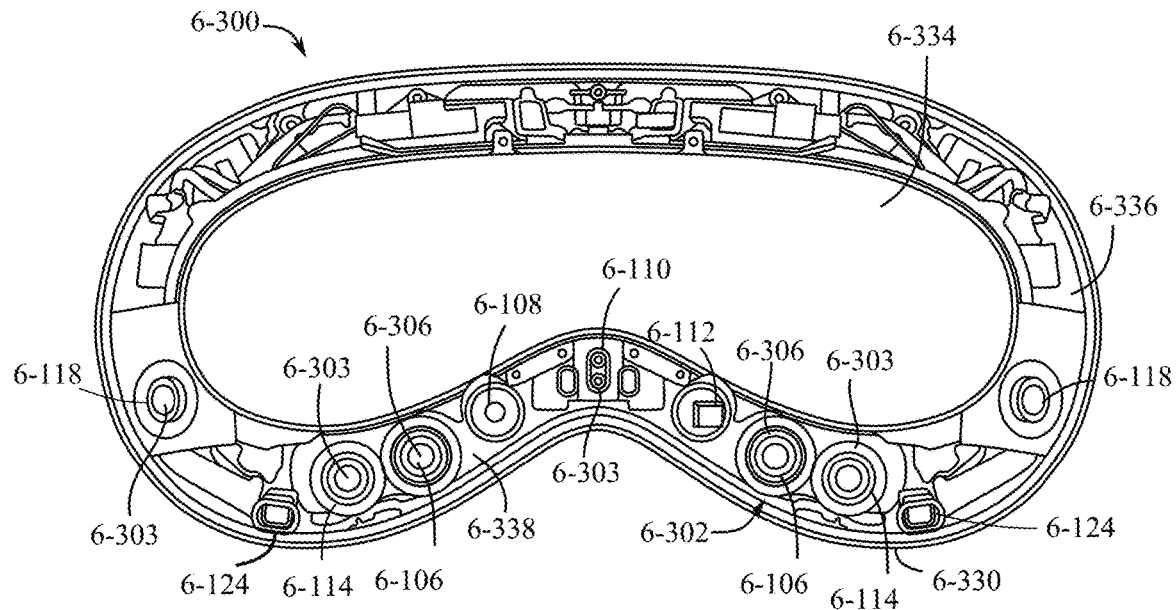
Figure 1L:
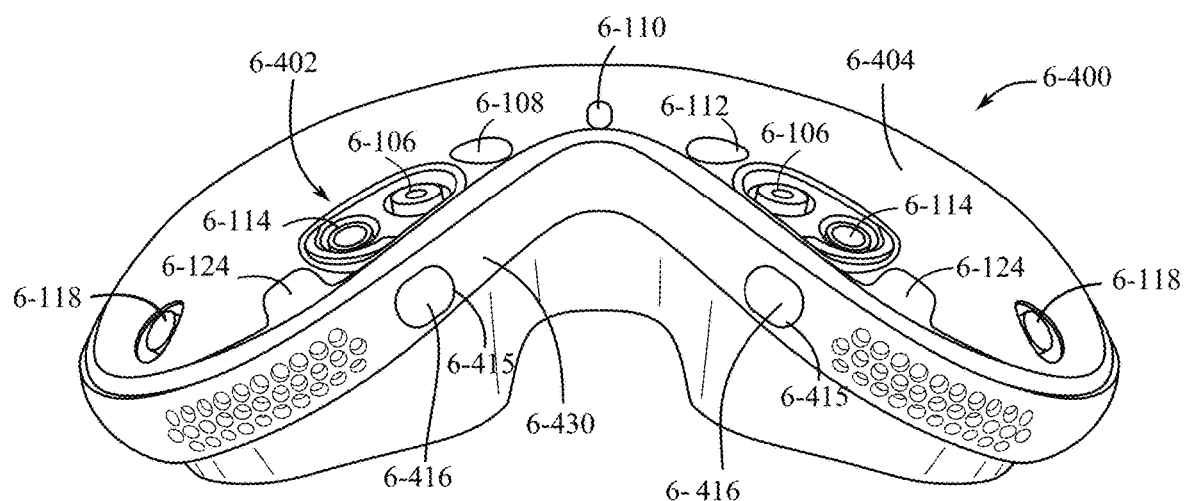
Figure 1M:
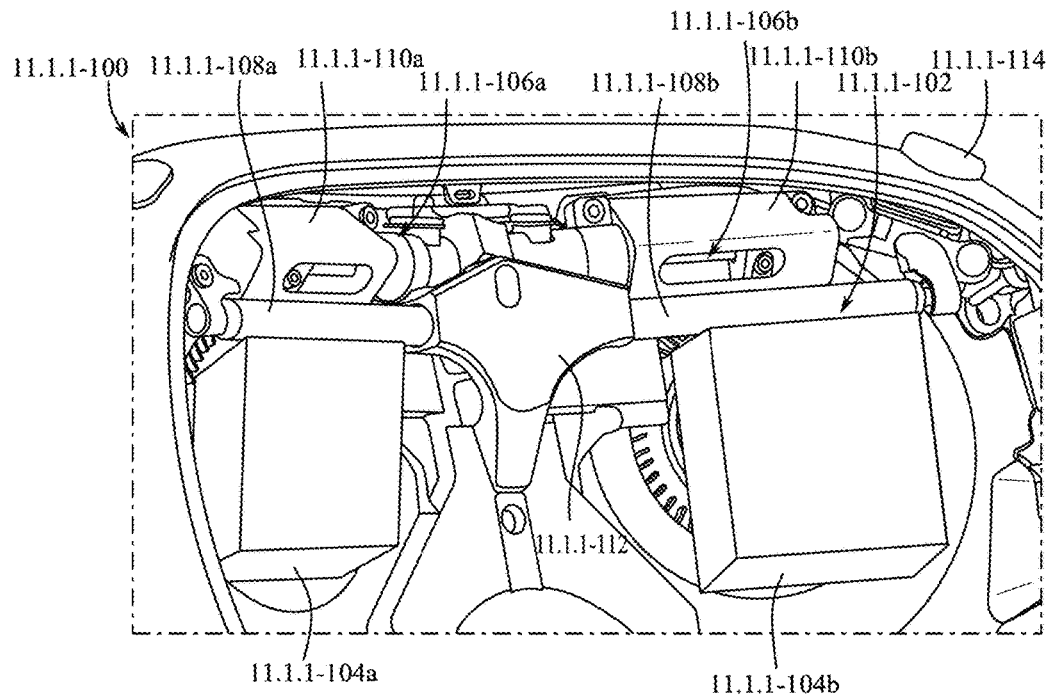
Figure 1N:
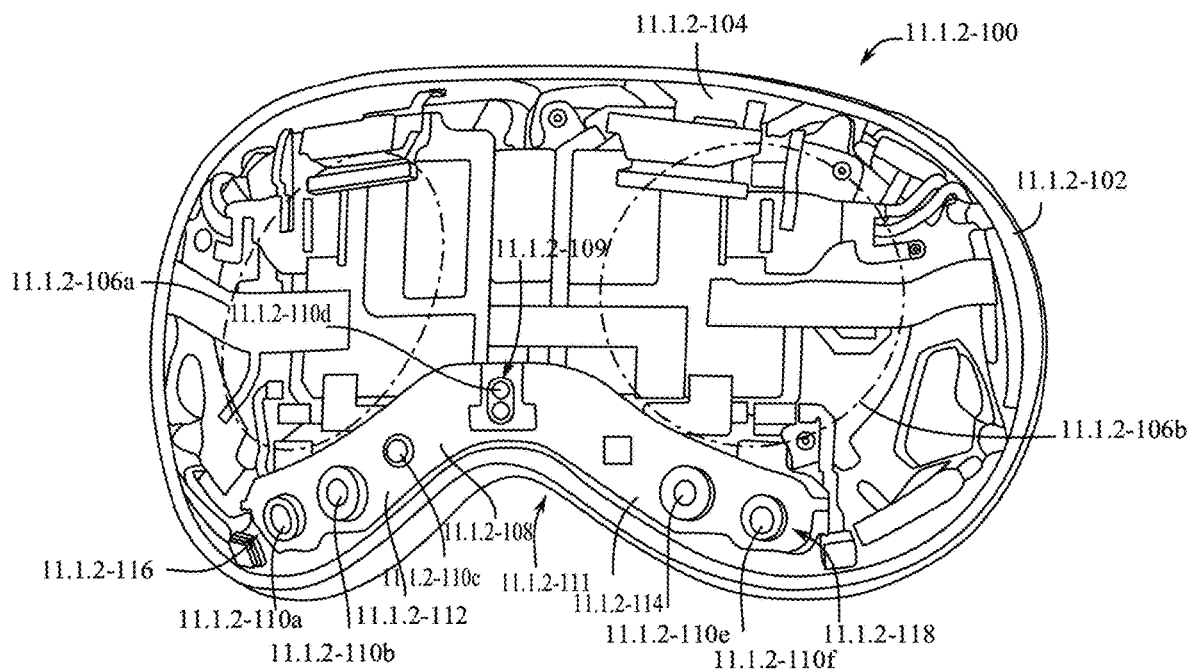
Figure 1O:
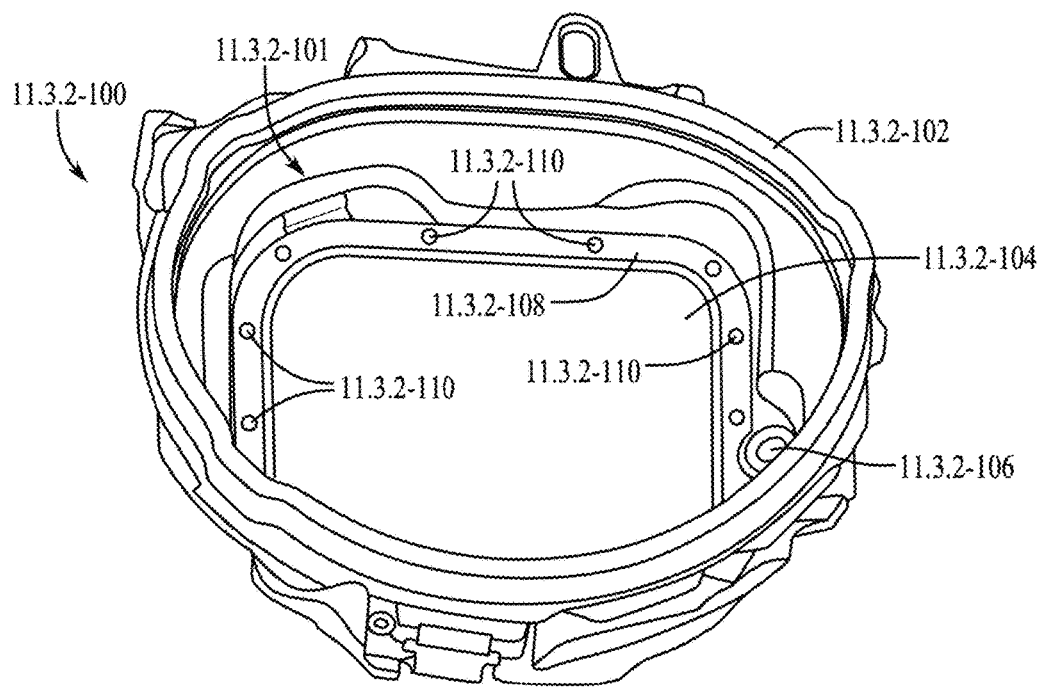
Figure 1P:
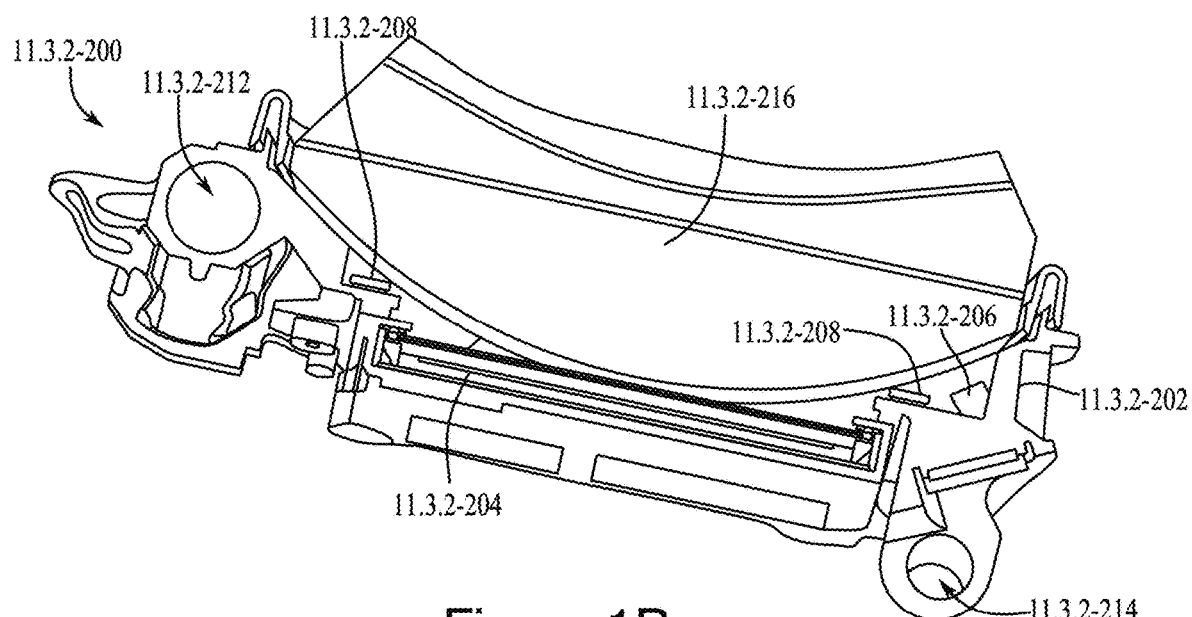
Figure 2:
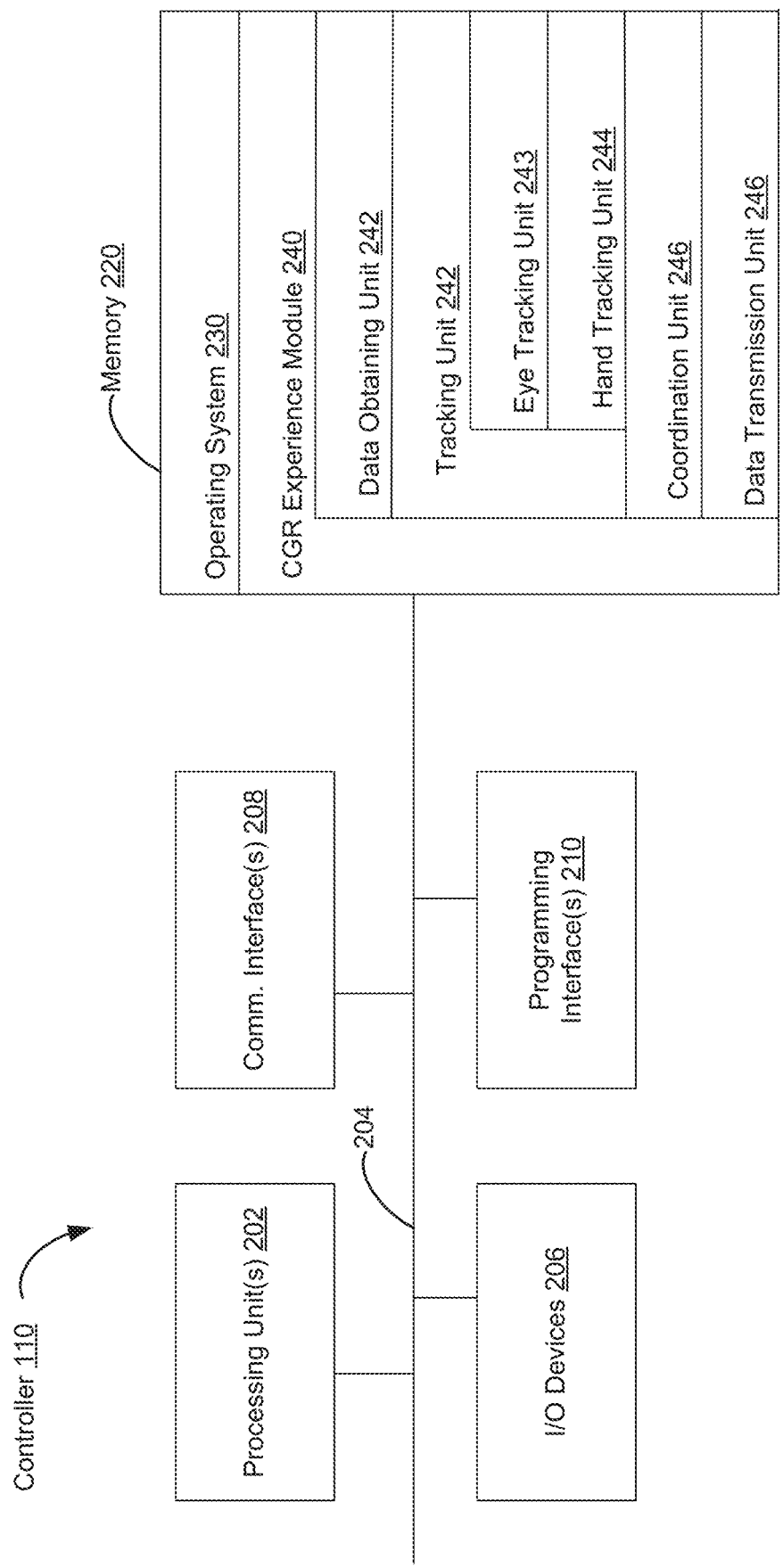
FIG. 2 is a block diagram illustrating a controller of a computer system that is configured to manage and coordinate an XR experience for the user in accordance with some embodiments.
Figure 3:
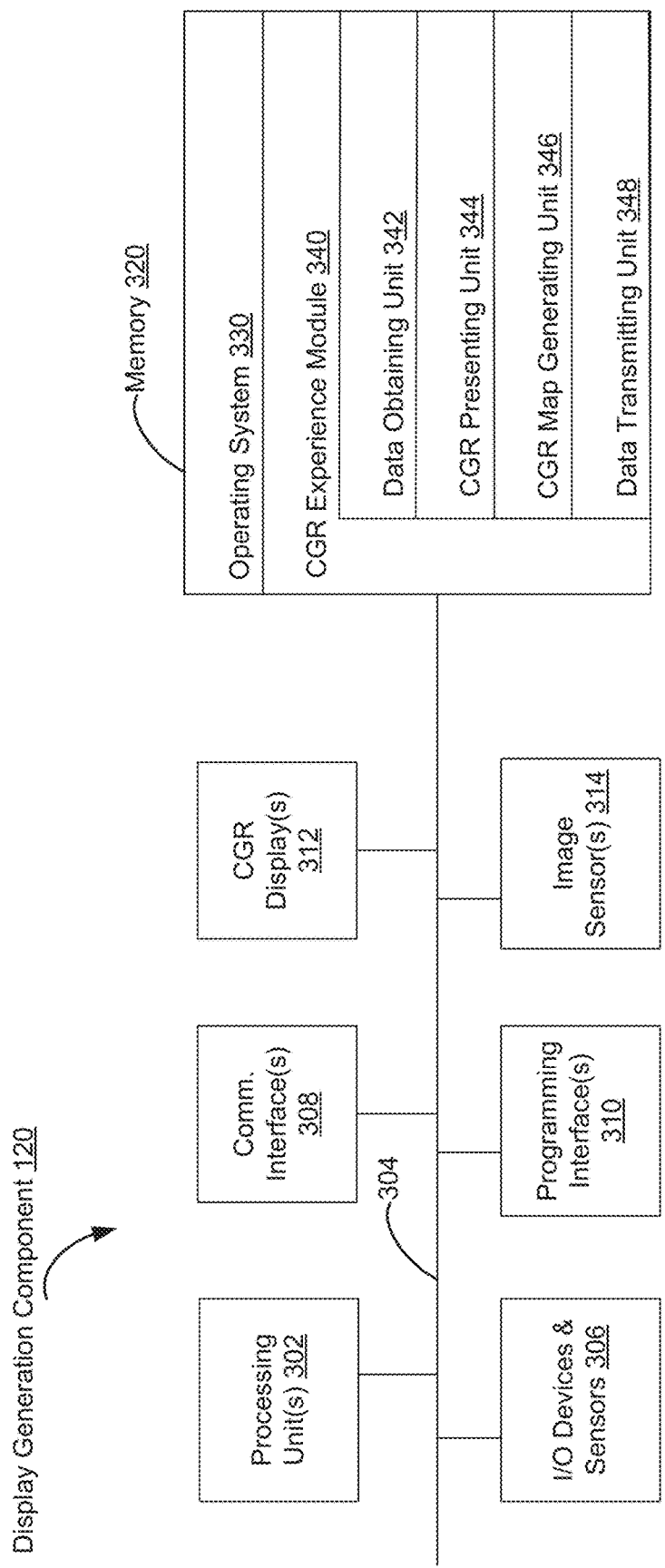
FIG. 3 is a block diagram illustrating a display generation component of a computer system that is configured to provide a visual component of the XR experience to the user in accordance with some embodiments.
Figure 11A:
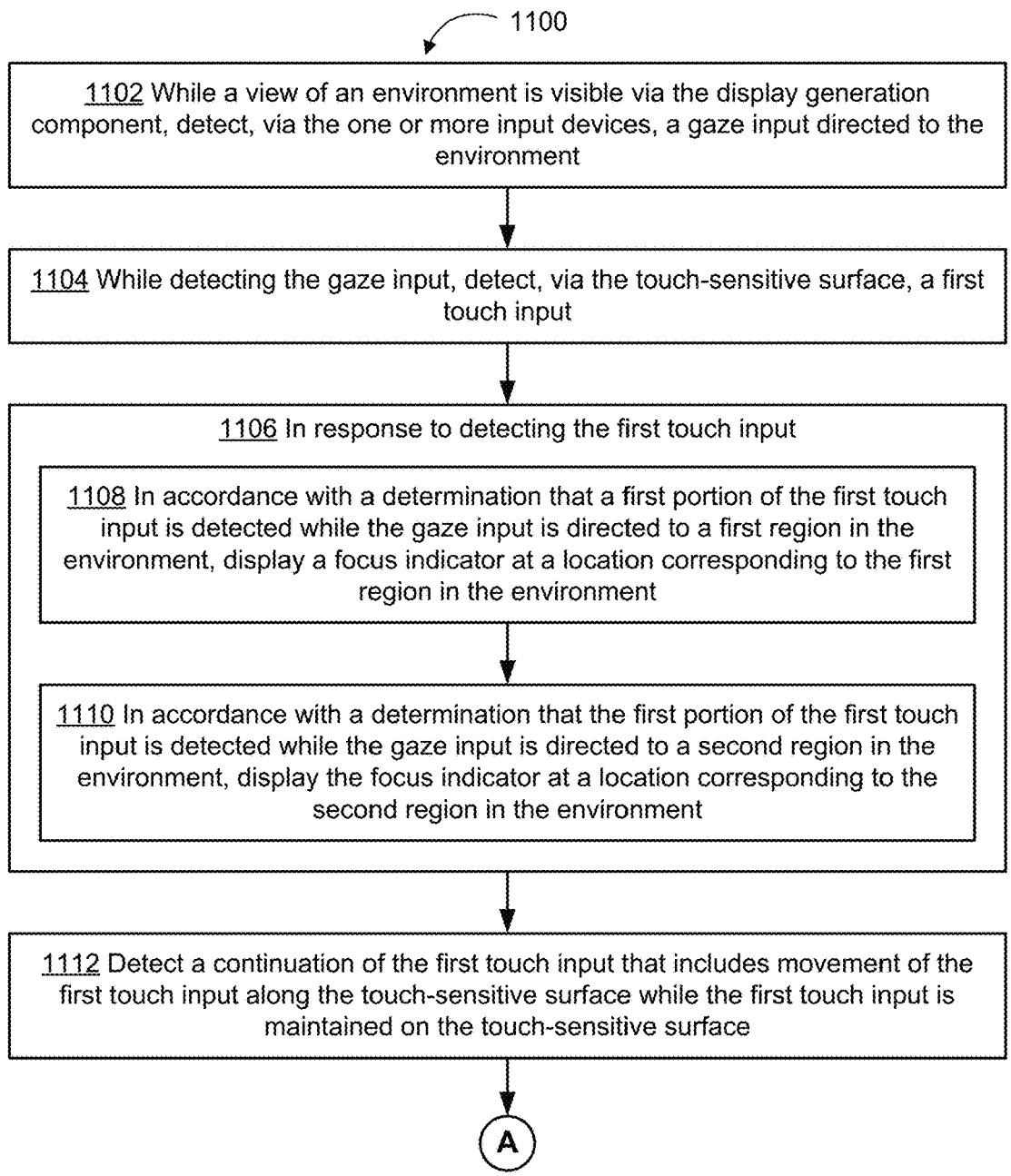
Figure 12:
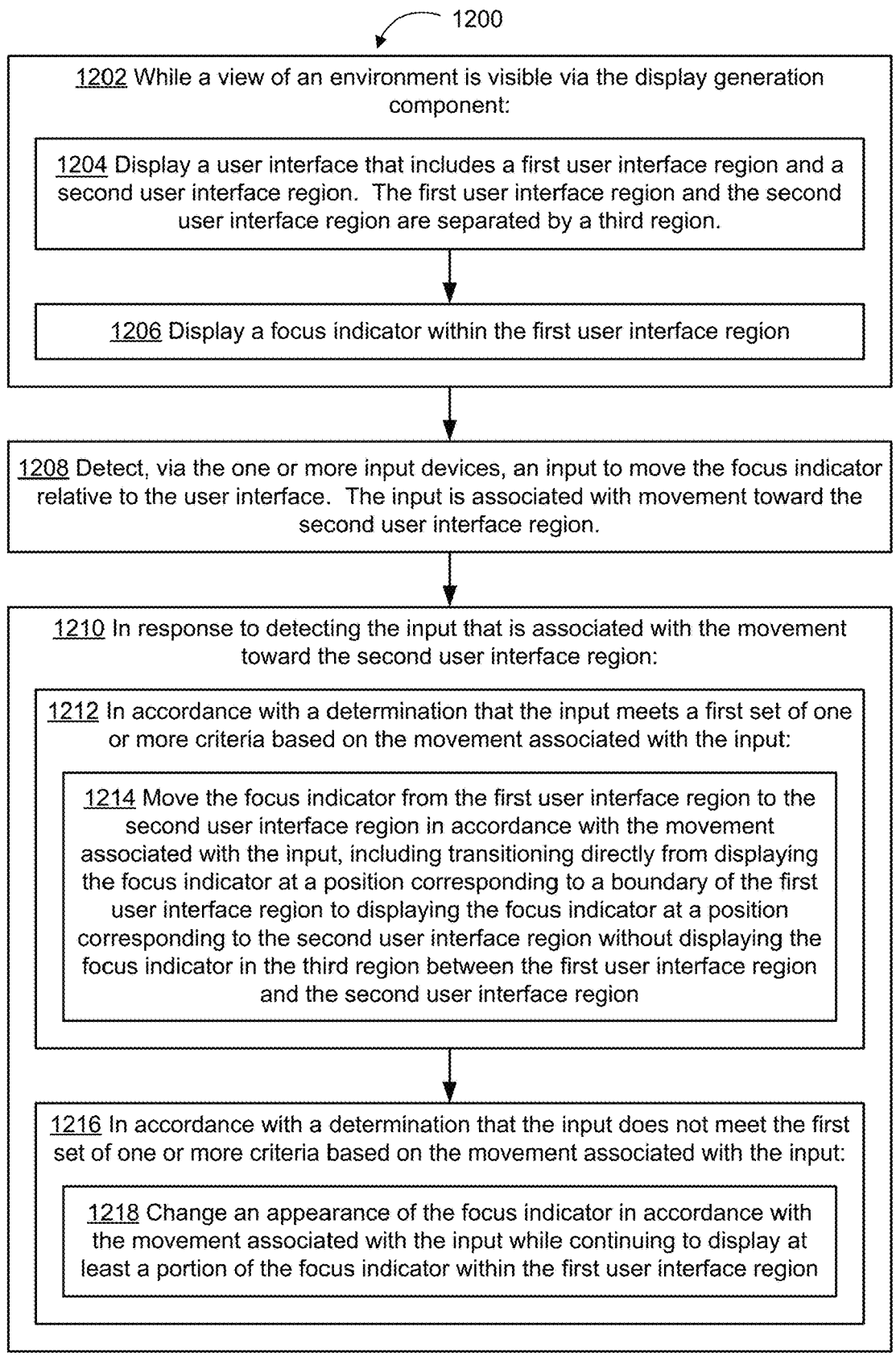
FIG. 12 is a flow diagram of methods of moving focus indicators across gaps between user interface regions in an environment, in accordance with various embodiments.
Figure 13:
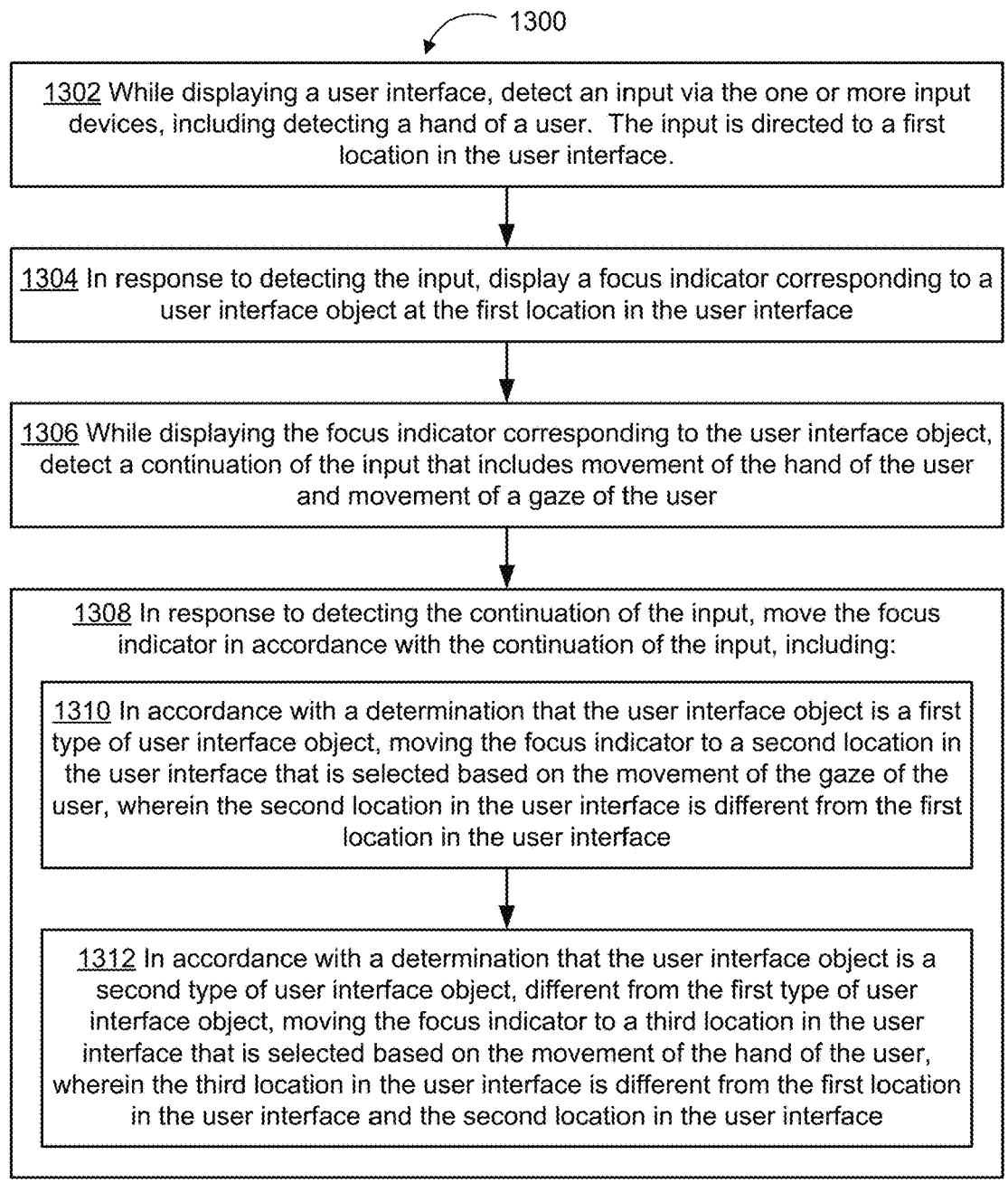
FIG. 13 is a flow diagram of methods of interacting with objects in a user interface using gaze and/or hand input differently for different types of objects, in accordance with various embodiments.
Figure 14:
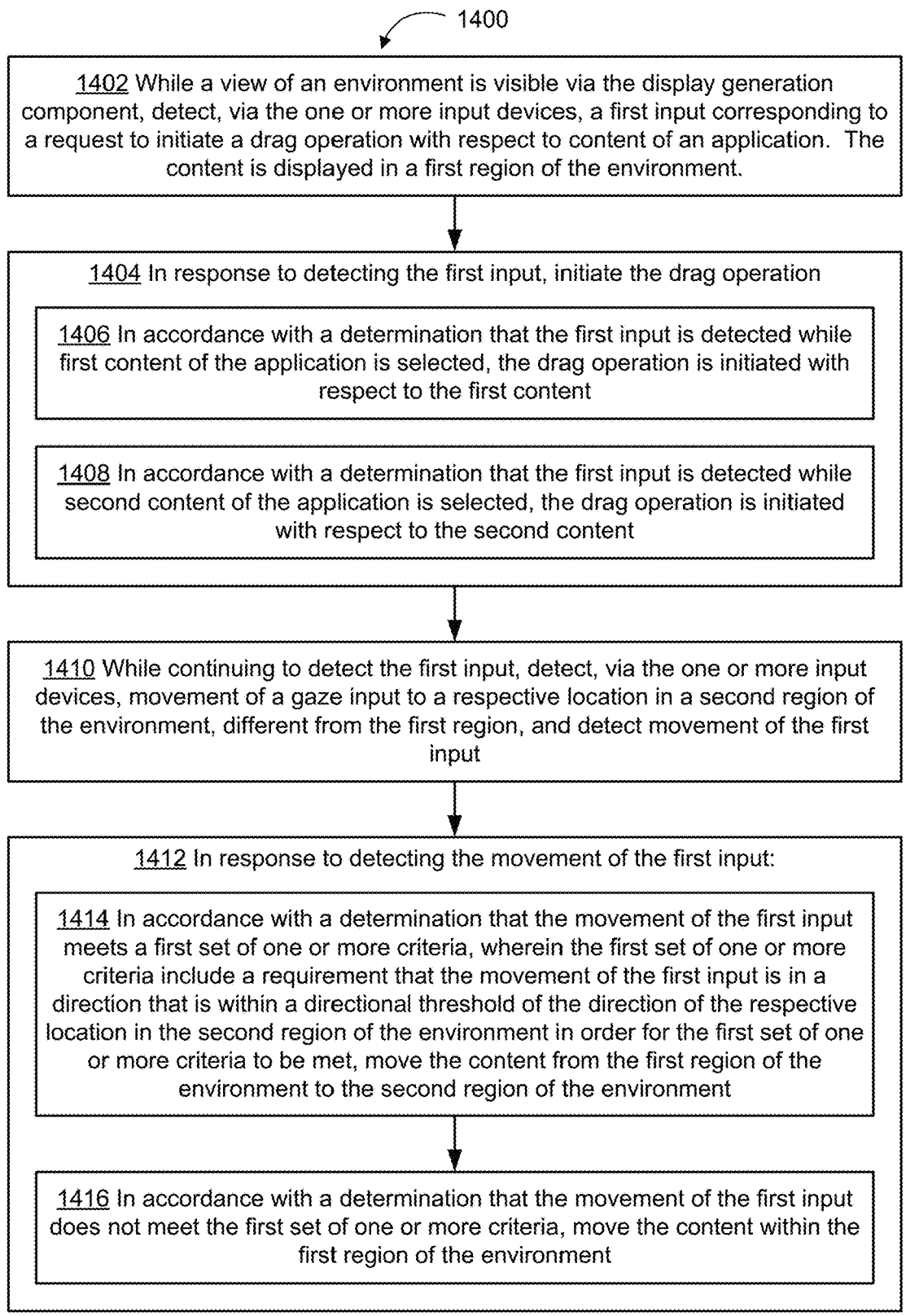
FIG. 14 is a flow diagram of methods of gaze-assisted dragging and dropping of content across different regions in an environment, in accordance with various embodiments.

FIGS. 1A-6 provide a description of example computer systems for providing XR experiences to users. FIGS. 7A-7K illustrate example techniques for gaze-assisted display and movement of a focus indicator in an environment, in accordance with some embodiments. FIGS. 8A-8H illustrate example techniques for moving focus indicators across gaps between user interface regions in an environment, in accordance with some embodiments. FIGS. 9A-9I illustrate example techniques for interacting with objects in a user interface using gaze and/or hand input differently for different types of objects, in accordance with some embodiments. FIGS. 10A-10E3 illustrate example techniques for gaze-assisted dragging and dropping of content across different regions in an environment, in accordance with some embodiments. FIGS. 11A-11B are flow diagrams of methods of gaze-assisted display and movement of a focus indicator in an environment, in accordance with various embodiments. FIG. 12 is a flow diagram of methods of moving focus indicators across gaps between user interface regions in an environment, in accordance with various embodiments. FIG. 13 is a flow diagram of methods of interacting with objects in a user interface using gaze and/or hand input differently for different types of objects, in accordance with various embodiments. FIG. 14 is a flow diagram of methods of gaze-assisted dragging and dropping of content across different regions in an environment, in accordance with various embodiments. The user interfaces in FIGS. 7A-7K, 8A-8H, 9A-9I, and 10A-10E3 are used to illustrate the processes in FIGS. 11A-11B, 12, 13, and 14.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, an XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in an XR environment may be made in response to representations of physical motions (e.g., vocal commands). A person may sense and/or interact with an XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment).

In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate an XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is an XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120a, 1-120b and/or first and second optical modules 11.1.1-104a and 11.1.1-104b) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120a, 1-120b and/or first and second optical modules 11.1.1-104a and 11.1.1-104b), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120a, 1-120b and/or first and second optical modules 11.1.1-104a and 11.1.1-104b).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105*a*, 1-105*b* of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105*a* including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105*b* including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105*a* and the second electronic strap 1-105*b*. The straps 1-105*a-b* and band 1-116 can be coupled via connection mechanisms or assemblies 1-114. In at least one example, the second band 1-117 includes a first end 1-146 coupled to the first electronic strap 1-105*a* between the first proximal end 1-134 and the first distal end 1-136 and a second end 1-148 coupled to the second electronic strap 1-105*b* between the second proximal end 1-138 and the second distal end 1-140.

In at least one example, the first and second electronic straps 1-105*a-b* include plastic, metal, or other structural materials forming the shape the substantially rigid straps 1-105*a-b*. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105*a-b* can define internal strap volumes and include one or more electronic components disposed in the internal strap volumes. In one example, as shown in FIG. 1B, the first electronic strap 1-105*a* can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120*a*, 1-120*b* disposed at or in the rearward facing second opening 1-154 defined by the housing 1-150 and/or disposed in the internal volume of the housing 1-150 and configured to project light through the second opening 1-154. In at least one example, each display assembly 1-120*a-b* can include respective display screens 1-122*a*, 1-122*b* configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122*a-b* can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120*a-b*. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-1F and described herein. Likewise, any of the features, components, and/or parts, including the arrangements and configurations thereof shown and described with reference to FIGS. 1D-1F can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205a, 1-205b. The first securement strap 1-205a can include a first electronic component 1-212a and the second securement strap 1-205b can include a second electronic component 1-212b. In at least one example, the first and second straps 1-205a-b can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205a-b can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322a, 1-322b disposed between the frame 1-350 and the curtain assembly 1-324.

In at least one example, the display unit 1-306 can also include a motor assembly 1-362 configured as an adjustment mechanism for adjusting the positions of the display screens 1-322a-b of the display assembly 1-320 relative to the frame 1-350. In at least one example, the display assembly 1-320 is mechanically coupled to the motor assembly 1-362, with at least one motor for each display screen 1-322a-b, such that the motors can translate the display screens 1-322a-b to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322a-b.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420a, 1-420b of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the cheeks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. for hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124.

These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104a-b slidably engaging/coupled to respective guide-rods 11.1.1-108a-b and motors 11.1.1-110a-b of left and right adjustment subsystems 11.1.1-106a-b. The IPD adjustment system 11.1.1-102 can be coupled to a bracket 11.1.1-112 and include a button 11.1.1-114 in electrical communication with the motors 11.1.1-110a-b. In at least one example, the button 11.1.1-114 can electrically communicate with the first and second motors 11.1.1-110a-b via a processor or other circuitry components to cause the first and second motors 11.1.1-110a-b to activate and cause the first and second optical modules 11.1.1-104a-b, respectively, to change position relative to one another.

In at least one example, the first and second optical modules 11.1.1-104a-b can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104a-b to match the inter-pupillary distance of the user's eyes. The optical modules 11.1.1-104a-b can also include one or more cameras or other sensors/sensor systems for imaging and measuring the IPD of the user such that the optical modules 11.1.1-104a-b can be adjusted to match the IPD.

In one example, the user can manipulate the button 11.1.1-114 to cause an automatic positional adjustment of the first and second optical modules 11.1.1-104a-b. In one example, the user can manipulate the button 11.1.1-114 to cause a manual adjustment such that the optical modules 11.1.1-104a-b move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104a-b via the motors 11.1.1-110a-b is provided by an electrical power source. In one example, the adjustment and movement of the optical modules 11.1.1-104a-b via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106a, 11.1.2-106b. The apertures 11.1.2-106a-b are shown in dotted lines in FIG. 1N because a view of the apertures 11.1.2-106a-b can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106a-b.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106a-b such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110a-f. Each sensor of the plurality of sensors 11.1.2-110a-f can include various types of sensors, including cameras, IR sensors, and so forth. In some examples, one or more of the sensors 11.1.2-110a-f can be used for object recognition in three-dimensional space such that it is important to maintain a precise relative position of two or more of the plurality of sensors 11.1.2-110a-f. The cantilevered nature of the mounting bracket 11.1.2-108 can protect the sensors 11.1.2-110a-f from damage and altered positioning in the case of accidental drops by the user. Because the sensors 11.1.2-110a-f are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110a-f coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and an XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 242, a tracking unit 244, a coordination unit 246, and a data transmitting unit 248.

In some embodiments, the data obtaining unit 242 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 242 includes instructions and/or logic therefor, and heuristics and metadata therefor.

In some embodiments, the tracking unit 244 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 244 includes instructions and/or logic therefor, and heuristics and metadata therefor. In some embodiments, the tracking unit 244 includes hand tracking unit 245 and/or eye tracking unit 243. In some embodiments, the hand tracking unit 245 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 245 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 242, the tracking unit 244 (e.g., including the eye tracking unit 243 and the hand tracking unit 245), the coordination unit 246, and the data transmitting unit 248 are shown as residing on a single device (e.g., the controller 110), it should be understood that in other embodiments, any combination of the data obtaining unit 242, the tracking unit 244 (e.g., including the eye tracking unit 243 and the hand tracking unit 245), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transistor (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes an XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and an XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, an XR presenting unit 344, an XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate an XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
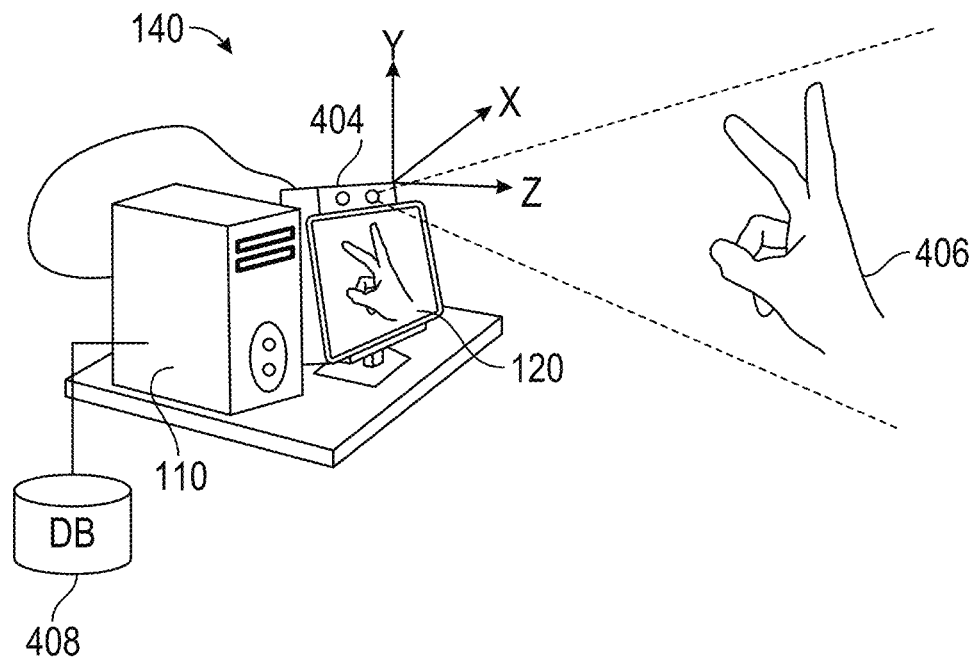
FIG. 4 is a block diagram illustrating a hand tracking unit of a computer system that is configured to capture gesture inputs of the user in accordance with some embodiments.
Figure 4:
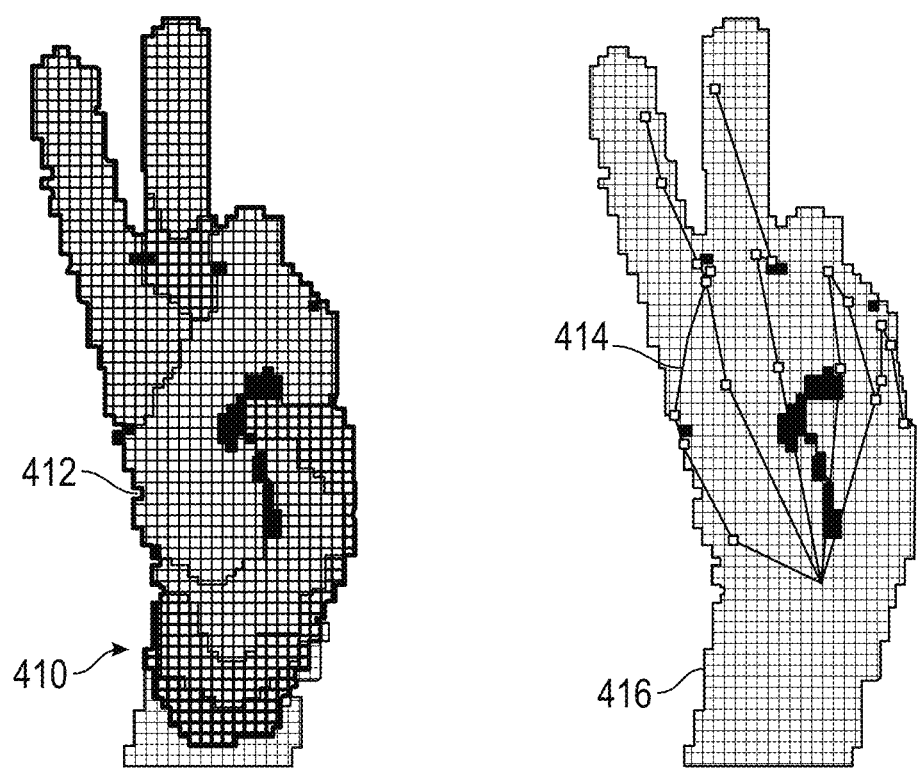

FIG. 4 is a schematic, pictorial illustration of an example embodiment of the hand tracking device 140. In some embodiments, hand tracking device 140 (FIG. 1A) is controlled by hand tracking unit 245 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environment of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving their hand 406 and/or changing their hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves their hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and fingertips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, fingertips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
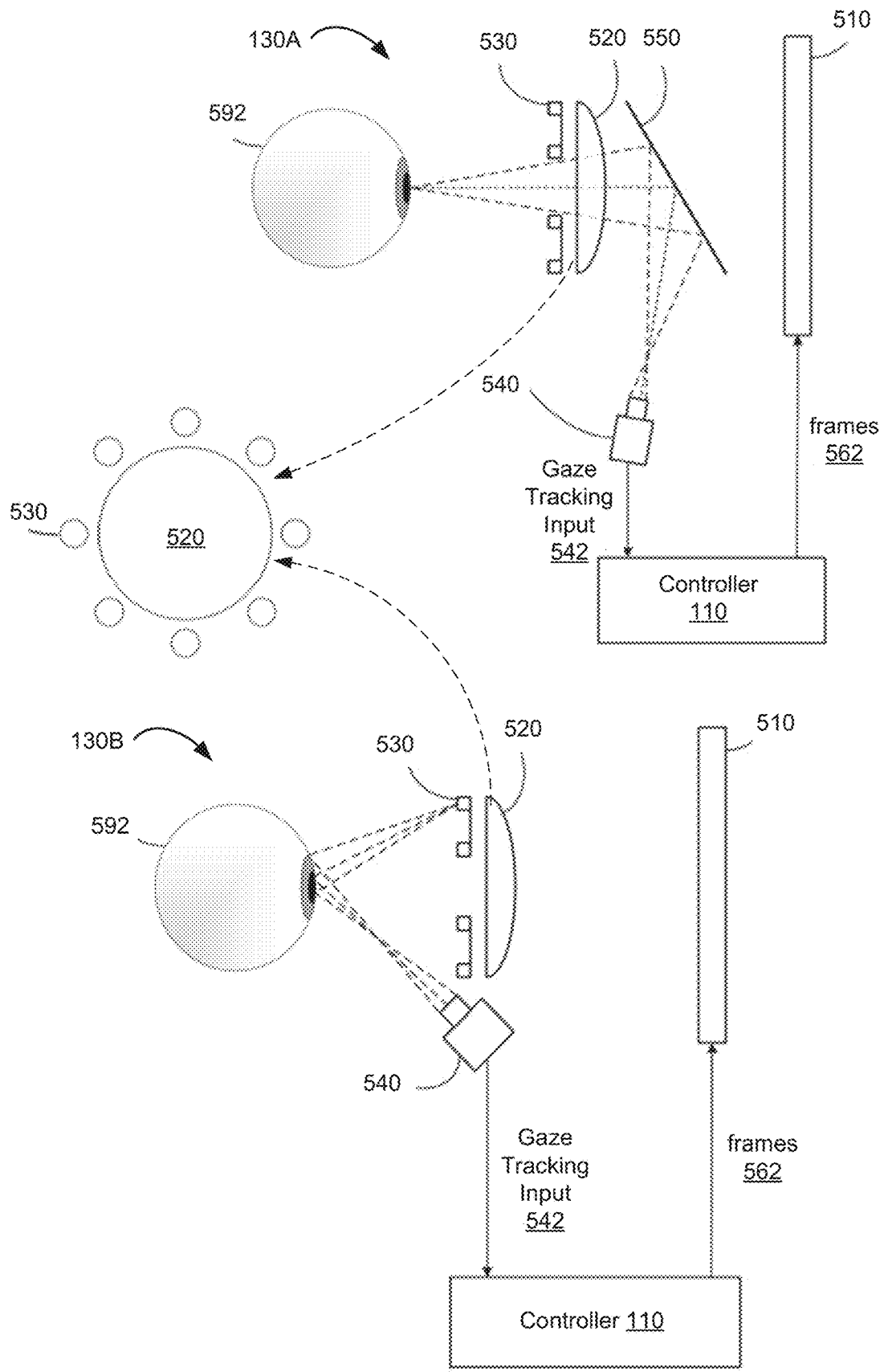
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or an XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
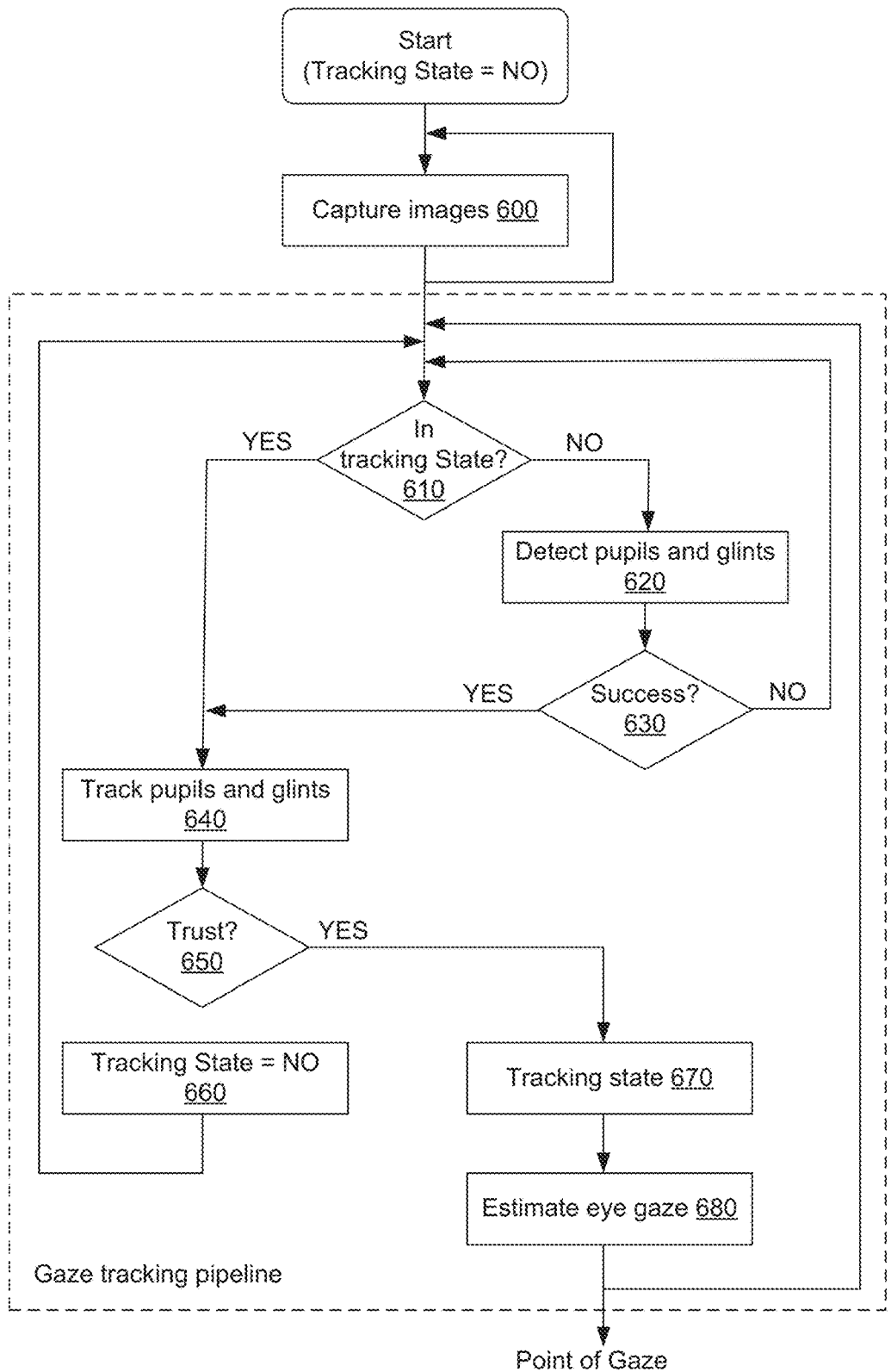
FIG. 6 is a flow diagram illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with a display generation component, one or more input devices such as a touch-sensitive surface, and optionally one or more tactile output generators.

FIGS. 7A-7K, 8A-8H, 9A-9I, and 10A-10E3 illustrate three-dimensional environments that are visible via a display generation component (e.g., a display generation component 7100 or a display generation component 120) of a computer system (e.g., computer system 101) and interactions that occur in the three-dimensional environments caused by user inputs directed to the three-dimensional environments and/or inputs received from other computer systems and/or sensors. In some embodiments, an input is directed to a virtual object within a three-dimensional environment by a user's gaze detected in the region occupied by the virtual object, or by a hand gesture performed at a location in the physical environment that corresponds to the region of the virtual object. In some embodiments, an input is directed to a virtual object within a three-dimensional environment by a hand gesture that is performed (e.g., optionally, at a location in the physical environment that is independent of the region of the virtual object in the three-dimensional environment) while the virtual object has input focus (e.g., while the virtual object has been selected by a concurrently and/or previously detected gaze input, selected by a concurrently or previously detected pointer input, and/or selected by a concurrently and/or previously detected gesture input). In some embodiments, an input is directed to a virtual object within a three-dimensional environment by an input device that has positioned a focus selector object (e.g., a pointer object or selector object) at the position of the virtual object. In some embodiments, an input is directed to a virtual object within a three-dimensional environment via other means (e.g., voice and/or control button). In some embodiments, an input is directed to a representation of a physical object or a virtual object that corresponds to a physical object by the user's hand movement (e.g., whole hand movement, whole hand movement in a respective posture, movement of one portion of the user's hand relative to another portion of the hand, and/or relative movement between two hands) and/or manipulation with respect to the physical object (e.g., touching, swiping, tapping, opening, moving toward, and/or moving relative to). In some embodiments, the computer system displays some changes in the three-dimensional environment (e.g., displaying additional virtual content, ceasing to display existing virtual content, and/or transitioning between different levels of immersion with which visual content is being displayed) in accordance with inputs from sensors (e.g., image sensors, temperature sensors, biometric sensors, motion sensors, and/or proximity sensors) and contextual conditions (e.g., location, time, and/or presence of others in the environment). In some embodiments, the computer system displays some changes in the three-dimensional environment (e.g., displaying additional virtual content, ceasing to display existing virtual content, and/or transitioning between different levels of immersion with which visual content is being displayed) in accordance with inputs from other computers used by other users that are sharing the computer-generated environment with the user of the computer system (e.g., in a shared computer-generated experience, in a shared virtual environment, and/or in a shared virtual or augmented reality environment of a communication session). In some embodiments, the computer system displays some changes in the three-dimensional environment (e.g., displaying movement, deformation, and/or changes in visual characteristics of a user interface, a virtual surface, a user interface object, and/or virtual scenery) in accordance with inputs from sensors that detect movement of other persons and objects and movement of the user that may not qualify as a recognized gesture input for triggering an associated operation of the computer system.

In some embodiments, a three-dimensional environment that is visible via a display generation component described herein is a virtual three-dimensional environment that includes virtual objects and content at different virtual positions in the three-dimensional environment without a representation of the physical environment. In some embodiments, the three-dimensional environment is a mixed reality environment that displays virtual objects at different virtual positions in the three-dimensional environment that are constrained by one or more physical aspects of the physical environment (e.g., positions and orientations of walls, floors, surfaces, direction of gravity, time of day, and/or spatial relationships between physical objects). In some embodiments, the three-dimensional environment is an augmented reality environment that includes a representation of the physical environment. In some embodiments, the representation of the physical environment includes respective representations of physical objects and surfaces at different positions in the three-dimensional environment, such that the spatial relationships between the different physical objects and surfaces in the physical environment are reflected by the spatial relationships between the representations of the physical objects and surfaces in the three-dimensional environment. In some embodiments, when virtual objects are placed relative to the positions of the representations of physical objects and surfaces in the three-dimensional environment, they appear to have corresponding spatial relationships with the physical objects and surfaces in the physical environment. In some embodiments, the computer system transitions between displaying the different types of environments (e.g., transitions between presenting a computer-generated environment or experience with different levels of immersion, adjusting the relative prominence of audio/visual sensory inputs from the virtual content and from the representation of the physical environment) based on user inputs and/or contextual conditions.

In some embodiments, the display generation component includes a pass-through portion in which the representation of the physical environment is displayed or visible. In some embodiments, the pass-through portion of the display generation component is a transparent or semi-transparent (e.g., see-through) portion of the display generation component revealing at least a portion of a physical environment surrounding and within the field of view of a user (sometimes called "optical passthrough"). For example, the pass-through portion is a portion of a head-mounted display or heads-up display that is made semi-transparent (e.g., less than 50%, 40%, 30%, 20%, 15%, 10%, or 5% of opacity) or transparent, such that the user can see through it to view the real world surrounding the user without removing the head-mounted display or moving away from the heads-up display. In some embodiments, the pass-through portion gradually transitions from semi-transparent or transparent to fully opaque when displaying a virtual or mixed reality environment. In some embodiments, the pass-through portion of the display generation component displays a live feed of images or video of at least a portion of physical environment captured by one or more cameras (e.g., rear facing camera(s) of a mobile device or associated with a head-mounted display, or other cameras that feed image data to the computer system) (sometimes called "digital passthrough"). In some embodiments, the one or more cameras point at a portion of the physical environment that is directly in front of the user's eyes (e.g., behind the display generation component relative to the user of the display generation component). In some embodiments, the one or more cameras point at a portion of the physical environment that is not directly in front of the user's eyes (e.g., in a different physical environment, or to the side of or behind the user).

In some embodiments, when displaying virtual objects at positions that correspond to locations of one or more physical objects in the physical environment (e.g., at positions in a virtual reality environment, a mixed reality environment, or an augmented reality environment), at least some of the virtual objects are displayed in place of (e.g., replacing display of) a portion of the live view (e.g., a portion of the physical environment captured in the live view) of the cameras. In some embodiments, at least some of the virtual objects and content are projected onto physical surfaces or empty space in the physical environment and are visible through the pass-through portion of the display generation component (e.g., viewable as part of the camera view of the physical environment, or through the transparent or semi-transparent portion of the display generation component). In some embodiments, at least some of the virtual objects and virtual content are displayed to overlay a portion of the display and block the view of at least a portion of the physical environment visible through the transparent or semi-transparent portion of the display generation component.

In some embodiments, the display generation component displays different views of the three-dimensional environment in accordance with user inputs or movements that change the virtual position of the viewpoint of the currently displayed view of the three-dimensional environment relative to the three-dimensional environment. In some embodiments, when the three-dimensional environment is a virtual environment, the viewpoint moves in accordance with navigation or locomotion requests (e.g., in-air hand gestures, and/or gestures performed by movement of one portion of the hand relative to another portion of the hand) without requiring movement of the user's head, torso, and/or the display generation component in the physical environment. In some embodiments, movement of the user's head and/or torso, and/or the movement of the display generation component or other location sensing elements of the computer system (e.g., due to the user holding the display generation component or wearing the HMD), relative to the physical environment, cause corresponding movement of the viewpoint (e.g., with corresponding movement direction, movement distance, movement speed, and/or change in orientation) relative to the three-dimensional environment, resulting in corresponding change in the currently displayed view of the three-dimensional environment. In some embodiments, when a virtual object has a preset spatial relationship relative to the viewpoint (e.g., is anchored or fixed to the viewpoint), movement of the viewpoint relative to the three-dimensional environment would cause movement of the virtual object relative to the three-dimensional environment while the position of the virtual object in the field of view is maintained (e.g., the virtual object is said to be head locked). In some embodiments, a virtual object is body-locked to the user, and moves relative to the three-dimensional environment when the user moves as a whole in the physical environment (e.g., carrying or wearing the display generation component and/or other location sensing component of the computer system), but will not move in the three-dimensional environment in response to the user's head movement alone (e.g., the display generation component and/or other location sensing component of the computer system rotating around a fixed location of the user in the physical environment). In some embodiments, a virtual object is, optionally, locked to another portion of the user, such as a user's hand or a user's wrist, and moves in the three-dimensional environment in accordance with movement of the portion of the user in the physical environment, to maintain a preset spatial relationship between the position of the virtual object and the virtual position of the portion of the user in the three-dimensional environment. In some embodiments, a virtual object is locked to a preset portion of a field of view provided by the display generation component, and moves in the three-dimensional environment in accordance with the movement of the field of view, irrespective of movement of the user that does not cause a change of the field of view.

In some embodiments, as shown in FIGS. 7A-7K, 8A-8H, 9A-9I, and 10A-10E3, the views of a three-dimensional environment sometimes do not include representation(s) of a user's hand(s), arm(s), and/or wrist(s). In some embodiments, the representation(s) of a user's hand(s), arm(s), and/or wrist(s) are included in the views of a three-dimensional environment. In some embodiments, the representation(s) of a user's hand(s), arm(s), and/or wrist(s) are included in the views of a three-dimensional environment as part of the representation of the physical environment provided via the display generation component. In some embodiments, the representations are not part of the representation of the physical environment and are separately captured (e.g., by one or more cameras pointing toward the user's hand(s), arm(s), and wrist(s)) and displayed in the three-dimensional environment independent of the currently displayed view of the three-dimensional environment. In some embodiments, the representation(s) include camera images as captured by one or more cameras of the computer system(s), or stylized versions of the arm(s), wrist(s) and/or hand(s) based on information captured by various sensors). In some embodiments, the representation(s) replace display of, are overlaid on, or block the view of, a portion of the representation of the physical environment. In some embodiments, when the display generation component does not provide a view of a physical environment, and provides a completely virtual environment (e.g., no camera view and no transparent pass-through portion), real-time visual representations (e.g., stylized representations or segmented camera images) of one or both arms, wrists, and/or hands of the user are, optionally, still displayed in the virtual environment. In some embodiments, if a representation of the user's hand is not provided in the view of the three-dimensional environment, the position that corresponds to the user's hand is optionally indicated in the three-dimensional environment, e.g., by the changing appearance of the virtual content (e.g., through a change in translucency and/or simulated reflective index) at positions in the three-dimensional environment that correspond to the location of the user's hand in the physical environment. In some embodiments, the representation of the user's hand or wrist is outside of the currently displayed view of the three-dimensional environment while the virtual position in the three-dimensional environment that corresponds to the location of the user's hand or wrist is outside of the current field of view provided via the display generation component; and the representation of the user's hand or wrist is made visible in the view of the three-dimensional environment in response to the virtual position that corresponds to the location of the user's hand or wrist being moved within the current field of view due to movement of the display generation component, the user's hand or wrist, the user's head, and/or the user as a whole.

FIGS. 7A-7K illustrate examples of gaze-assisted display and movement of a focus indicator in an environment, particularly in response to inputs that are provided using an input surface such as a touch-sensitive surface. The user interfaces in FIGS. 7A-7K are used to illustrate the processes described below, including the processes in FIGS. 11A-11B.

Figure 7A:
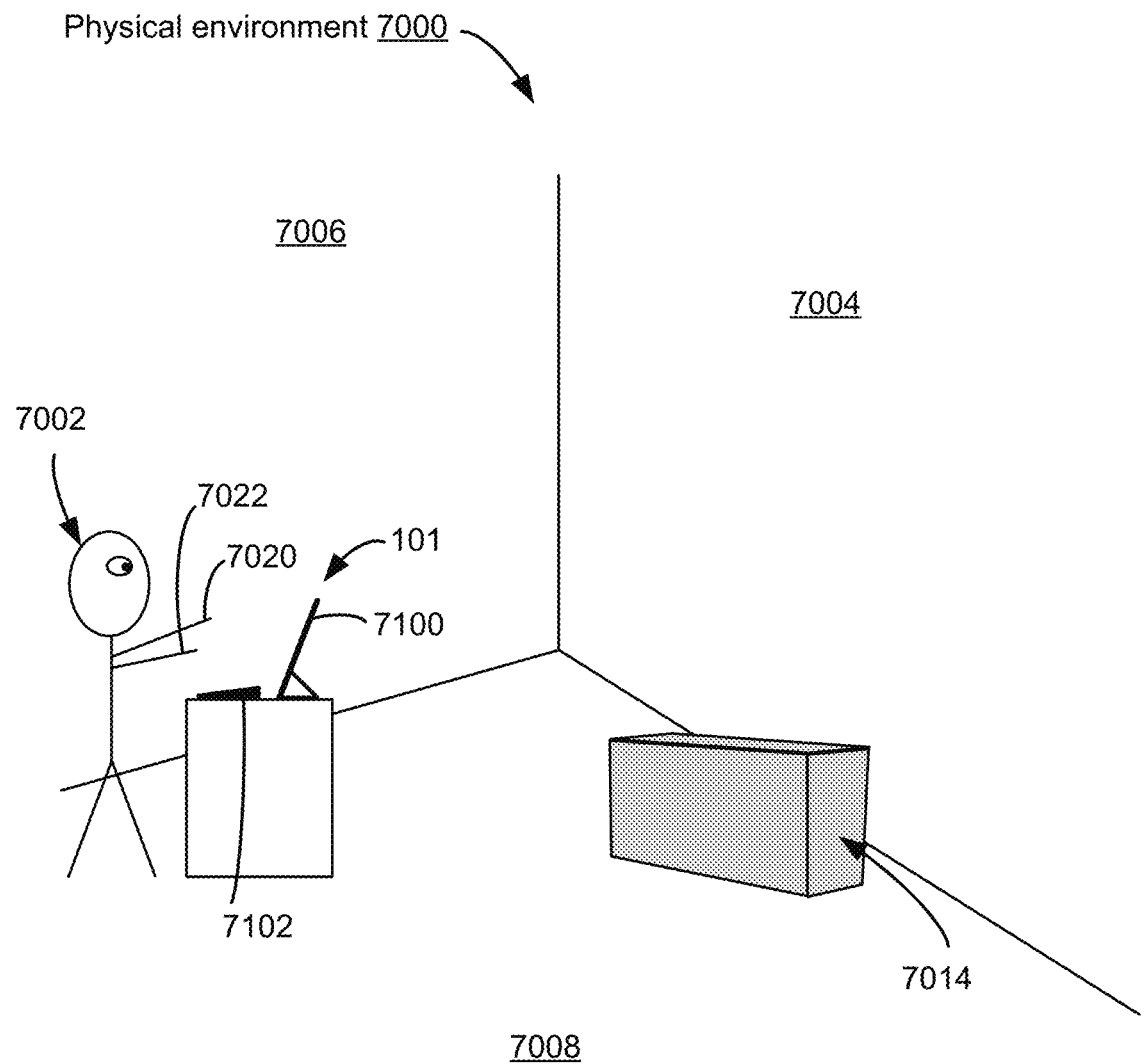

FIG. 7A illustrates an example physical environment 7000 that includes a user 7002 interacting with a computer system 101. Physical environment 7000 includes a physical object 7014, physical walls 7004 and 7006, and a physical floor 7008. Computer system 101 is positioned in front of user 7002, such that user 7002's left hand 7020 and right hand 7022 are free to interact with computer system 101. Computer system 101 includes or is in communication with a display generation component 7100 and trackpad 7102 (e.g., representing an input surface, such as a touch-sensitive surface, or a surface that is not touch-sensitive, where inputs via the non-touch-sensitive surface (or via a touch-sensitive surface that is not being used to detect touch inputs) are detected via one or more sensors that track the location and/or movement of the inputs (e.g., optical sensors tracking the user's hands and/or fingers relative to the non-sensitive surface, such as by tracking movement of the user's hands on a desk, table, or on another portion of the user's body such as their leg or arm)).

As shown in the examples in FIGS. 7A-7K, display generation component 7100 of computer system 101 is a touchscreen positioned in front of user 7002. In some embodiments, the display generation component of computer system 101 is a head-mounted display worn on user 7002's head (e.g., what is shown in FIGS. 7A-7K as being visible via display generation component 7100 of computer system 101 corresponds to user 7002's field of view when wearing a head-mounted display 7100a (FIG. 7C1)). In some embodiments, the display generation component is a standalone display, a projector, or another type of display. In some embodiments, the computer system is in communication with one or more input devices, including cameras or other sensors and input devices that detect movement of the user's hand(s), movement of the user's body as whole, and/or movement of the user's head in the physical environment. In some embodiments, the one or more input devices detect the movement and the current postures, orientations, and positions of the user's hand(s), face, and/or body as a whole. In some embodiments, user inputs are detected via a touch-sensitive surface or touchscreen. In some embodiments, the one or more input devices include an eye tracking component that detects location and movement of the user's gaze. In some embodiments, the display generation component, and optionally, the one or more input devices and the computer system, are parts of a head-mounted device that moves and rotates with the user's head in the physical environment, and changes the viewpoint of the user in a three-dimensional environment provided via the display generation component. In some embodiments, the display generation component is a heads-up display that does not move or rotate with the user's head or the user's body as a whole, but, optionally, changes the viewpoint of the user in the three-dimensional environment in accordance with the movement of the user's head or body relative to the display generation component. In some embodiments, the display generation component (e.g., a touchscreen) is optionally moved and rotated by the user's hand relative to the physical environment or relative to the user's head, and changes the viewpoint of the user in the three-dimensional environment in accordance with the movement of the display generation component relative to the user's head or face or relative to the physical environment.

In some embodiments, one or more portions of a view of a three-dimensional environment that is visible to user 7002 via display generation component 7100 (e.g., and/or HMD 7100*a*) are digital passthrough portions that include representations of corresponding portions of physical environment 7000 captured via one or more image sensors of computer system 101. In some embodiments, one or more portions of the view of a three-dimensional environment that is visible to user 7002 via display generation component 7100 are optical passthrough portions, in that user 7002 can see one or more portions of physical environment 7000 through one or more transparent or semi-transparent portions of display generation component 7100 (e.g., and/or HMD 7100*a*).

Figure 7B:
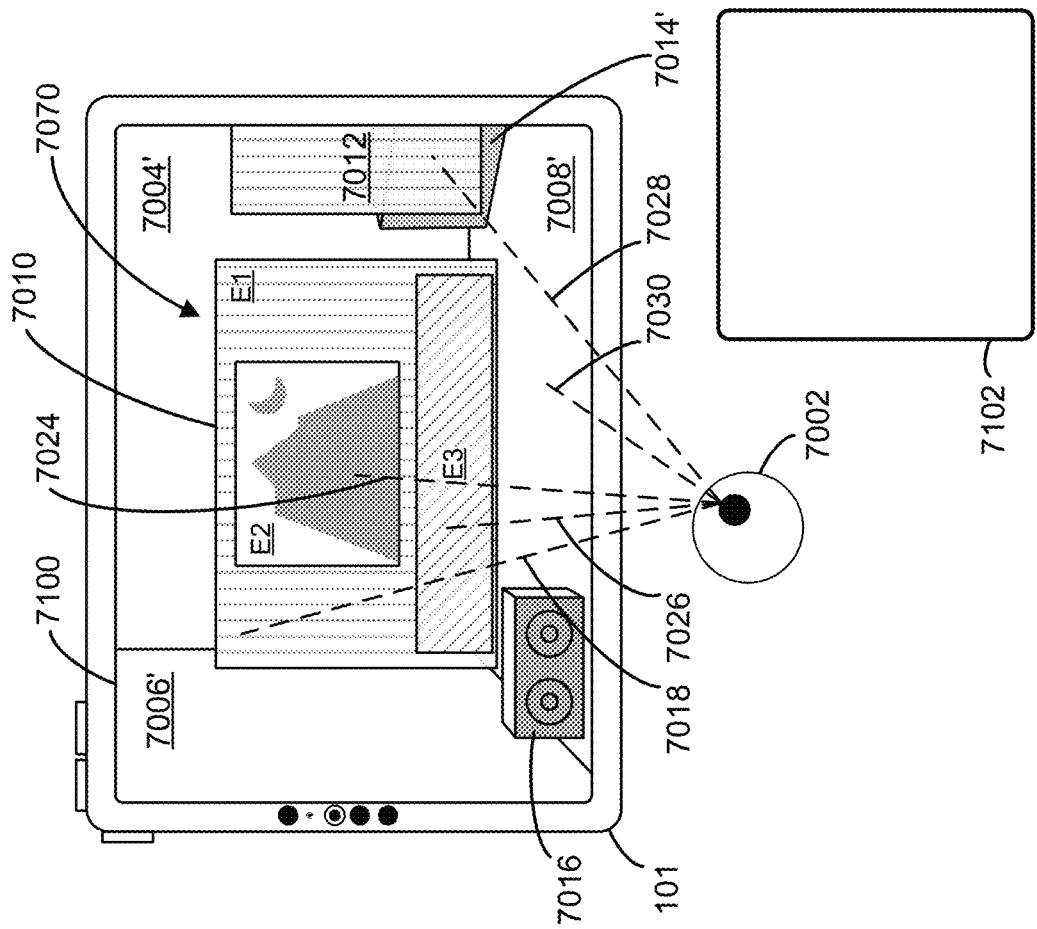

FIG. 7B illustrates a view of a three-dimensional environment that is visible to user 7002 via display generation component 7100 (e.g., and/or HMD 7100*a*) of computer system 101. The three-dimensional environment of FIG. 7B optionally includes representations of objects in a physical environment such as physical environment 7000 (e.g., as captured by one or more cameras of computer system 101) or optical views of objects in the physical environment (e.g., as visible through one or more transparent or semi-transparent portions of display generation component 7100). For example, in FIG. 7B, the three-dimensional environment includes representation (or optical view) 7004' of wall 7004 of FIG. 7A (also called wall 7004' for ease of reference), representation (or optical view) 7006' of wall 7006 of FIG. 7A (also called wall 7006' for ease of reference), representation (or optical view) 7008' of physical floor 7008 of FIG. 7A (also called floor 7008' for ease of reference), and representation (or optical view) 7014' of physical box 7014 of FIG. 7A (also called box 7014' for ease of reference). In addition, the three-dimensional environment includes one or more computer-generated objects, also called virtual objects, displayed via display generation component 7100, such as speaker 7016 (e.g., which is not a representation or optical view of a physical speaker in physical environment 7000), and window 7010 and window 7012 (e.g., which are not representations or optical views of physical elements in physical environment 7000). In some embodiments, window 7010 corresponds to a user interface of a software application executing on computer system 101 (e.g., an email application, a web browser, a messaging application, a maps application, or other software application). Likewise, in some embodiments, window 7012 corresponds to a user interface of a software application executing on computer system 101 (e.g., an email application, a web browser, a messaging application, a maps application, or other software application), optionally of the same application or a different application from that of window 7010. In the example of FIG. 7B, window 7010 includes a plurality of elements such as element E1 (e.g., a background of user interface 7010), element E2 (e.g., content displayed in window 7010), and element E3 (e.g., a control or other activatable element for performing an operation in window 7010).

FIG. 7B also illustrates multiple different scenarios in which user 7002 is gazing at a location in the three-dimensional environment (e.g., looking at different locations at different times). Dashed line 7018 represents user 7002 gazing at a location in element E1 of window 7010. Dashed line 7024 represents user 7002 gazing at a location in element E2 of window 7010. Dashed line 7026 represents user 7002 gazing at a location in element E3 of window 7010. Dashed line 7028 represents user 7002 gazing at a location in window 7012. Dashed line 7030 represents user 7002 gazing at a location on floor 7008'. In FIG. 7B, an input is not being detected on trackpad 7102 (e.g., no input is shown on trackpad 7102). The dashed elements (e.g., lines, outlines, or the like) described herein with reference to FIGS. 7B-7K are included in FIGS. 7B-7K for illustrative purposes and optionally not displayed via display generation component 7100.

FIG. 7C (e.g., FIGS. 7C1-7C3) illustrates input 7032 (e.g., a touch input) detected on trackpad 7102. Input 7032 is detected while user 7002's gaze is directed to a location in element E2 of window 7010 (e.g., indicated by dashed line 7024). In response to detecting input 7032, computer system 101 displays cursor 7034 at the location in element E2 to which user 7002's gaze is directed when input 7032 is detected (e.g., which is a valid location for displaying a cursor). In some embodiments, had user 7002's gaze been directed to another location in the environment (e.g., another valid cursor location, such as one of the locations indicated by dashed lines 7018, 7026, and 7028 in FIG. 7B) when input 7032 was detected, computer system 101 would have displayed cursor 7034 at the other location instead of at the location in element E2 shown in FIG. 7C.

In some embodiments, display generation component 7100 of computer system 101 comprises a head mounted display (HMD) 7100*a*. For example, as illustrated in FIG. 7C1 (e.g., and FIGS. 8C1-8D1, 9B1 and 10E1), the head mounted display 7100*a* includes one or more displays that display a representation of a portion of the three-dimensional environment 7000' that corresponds to the perspective of the user, while an HMD typically includes multiple displays including a display for a right eye and a separate display for a left eye that display slightly different images to generate user interfaces with stereoscopic depth, in the figures a single image is shown that corresponds to the image for a single eye and depth information is indicated with other annotations or description of the figures. In some embodiments, HMD 7100*a* includes one or more sensors (e.g., one or more interior- and/or exterior-facing image sensors 314), such as sensor 7101*a*, sensor 7101*b* and/or sensor 7101*c* for detecting a state of the user, including facial and/or eye tracking of the user (e.g., using one or more inward-facing sensors 7101*a* and/or 7101*b*) and/or tracking hand, torso, or other movements of the user (e.g., using one or more outward-facing sensors 7101*c*). In some embodiments, HMD 7100*a* includes one or more input devices that are optionally located on a housing of HMD 7100*a*, such as one or more buttons, trackpads, touchscreens, scroll wheels, digital crowns that are rotatable and depressible or other input devices. In some embodiments input elements are mechanical input elements, in some embodiments input elements are solid state input elements that respond to press inputs based on detected pressure or intensity. For example, in FIG. 7C1 HMD 7100*a* includes one or more of button 701, button 702 and digital crown 703 for providing inputs to HMD 7100*a*. It will be understood that additional and/or alternative input devices may be included in HMD 7100*a*.

FIG. 7C2 (e.g., and FIGS. 9B2 and 10E2) illustrates a top-down view of the user 7002 in the physical environment 7000. For example, the user 7002 is wearing HMD 7100*a*, such that trackpad 7102 is physically present within the physical environment 7000 behind the display of HMD 7100*a*, and optionally in front of the box 7014 (e.g., where the representation of box 7014' is displayed as farther away from the viewpoint of the user than the representation of trackpad 7102').

FIG. 7C1 illustrates an alternative display generation component of the computer system than the display illustrated in FIGS. 7A-7C and 7D-7K. It will be understood that the processes, features and functions described herein with reference to the display generation component 7100 described in FIGS. 7A-7C and 7D-7K are also applicable to HMD 7100a, illustrated in FIG. 7C1. In some embodiments, the trackpad 7102 (e.g., and/or the user's hand) is positioned, in the physical environment, at a location that is within the field of view of the one or more sensors of HMD 7100a (e.g., outside of the field of view of the user), and a representation of trackpad 7102' (e.g., a passthrough representation and/or a virtualized representation) (e.g., and/or a representation of the user's hand) is displayed in the user interface 7050, as illustrated in FIG. 7C1 (e.g., and FIGS. 8C1-8D1, 9B1 and 10E1). In some embodiments, the trackpad 7102 (e.g., and/or the user's hand) is not positioned at a location that is within the field of view of the one or more sensors of HMD 7100a (e.g., not within the field of view of the user), such that a representation of trackpad 7102' (e.g., and/or a representation of the user's hand) is not displayed in the user interface 7050.

Figure 7E:
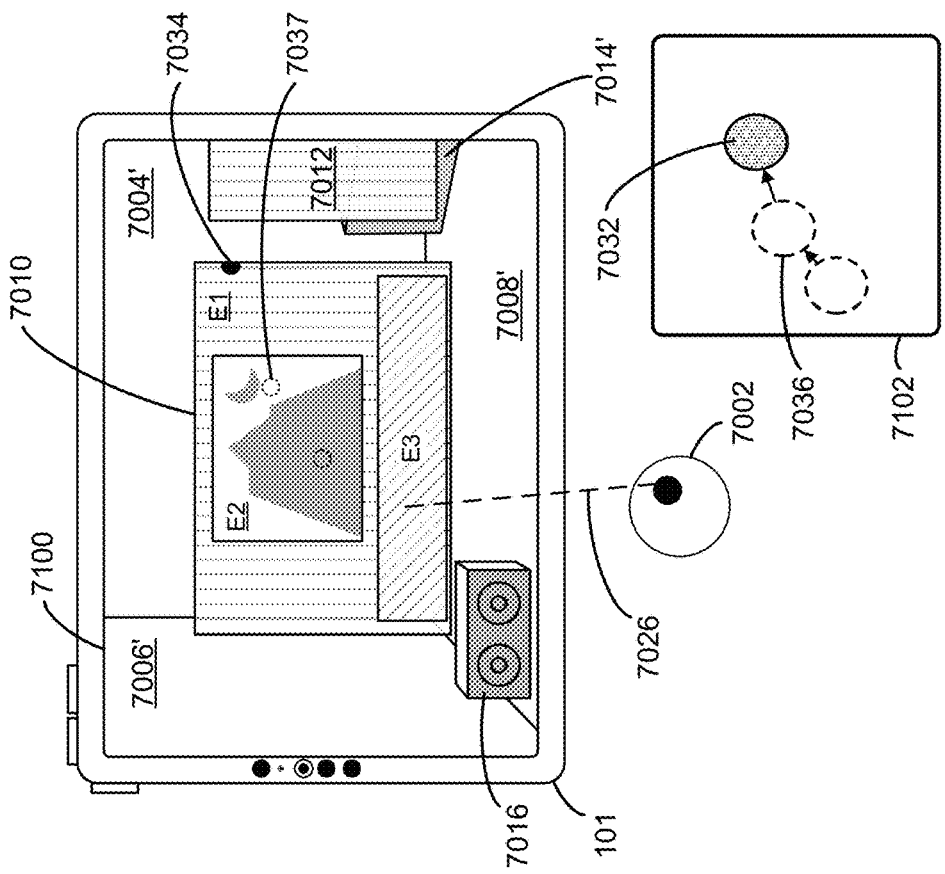
Figure 7D:
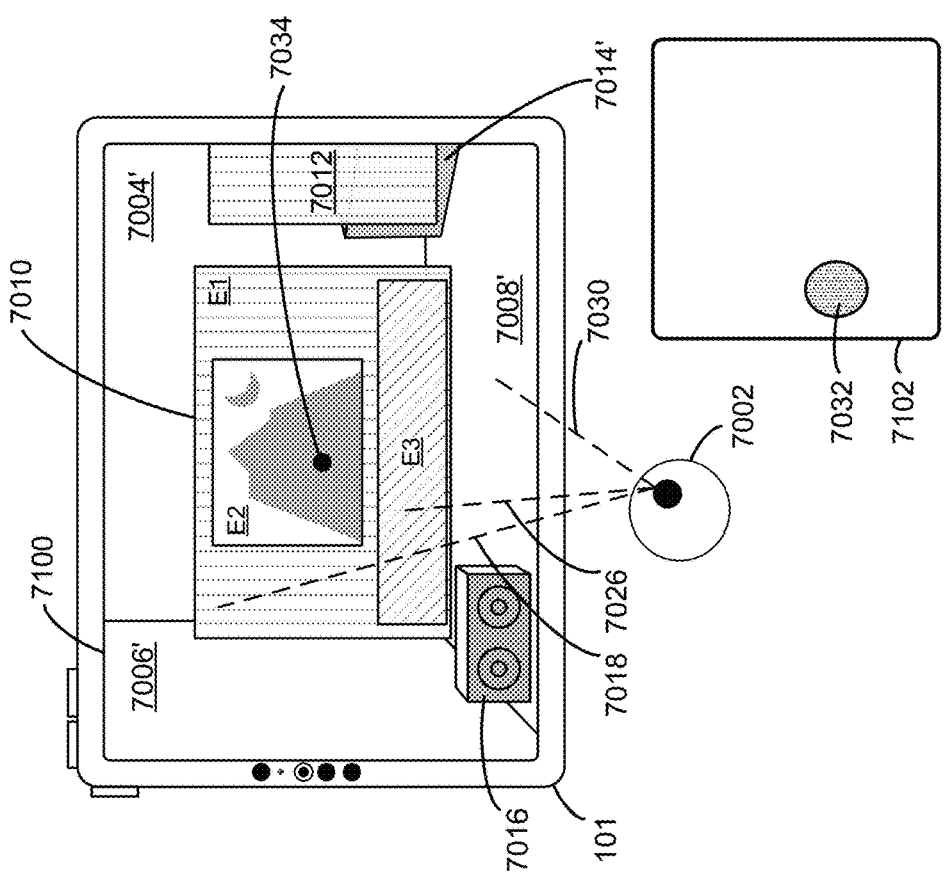

FIG. 7D illustrates multiple different scenarios in which user 7002 is gazing at a location in the three-dimensional environment (e.g., looking at different locations at different times) while input 7032 continues to be detected on trackpad 7102 (e.g., multiple examples of transitions from FIG. 7C). Dashed line 7018 represents user 7002 gazing at a location in element E1 of window 7010. Dashed line 7026 represents user 7002 gazing at a location in element E3 of window 7010. Dashed line 7030 represents user 7002 gazing at a location on floor 7008'. In FIG. 7D, input 7032 is maintained at the same location on trackpad 7102 as in FIG. 7C. Accordingly, even though user 7002's gaze has moved to a different location (or a sequence of different locations) such as the indicated locations in element E1, element E3, and/or on floor 7008' in the three-dimensional environment, cursor 7034 is maintained at the same location in the three-dimensional environment as in FIG. 7C (e.g., because input 7032 has not moved along trackpad 7102).

FIG. 7E illustrates that input 7032, while being maintained on trackpad 7102, has moved along trackpad 7102 from the location of input 7032 in FIG. 7D (e.g., an initial contact location), through an intermediate contact location 7036, to a current contact location in FIG. 7E. In response to the movement of input 7032 along trackpad 7102, cursor 7034 is moved in window 7010 accordingly. For example, as input 7032 is moved with a first magnitude in a first direction from the location of input 7032 in FIG. 7D to intermediate location 7036, cursor 7034 is moved in window 7010 by a corresponding amount in a corresponding direction (e.g., in the first direction by a second magnitude that is the same, greater than, or less than the first magnitude of the movement of input 7032) (e.g., from the previous location of cursor 7034 as shown in FIG. 7D to intermediate cursor location 7037 in FIG. 7E, both locations being indicated by the dashed outlines that are included in FIG. 7E for illustrative purposes and optionally not displayed via display generation component 7100). In another example, as input 7032 is moved with a third magnitude in a second direction from intermediate location 7036 to the location of input 7032 in FIG. 7E, cursor 7034 is moved in window 7010 by a corresponding amount in a corresponding direction (e.g., in the second direction by a fourth magnitude that is the same, greater than, or less than the third magnitude of the movement of input 7032) (e.g., from intermediate cursor location 7037 to the current location of cursor 7034 as shown in FIG. 7E).

FIG. 7E also illustrates that while input 7032 continues to be detected on trackpad 7102, cursor 7034 is constrained to moving within window 7010. For example, although the movement of input 7032 with the third magnitude in the second direction corresponds to a request to move cursor 7034 by a respective amount in the second direction, because moving cursor 7034 by the respective amount would move cursor 7034 beyond the boundary of window 7010, cursor 7034 is moved by an amount less than the respective amount, to the boundary of window 7010. In addition, while cursor 7034 is displayed at the boundary of window 7010, a portion of cursor 7034 that is within the boundary of window 7010 continues to be displayed, whereas a portion of cursor 7034 that is beyond the boundary of window 7010 ceases to be displayed, such that cursor 7034 appears clipped or masked by the boundary of window 7010.

In some embodiments, as illustrated in FIG. 7E, cursor 7034 is moved in accordance with the movement of input 7032 along trackpad 7102 while input 7032 continues to be detected on trackpad 7102, independently of where user 7002's gaze is directed. For example, although user 7002 in FIG. 7E is gazing at a location in element E3 of window 7010 (e.g., indicated by dashed line 7026), cursor 7034 is not moved to (and not moved towards) element E3 during the movement of input 7032 shown in FIG. 7E. Even if user 7002 were to move their gaze to other locations in the three-dimensional environment, such as from element E2 to speaker 7016 in a direction opposite to the direction of movement of cursor 7034, cursor 7034 would still be moved in accordance with the movement of input 7032 along trackpad 7102 as shown in FIG. 7E rather than to or towards speaker 7016. Even if user 7002 were to gaze at a location in window 7012 during the movement of input 7032 shown in FIG. 7E, cursor 7034 would still be moved within window 7010.

Figure 7G:
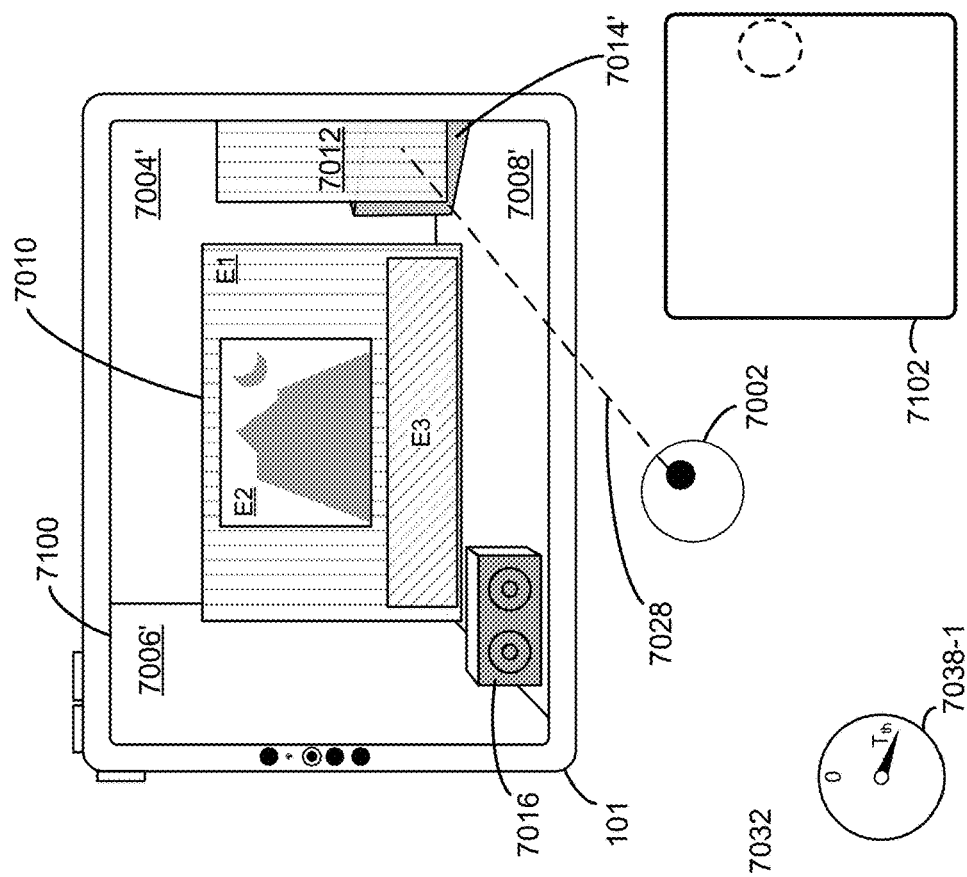
Figure 7F:
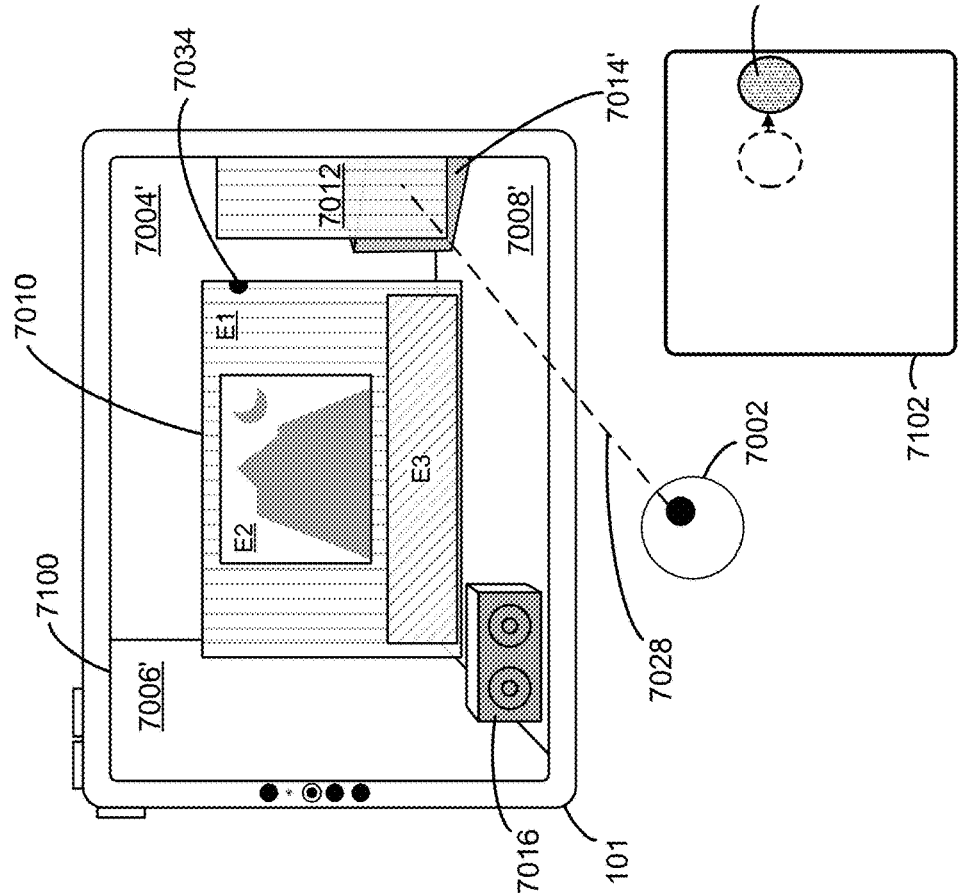

FIG. 7F illustrates further that while input 7032 continues to be detected on trackpad 7102, cursor 7034 is constrained to moving within window 7010 (e.g., a transition from FIG. 7E). For example, although input 7032 in FIG. 7F has moved further to the right, corresponding to a request to move cursor 7034 by a corresponding amount to the right, cursor 7034 is not moved and continues to be displayed at the same location as in FIG. 7E, because cursor 7034 is already at the boundary of window 7010. In addition, while input 7032 continues to be detected on trackpad 7102, cursor 7034 is not moved based on the location of user 7002's gaze; for example, even though user 7002's gaze in FIG. 7F is directed to a location in window 7012 (e.g., indicated by dashed line 7028), cursor 7034 in FIG. 7F is not moved to window 7012, nor is cursor 7034 moved beyond the boundary of window 7010. In FIG. 7F, like in FIG. 7E, while cursor 7034 is displayed at the boundary of window 7010, the portion of cursor 7034 that is within the boundary of window 7010 continues to be displayed, whereas the portion of cursor 7034 that is beyond the boundary of window 7010 continues to not be displayed, such that cursor 7034 continues to appear clipped or masked by the boundary of window 7010.

FIG. 7G illustrates liftoff of input 7032 from trackpad 7102 (e.g., indicated by the dashed outline on trackpad 7102 representing that input 7032 has ended) (e.g., a transition from FIG. 7F). In response to detecting the liftoff of input 7032 from trackpad 7102, computer system 101 ceases to display cursor 7034. In some embodiments, a cursor continues to be displayed for a threshold amount of time since the end of a corresponding input and automatically ceases to be displayed after the threshold amount of time has elapsed since the end of a corresponding input. For example, timer 7038-1 in FIG. 7G illustrates that an amount of time greater than a threshold amount of time $T_{th}$ has elapsed since the liftoff of input 7032 was detected (e.g., where the liftoff of input 7032 was detected at time t=0, and the current time in FIG. 7G is t>$T_{th}$). Accordingly, cursor 7034 has automatically ceased to be displayed.

FIG. 7H illustrates that, after cursor 7034 ceased to be displayed as shown in FIG. 7G, a subsequent input 7040 (e.g., a touch input) is detected on trackpad 7102. Input 7032 is detected while user 7002's gaze is directed to location 7042 in window 7012 (e.g., indicated by dashed line 7028) (e.g., the same location to which user 7002's gaze was directed in FIG. 7F). In response to detecting input 7040 (e.g., at an initial contact location 7040-1) on trackpad 7102 (e.g., in response to detecting the beginning of a new trackpad input) while user 7002's gaze is directed to location 7042, computer system 101 displays cursor 7034, initially at location 7042 (e.g., in accordance with location 7042 being a valid location for displaying a cursor). In some embodiments, because input 7040 is detected while cursor 7034 is not displayed, computer system 101 displays (or redisplays) cursor 7034 in response to detecting input 7040 at location 7042, optionally without regard to the most recent prior location at which cursor 7034 was displayed (e.g., in window 7010 as shown in FIG. 7F, or even if cursor 7034 had been displayed at a different location in window 7012). FIG. 7H also illustrates movement of input 7040 to the left along trackpad 7102 from initial contact location 7040-1 to a current contact location 7040-2. In accordance with the movement of input 7040 to the left, cursor 7034 is moved to the left in window 7012 (e.g., even though user 7002's gaze is still directed to location 7042). However, cursor 7034 is not moved to the left by the full amount requested by the movement of input 7040, because the movement of cursor 7034 is stopped when cursor 7034 reaches the boundary of window 7012. That is, cursor 7034 is constrained to moving within window 7012 while input 7040 continues to be detected on trackpad 7102 (e.g., analogously to cursor 7034 being constrained to moving within window 7010 during input 7032, as described herein with reference to FIGS. 7E-7F). While cursor 7034 is displayed at the boundary of window 7012, the portion of cursor 7034 that is within the boundary of window 7012 continues to be displayed, whereas the portion of cursor 7034 that is beyond the boundary of window 7012 ceases to be displayed, such that cursor 7034 appears clipped or masked by the boundary of window 7012 (e.g., similar to cursor 7034 in window 7010 in FIGS. 7E-7F).

FIG. 7I illustrates that user 7002's gaze has moved to a location on floor 7008' (e.g., indicated by dashed line 7030) (e.g., as a transition from FIG. 7H). In addition, computer system 101 detects liftoff of input 7040 from trackpad 7102 (e.g., indicated by dashed outline 7040-e on trackpad 7102 representing that input 7040 has ended) and a subsequent input 7044 (e.g., the beginning of a new input) on trackpad 7102. However, despite subsequent input 7044 being detected, cursor 7034 is not moved to the location on floor 7008' to which user 7002's gaze is directed, because the location on floor 7008' to which user 7002's gaze is directed is not a valid location for displaying a cursor, regardless of the amount of time that passes detecting liftoff of prior input 7040 on trackpad 7102 and detecting subsequent input 7044 on trackpad 7102. For example, timer 7038-2 in FIG. 7I illustrates that less than the threshold amount of time $T_{th}$ has elapsed since detecting the liftoff of input 7040, and accordingly, cursor 7034 continues to be displayed (e.g., because not enough time has passed for cursor 7034 to automatically cease to be displayed). However, because cursor 7034 cannot be moved to the invalid cursor location on floor 7008' to which user 7002's gaze is directed on detection of input 7044, cursor 7034 continues to be displayed in FIG. 7I at the same location at the boundary of window 7012 as in FIG. 7H. In some embodiments, as described herein in more detail with reference to FIGS. 8C, in response to detecting the liftoff of input 7040, computer system 101 moves cursor 7034 slightly (e.g., to the right) so that cursor 7034 is no longer clipped or masked by the boundary of window 7012, and cursor 7034 is fully visible next to and just within the boundary of window 7012.

In some embodiments, if more than the threshold amount of time $T_{th}$ had elapsed since detecting the liftoff of input 7040, computer 101 would have automatically ceased to display cursor 7034 after the threshold amount of time $T_{th}$ and would continue to not display cursor 7034 in response to initially detecting input 7044 while user 7002's gaze is at an invalid cursor location.

Figure 7K:
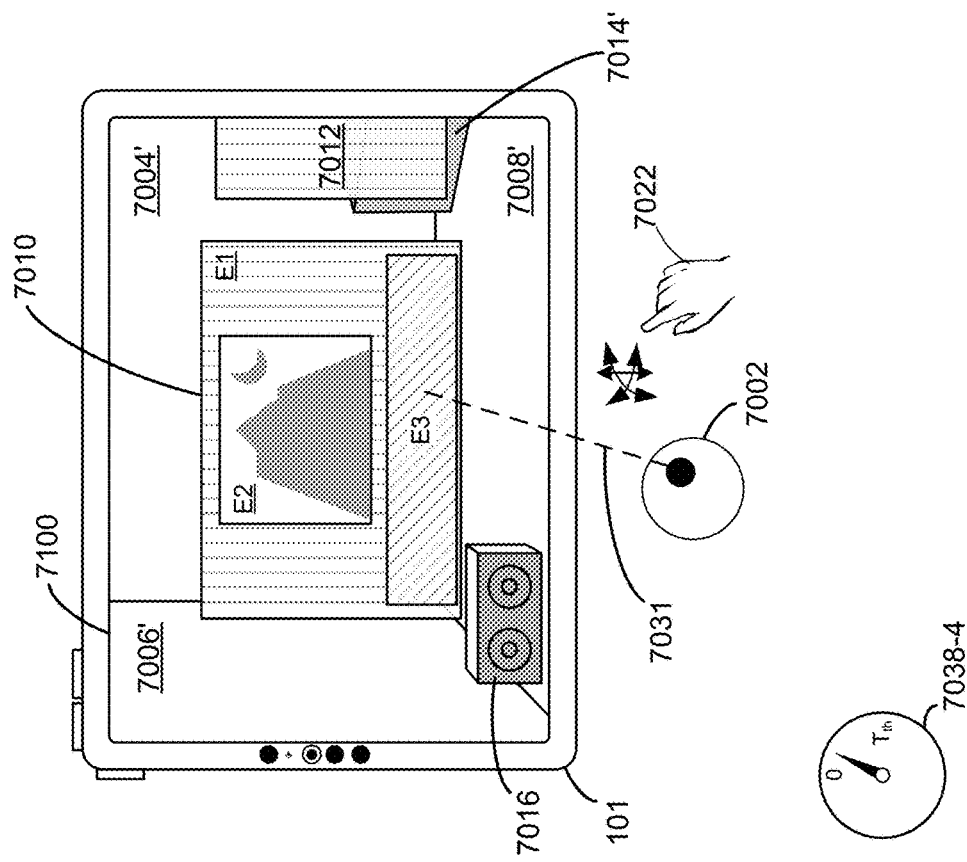
Figure 7J:
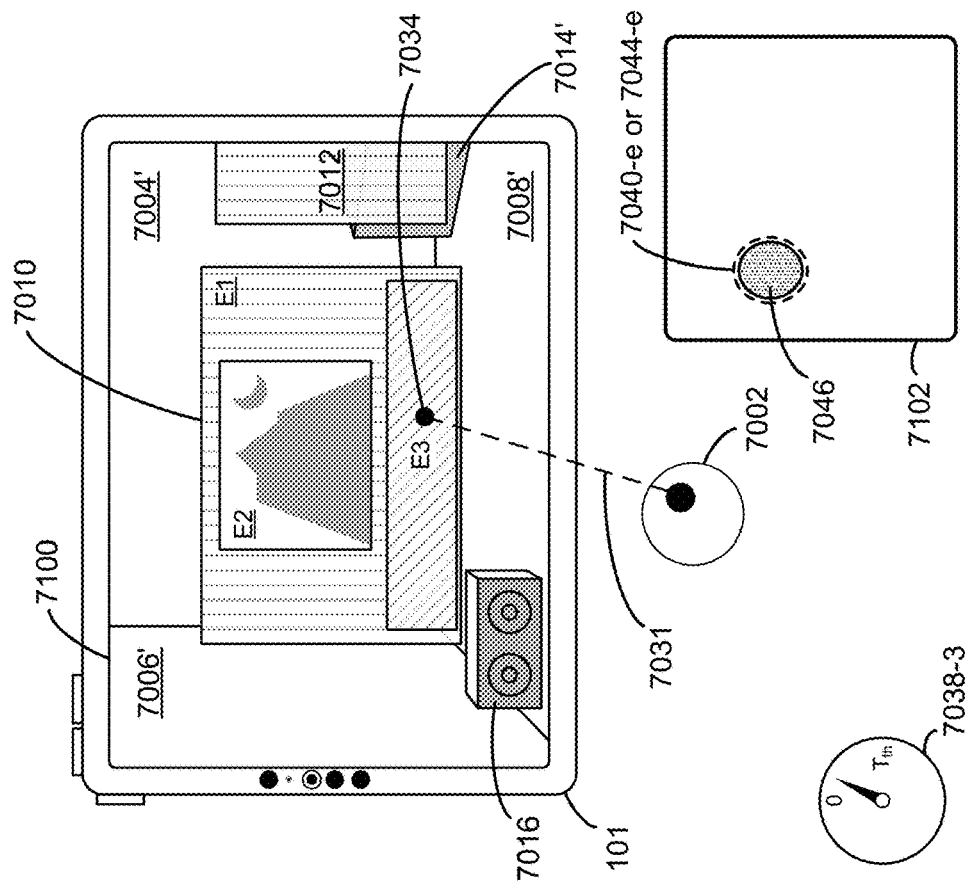

FIG. 7J illustrates that user 7002's gaze has moved to a location in element E3 of window 7010 (e.g., indicated by dashed line 7031) (e.g., as a transition from FIG. 7H or from FIG. 7I). In addition, computer system 101 detects liftoff of the prior input (e.g., input 7040 of FIG. 7H or input 7044 of FIG. 7I) from trackpad 7102 (e.g., indicated by the dashed outline labeled "7040-e or 7044-e" on trackpad 7102 representing that the prior input 7040 or 7044 has ended) and detects a subsequent input 7046 (e.g., the beginning of a new input) on trackpad 7102. In response to detecting input 7046 while user 7002's gaze is directed to a location in element E3 of window 7010 that is a valid cursor location, computer system 101 moves cursor 7034 to the location in element E3 to which user 7002's gaze is directed, regardless of the amount of time that passes detecting liftoff of the prior input (e.g., input 7040 or input 7044) on trackpad 7102 and detecting subsequent input 7046 on trackpad 7102. For example, timer 7038-3 in FIG. 7J illustrates that less than the threshold amount of time $T_{th}$ has elapsed since detecting the liftoff of the prior input (e.g., input 7040 or input 7044). Accordingly, cursor 7034 continues to be displayed (e.g., because not enough time has passed for cursor 7034 to automatically cease to be displayed), except that cursor 7034 is moved directly (e.g., jumped) to the cursor location in element E3 of window 7010 as shown in FIG. 7J, in response to the initial detection of input 7046.

In some embodiments, if more than the threshold amount of time $T_{th}$ had elapsed since detecting the liftoff of the prior input (e.g., input 7040 or input 7044), computer system 101 would have automatically ceased to display cursor 7034 after the threshold amount of time $T_{th}$ and would have redisplayed cursor 7034 at the location in element E3 to which user 7002's gaze is directed in response to initially detecting input 7046. Thus, the transition from FIG. 7H directly to FIG. 7J (e.g., skipping FIG. 7I) illustrates that although cursor 7034 is constrained to moving within window 7012 while a touch input (e.g., input 7040) continues to be detected even though the amount of movement of input 7040 to the left corresponds to a request to move cursor 7034 to window 7010 (FIG. 7H), cursor 7034 may in fact be moved to window 7010 if the touch input is lifted off and then replaced on trackpad 7102 (e.g., by ceasing to detect input 7040 and then detecting subsequent input 7046, even before the threshold amount of time $T_{th}$ has elapsed since ceasing to detect input 7040) (FIG. 7J).

If, while cursor 7034 was displayed in window 7012 (e.g., at the left boundary of window 7012 as in FIG. 7I), user 7002's gaze had been directed to a different location in window 7012 instead of to a location in window 7010 when the liftoff of the prior input followed by the contact of subsequent input 7046 were detected via trackpad 7102, cursor 7034 would not have been moved to the new location of user 7002's gaze in window 7012 (e.g., while continuing to be displayed, moving cursor 7034 within window 7012 would have required moving in accordance with movement of input 7046 on trackpad 7102, instead of cursor 7034 being jumped to user 7002's gaze location elsewhere in the same window as cursor 7034). In some embodiments, however, if more than the threshold amount of time $T_{th}$ had elapsed since detecting the liftoff of the prior input (e.g., input 7040 or input 7044), and computer system 101 had automatically ceased to display cursor 7034 after the threshold amount of time $T_{th}$, computer system 101 would redisplay cursor 7034 at the location in window 7012 to which user 7002's gaze is directed when input 7046 is detected (e.g., even though user 7002's gaze is directed to the same window in which cursor 7034 was most recently displayed).

While cursor 7034 is displayed at the location in element E3 of window 7010 shown in FIG. 7J, user 7002 is enabled to provide an input to perform an operation with respect to element E3. For example, if user 7002 were to provide a press input via trackpad 7102 (e.g., an increase in the intensity of the contact of input 7046, optionally to at least a threshold press input intensity threshold that is above a nominal contact detection intensity threshold), computer system 101 would perform an activation operation with respect to element E3 (e.g., pressing a button or otherwise activating a control).

FIG. 7K illustrates a transition from FIG. 7J in which user 7002 is performing a gesture using hand 7022 (e.g., an air gesture or other type of gesture), optionally to perform an operation with respect to element E3 to which user 7002's gaze is directed (e.g., an air pinch-and-release gesture to activate element E3, an air pinch-and-drag gesture to scroll the user interface displayed in window 7010, or other combination of air gesture and associated operation). Alternatively, the gesture by hand 7022 illustrated in FIG. 7K represents a chorded gesture performed on trackpad 7102 (e.g., a two-finger scroll gesture that includes two fingers in contact with trackpad 7102 and moving together in substantially the same direction along trackpad 7102 to scroll the user interface displayed in window 7010, a pinch (or depinch) gesture that includes two fingers in contact with trackpad 7102 and moving toward (or away from) each other to zoom the user interface displayed in window 7010, or other combination of touch gesture and associated operation). In response to detecting performance of the gesture by hand 7022, computer system 101 ceases to display cursor 7034 (e.g., even before the threshold amount of time $T_{th}$ has elapsed since ceasing to detect input 7046, as indicated by timer 7038-4, and in some embodiments even before ceasing to detect input 7046). In some embodiments, information about the gesture by hand 7022 is delivered to the application associated with window 7010 (or more specifically to software corresponding to element E3 of window 7010, optionally). In some embodiments, the information about the gesture by hand 7022 is delivered to software (e.g., an application) associated with the location to which user 7002's gaze is directed, without regard to the location at which cursor 7034 is displayed, when the gesture by hand 7022 is detected or at least initiated. For example, although cursor 7034 in FIG. 7J is displayed over the same window 7010 to which user 7002's gaze is directed and to whose associated application the information about the gesture by hand 7022 is delivered, the information about the gesture by hand 7022 would be delivered to the application associated with window 7010 (e.g., and not to window 7012) even if cursor 7034 were still displayed over window 7012 as in FIGS. 7H-7I. In another example, if, in a transition from FIG. 7J, user 7002 were to move their gaze to window 7012 and perform a chorded gesture on trackpad 7102 (e.g., while cursor 7034 continued to be displayed over window 7010), information about the chorded gesture would be delivered to the application associated with window 7012 (e.g., and not to window 7010). In other words, even if cursor 7034 is displayed in one window, user 7002 is enabled to simply direct their gaze to another window and begin performing a chorded gesture (e.g., a scroll or zoom gesture on trackpad 7102, for example) to quickly perform an associated operation (e.g., a scroll or zoom operation) with respect to the other window without having to first move cursor 7034 to the other window.

FIGS. 8A-8H illustrate examples of moving focus indicators across gaps between user interface regions in an environment, particularly in response to inputs provided using an input surface such as a touch-sensitive surface. The user interfaces in FIGS. 8A-8H are used to illustrate the processes described below, including the processes in FIG. 12.

Figure 8B:
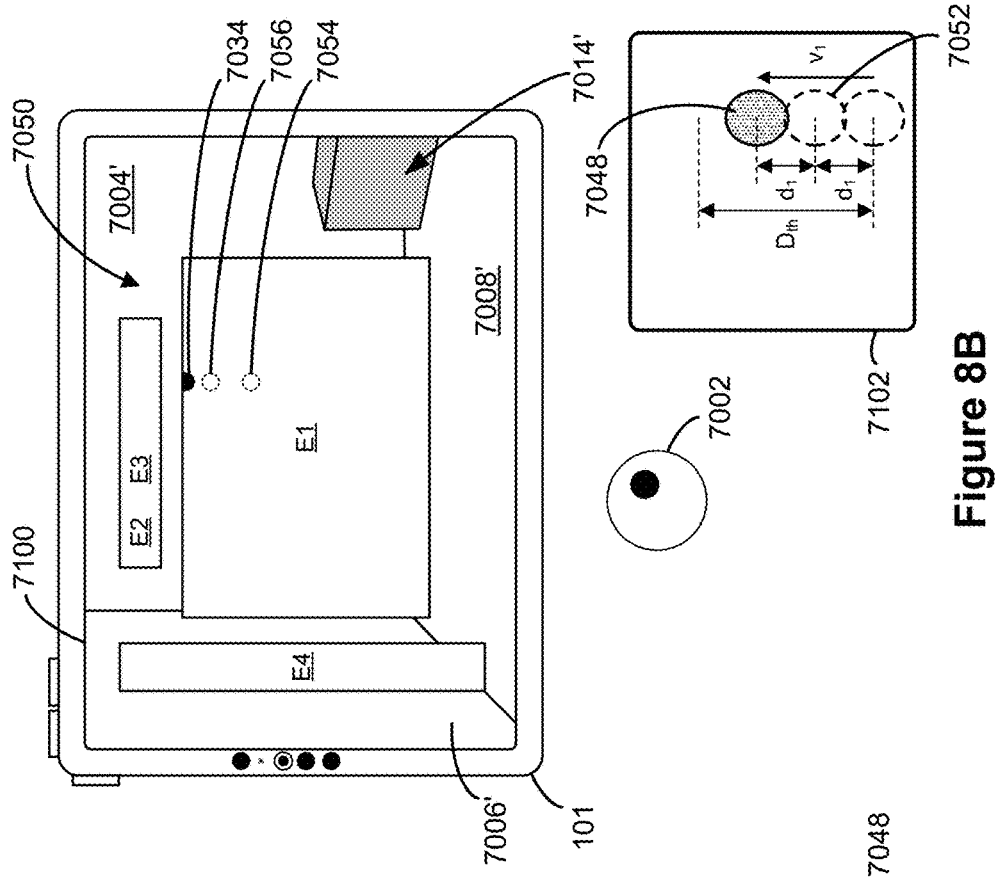
Figure 8A:
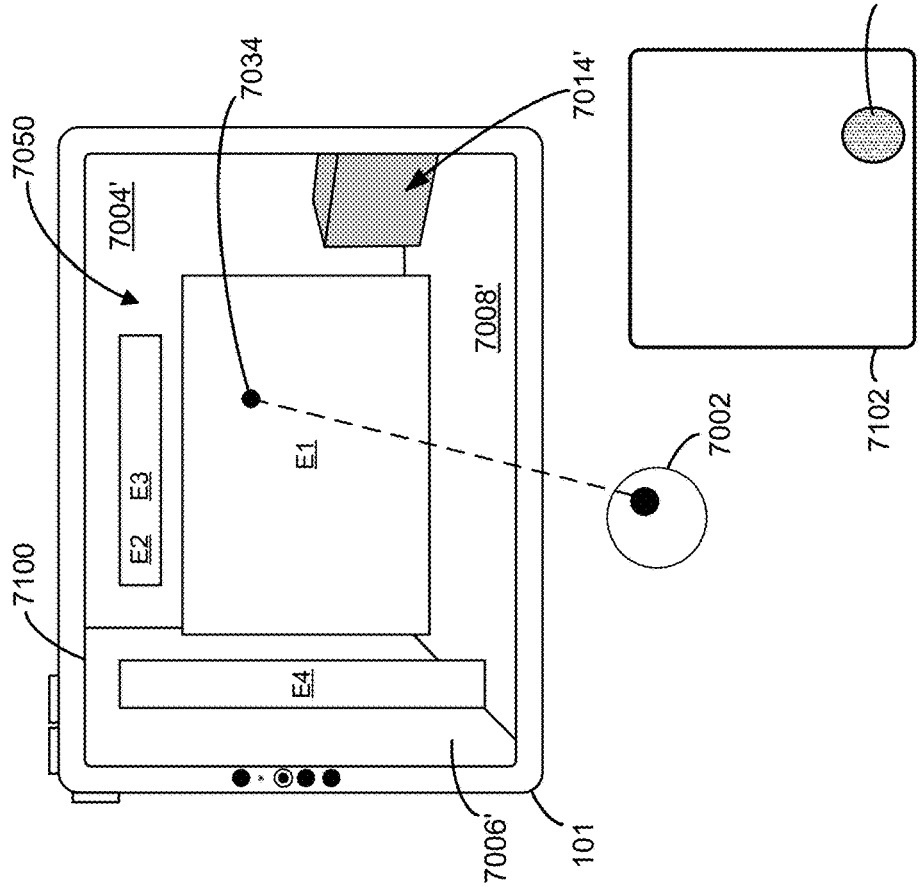

FIG. 8A illustrates a view of a three-dimensional environment that is visible to user 7002 via display generation component 7100 of computer system 101. In some embodiments, one or more portions of the view of the three-dimensional environment are digital passthrough portions that include representations of corresponding portions of physical environment 7000 (FIG. 7A) captured via one or more image sensors of computer system 101. In some embodiments, one or more portions of the view of the three-dimensional environment are optical passthrough portions, in that user 7002 can see one or more portions of physical environment 7000 through one or more transparent or semi-transparent portions of display generation component 7100. In FIG. 8A, the view of the three-dimensional environment that is visible includes wall 7004', wall 7006', floor 7008', and box 7014' (e.g., as captured by one or more cameras of computer system 101 or visible through one or more transparent or semi-transparent portions of display generation component 7100).

The view of the three-dimensional environment in FIG. 8A also includes user interface 7050 that includes a plurality of constituent regions, represented at least in part by: element E1, a first region of user interface 7050 (e.g., a main region or main window) (also called user interface region E1 for ease of reference); elements E2 and E3, together in a second region of user interface 7050 (e.g., elements in a toolbar, menu bar, or navigation bar, such as tabs, forward and/or back buttons, or other menu or navigation controls) (also called user interface region E2-E3 for ease of reference); and element E4, a third region of user interface 7050 (e.g., another toolbar, menu bar, navigation bar, or other set of controls, including for example tabs, forward and/or back buttons, scrollbars, or other menu or navigation controls) (also called user interface region E4 for ease of reference). User interface region E1 is separated from user interface region E2-E3 by a gap, above user interface region E1 and below user interface region E2-E3, that is optionally not part of user interface 7050 and in which one or more other aspects of the three-dimensional environment (e.g., a view of a portion of wall 7004') are optionally displayed. Similarly, user interface region E1 is also separated from user interface region E4 by a gap, to the left of user interface region E1 and to the right of user interface region E4, that is optionally not part of user interface 7050 and in which one or more other aspects of the three-dimensional environment (e.g., a view of portions of wall 7006' and floor 7008') are optionally displayed.

User interface 7050 is optionally a user interface of an application executing on computer system 101. In some circumstances, user interface 7050 is a more schematic view of an application user interface that is represented in a different way as window 7010 or window 7012 in FIGS. 7B-7K and 10A-10E (e.g., user interface 7050 exhibits analogous behavior to window 7010 and/or window 7012 as described herein with reference to FIGS. 7B-7K and 10A-10E). For example, element E1 of user interface 7050 in FIG. 8A optionally corresponds to element E1 of window 7010 in FIG. 7B. As shown in the examples in FIGS. 8A-8H, content that is visible via display generation component 7100 of computer system 101 is displayed on a touchscreen positioned in front of user 7002. In some embodiments, display generation component 7100 of computer system 101 is a head-mounted display worn on user 7002's head (e.g., what is shown in FIGS. 8A-8H as being visible via display generation component 7100 of computer system 101 corresponds to user 7002's field of view when wearing a head-mounted display).

In FIG. 8A, user 7002's gaze is directed to a location in element E1 of user interface 7050, a valid cursor location, and computer system 101 meanwhile has detected input 7048 (e.g., a touch input) on trackpad 7102. Accordingly, cursor 7034 is displayed at the location to which user 7002's gaze is directed.

FIG. 8B illustrates that the amount of movement of a cursor decreases as the cursor is moved toward a boundary of a first user interface region that is separated by a gap from a second user interface region, while the movement of the input (or the movement of the cursor) has not met a threshold amount of movement (e.g., a threshold distance $D_{th}$ and/or a threshold velocity $V_{th}$) required in order for the cursor to be moved across the gap from the first user interface region directly to the second user interface region. In particular, FIG. 8B shows that input 7048 has moved upward along trackpad 7102, from the location of input 7048 in FIG. 8A (e.g., an initial contact location), through an intermediate contact location 7052, to a current contact location in FIG. 8B. In response to the movement of input 7048 along trackpad 7102, cursor 7034 is moved in user interface region E1 accordingly. For example, as input 7048 is moved upward by a first distance $d_1$ from the location of input 7048 in FIG. 8A to intermediate location 7052, cursor 7034 is moved upward in user interface region E1 by a corresponding second distance (e.g., the same, greater than, or less than the first distance $d_1$) from location 7054 (e.g., the previous location of cursor 7034 as shown in FIG. 8A) to location 7056 (e.g., an intermediate cursor location corresponding to intermediate location 7052). However, as input 7048 is moved further upward, again by the first distance $d_1$, from intermediate location 7052 to the location of input 7048 in FIG. 8B, cursor 7034 is moved upward in user interface region E1 by a third distance that is less than the second distance, instead of being moved by the second distance. For example, cursor 7034 is moved upward in user interface region E1 from location 7056 (e.g., the intermediate cursor location) to the current location of cursor 7034 shown in FIG. 8B, and the distance between the current location of cursor 7034 in FIG. 8B and location 7056 is smaller than the distance between location 7056 and location 7054. Despite input 7048 in FIG. 8B having moved by twice the distance $d_1$ from the initial location of input 7048 (FIG. 8A), because the total magnitude of movement of input 7048 is less than a threshold distance an, cursor 7034 is not moved from user interface region E1 across the gap to user interface region E2. In some embodiments, cursor 7034 is alternatively or additionally not moved from user interface region E1 across the gap to user interface region E2 because the velocity $v_1$ of the movement of input 7048 is less than a threshold velocity $V_{th}$.

In addition, the movement of input 7048 to the current location of input 7048 in FIG. 8B corresponds to a request to move cursor 7034 to the boundary of user interface region E1. While cursor 7034 is displayed at the boundary of user interface region E1, a portion of cursor 7034 that is within the boundary of user interface region E1 continues to be displayed, whereas a portion of cursor 7034 that is beyond the boundary of user interface region E1 ceases to be displayed, such that cursor 7034 appears clipped or masked by the boundary of user interface region E1 (e.g., user interface region E1 behaves analogously to window 7010 of FIGS. 7E-7F and window 7012 of 7H-7I in this aspect).

FIG. 8C (e.g., FIGS. 8C1-8C2) (e.g., where a user interface analogous to the user interface described in FIG. 8C2 is shown on HMD 7100a in FIG. 8C1) illustrate embodiments in which an end of a corresponding input, detected while a cursor is masked by the boundary of a user interface region, causes the cursor to be moved slightly so as to be fully visible just within the boundary of the user interface region (e.g., the cursor appears to bounce back into the user interface region). Specifically, FIG. 8C (e.g., FIGS. 8C1-8C2) illustrate that, in response to detecting the liftoff of input 7048 (e.g., indicated by the dashed outline on trackpad 7102) (e.g., a transition from FIG. 8B), computer system 101 moves cursor 7034 slightly (e.g., downward) so that cursor 7034 is no longer clipped or masked by the boundary of user interface region E1, and cursor 7034 is fully visible below and just within the boundary of user interface region E1.

FIG. 8D (e.g., FIGS. 8D1-8D2) (e.g., where a user interface analogous to the user interface described in FIG. 8D2 is shown on HMD 7100a in FIG. 8D1) illustrates an alternate transition from FIG. 8B (e.g., skipping FIG. 8C) in which input 7048 continues to be detected on trackpad 7102 and continues to move upward from the location of input 7048 in FIG. 8B to the current location of input 7048 in FIGS. 8D, such that input 7048 has moved by at least the threshold distance $D_{th}$ required in order for cursor 7034 to be moved across the gap from user interface region E1 directly to user interface region E2-E3. While FIG. 8B shows that whether input 7048 has moved by at least the threshold distance $D_{th}$ is determined with respect to an initial contact location of input 7048 on trackpad 7102, in other embodiments, whether input 7048 has moved by at least the threshold distance $D_{th}$ is determined with respect to the location of input 7048 on trackpad 7102 when cursor 7034 first reaches the boundary of user interface region E1 (e.g., which could be the initial contact location of input 7048 on trackpad 7102 if cursor 7034 were already at the boundary of user interface region E1 when input 7048 on trackpad 7102 was detected). In addition, input 7048 moves with a velocity $v_2$. Because the total magnitude of movement of input 7048 in FIG. 8D (e.g., FIGS. 8D1-8D2) meets the threshold distance $D_{th}$, and/or because the velocity $v_2$ of the movement of input 7048 is at least the threshold velocity $V_{th}$, cursor 7034 is moved from the location of cursor 7034 at the boundary of user interface region E1 (as shown in FIG. 8B) past the gap directly to user interface region E2-E3, without being displayed within the gap between user interface regions E1 and E2-E3. In some embodiments, as illustrated in FIGS. 8D, when cursor 7034 is initially moved past the gap to user interface region E2-E3, cursor 7034 is moved to a location in user interface region E2-E3 at which cursor 7034 is fully visible (e.g., rather than appearing clipped or masked by the boundary of user interface region E2-E3. In FIGS. 8D, the location of cursor 7034 in user interface region E2-E3 is across the gap directly opposite the prior location of cursor 7034 in user interface region E1 (as shown in FIG. 8B) in a direction corresponding to the direction of movement of input 7048. For example, in accordance with input 7048 moving upward, cursor 7034 is moved upward in user interface 7050, without being moved to the left or right. In conjunction with moving cursor 7034 past the gap to user interface region E2-E3, computer system 101 optionally generates tactile output 7058. In contrast, a tactile output was optionally not generated in FIGS. 8B and 8C in accordance with cursor 7034 not being moved from user interface region E1 past a gap to a different user interface region.

Figure 8F:
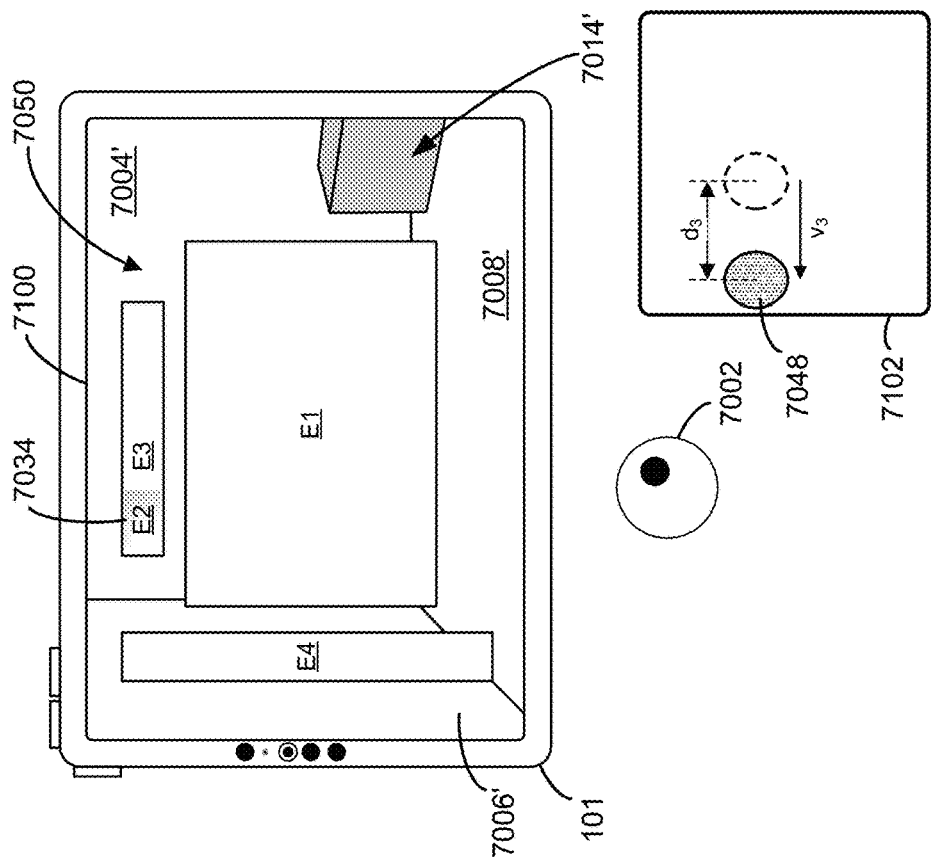
Figure 8E:
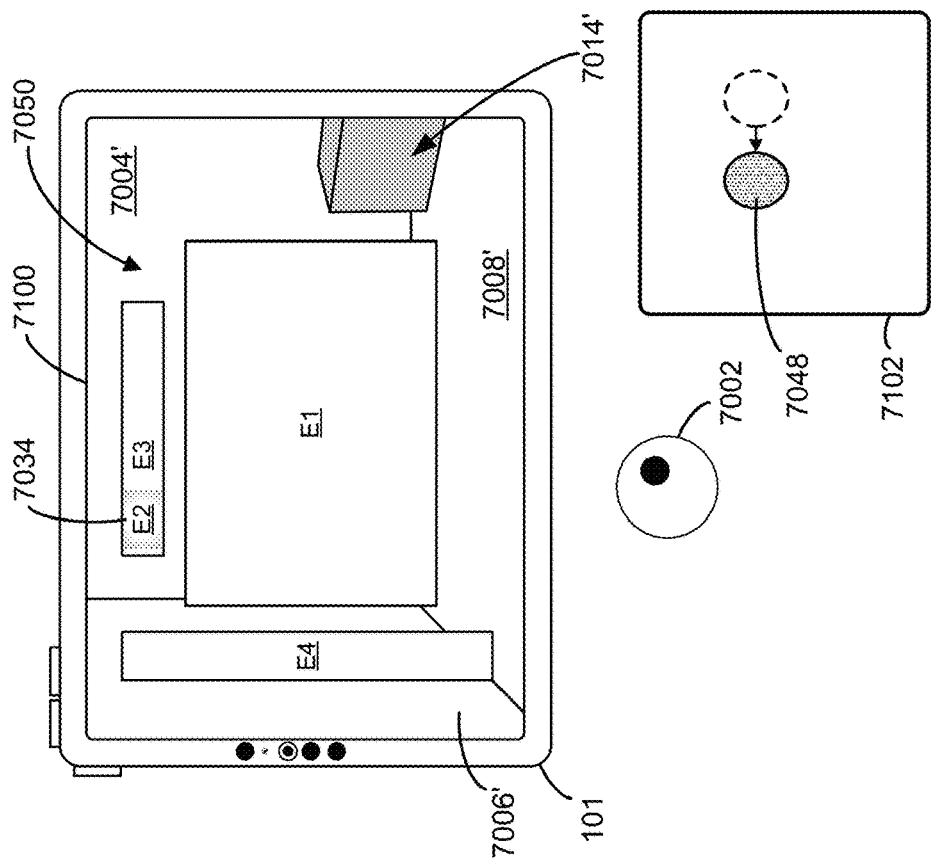

FIG. 8E illustrates that input 7048 has been moved to the left along trackpad 7102. Accordingly, cursor 7034 is moved to the left in user interface region E2-E3. However, cursor 7034 in FIG. 8E has a different appearance than in FIGS. 8A-8D. In particular, FIG. 8E illustrates embodiments in which, while cursor 7034 is positioned over an activatable control (e.g., a button, tab, menu item, toolbar element, or other activatable user interface element), cursor 7034 changes in appearance so as to visually emphasize the activatable control. For example, instead of being displayed as a circle (whether partially masked or not) as in FIGS. 8A-8D, cursor 7034 in FIG. 8E fills element E2 with a gradient. In some embodiments, as illustrated in FIG. 8E, a portion of the gradient fill that represents the current location of cursor 7034 (e.g., the location at which cursor 7034 with the appearance shown in FIGS. 8A-8D would have been displayed, and the location corresponding to the current location of user input 7048) is more visually emphasized than one or more other portions of the gradient fill within element E2 that are offset from the current location of cursor 7034. For example, in FIG. 8E, in accordance with cursor 7034 being positioned at or near the center of element E2, the center portion of element E2 is displayed brighter than peripheral portions of element E2.

In FIG. 8F, input 7048 has moved further to the left along trackpad 7102 than in FIG. 8E. Accordingly, cursor 7034 is moved further to the left in user interface region E2-E3, optionally to a leftmost position in (e.g., at the left boundary of) user interface region E2-E3, and continues to be positioned over element E2, as indicated in FIG. 8F by the leftmost portion of element E2 being displayed brighter than other portions further to the right in element E2. In FIG. 8F, input 7048 has moved by a distance $d_3$ and moves with a velocity $v_3$. In some embodiments, however, even if an input moves by at least the threshold distance $D_{th}$ and/or with at least the threshold velocity $V_{th}$ in an attempt to move a corresponding cursor from one user interface region past a gap to another user interface region, the cursor is not moved past the gap if the gap is too wide (e.g., the distance between the user interface regions is too large, greater than a threshold distance $D_{gap}$). For example, as shown in FIG. 8F, cursor 7034 is not moved leftward from user interface region E2-E3 directly to user interface region E4 because the distance (e.g., even the shortest distance) between user interface region E2-E3 and user interface region E4 is greater than the threshold distance $D_{gap}$, even though cursor 7034 has moved by a distance $d_3$ that is at least the threshold $D_{th}$, and/or even though cursor 7034 moves with a velocity $v_3$ that is at least the threshold velocity $V_{th}$. Accordingly, in some embodiments the movement of cursor 7034 from user interface region E1 across the gap to user interface region E2-E3 in FIG. 8D is enabled because the width of the gap between user interface region E1 and user interface region E2-E3 is less than the threshold distance $D_{gap}$.

Figure 8H:
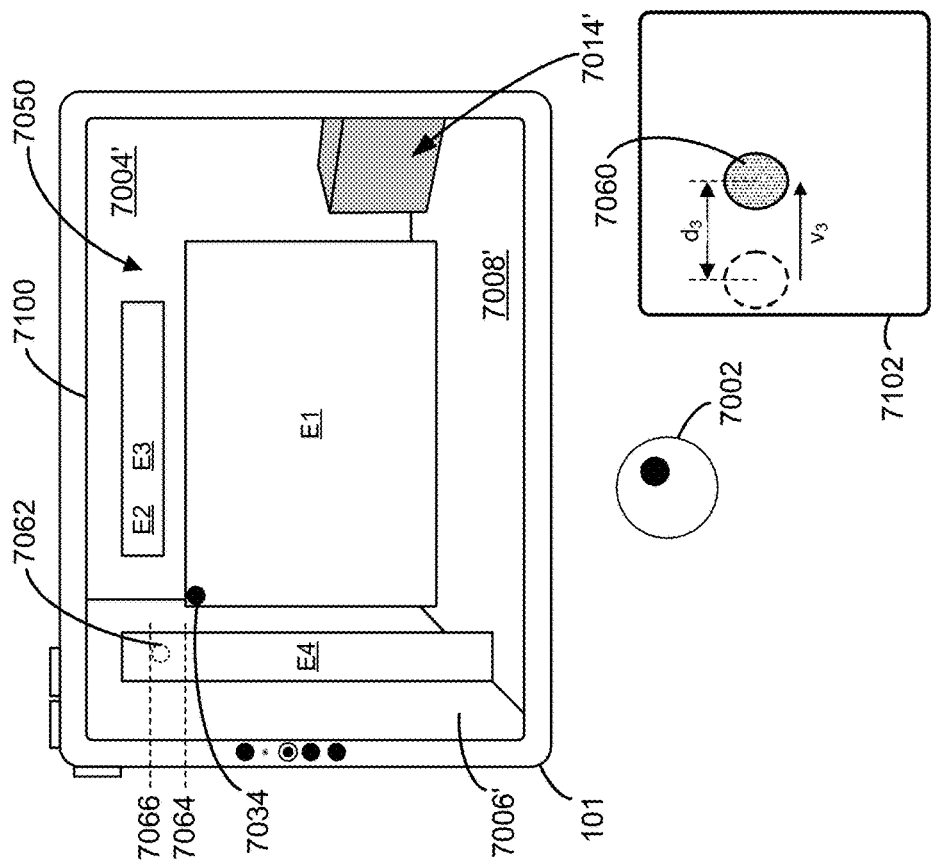
Figure 8G:
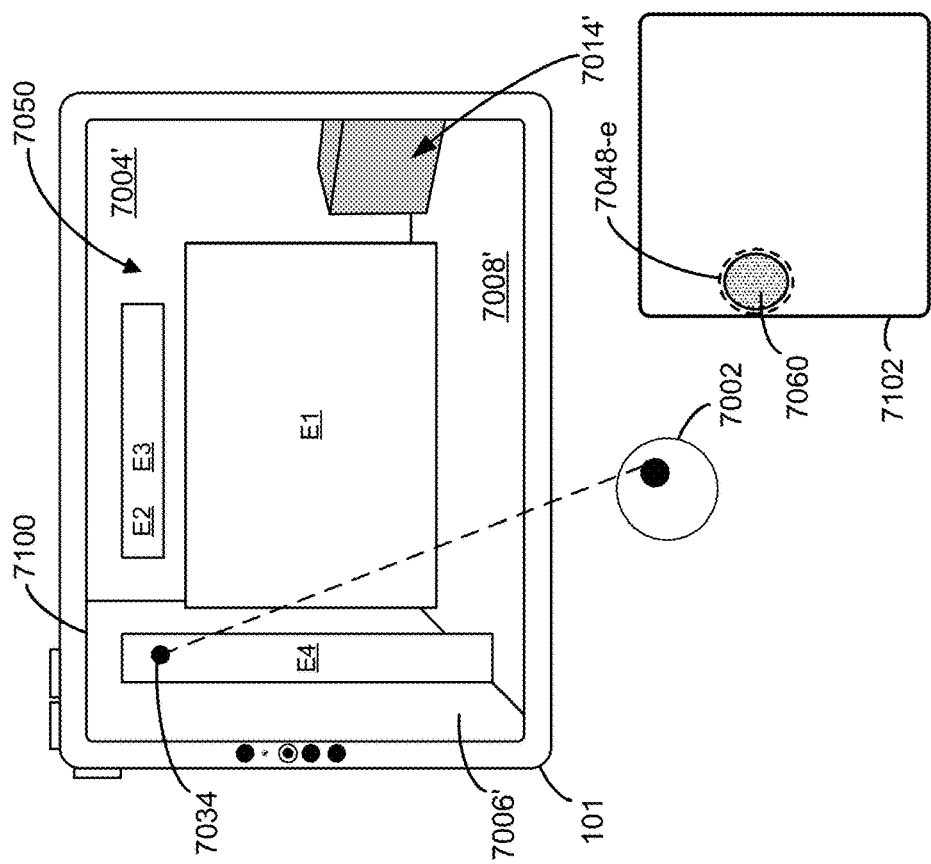

FIG. 8G illustrates that user 7002's gaze is directed to a location in user interface region E4 (e.g., at or near the location in user interface region E4 to which user 7002 was attempting to move cursor 7034 with input 7048 in FIG. 8F). In addition, in FIG. 8G, computer system 101 detects liftoff of input 7048 from trackpad 7102 (e.g., indicated by dashed outline 7048-e on trackpad 7102 representing that input 7048 has ended) and a subsequent input 7060 (e.g., the beginning of a new input) on trackpad 7102. In response to detecting input 7060 while user 7002's gaze is directed to a location in user interface region E4 (e.g., which is a valid cursor location), computer system 101 ceases to display cursor 7034 at the prior location of cursor 7034 in user interface region E2-E3 (e.g., corresponding to element E2, as shown in FIG. 8F) and displays cursor 7034 at the location in user interface region E4 to which user 7002's gaze is directed (e.g., without displaying cursor 7034 at any intervening locations), optionally regardless of the distance between user interface region E4 and user interface region E2-E3.

FIG. 8H illustrates moving a cursor from a first user interface region across a gap to a location in a second user interface region that is offset from the location of the cursor in the first user interface region. In FIG. 8G, the location of cursor 7034 in user interface region E4 is above the top edge of user interface region E1, as indicated in FIG. 8H as location 7062 with a dashed outline (which is included in FIG. 8H for illustrative purposes and optionally not displayed via display generation component 7100) representing the location of cursor 7034 in FIG. 7G and dashed line 7064 (which is included in FIG. 8H for illustrative purposes and optionally not displayed via display generation component 7100) representing the height of the top edge of user interface region E1, with location 7062 being above dashed line 7064 (e.g., beyond the top edge of user interface region E1). In addition, in FIG. 8G, the location of cursor 7034 in user interface region E4 is within a threshold distance $D_{offset}$ of the top edge of user interface region E1, as indicated in FIG. 8H as dashed line 7066 (which is included in FIG. 8H for illustrative purposes and optionally not displayed via display generation component 7100) delineating locations that are the threshold distance $D_{offset}$ above the top edge of user interface region E1 and corresponding dashed line 7064, with location 7062 being between dashed line 7064 and dashed line 7066.

FIG. 8H shows input 7060 moving to the right along trackpad 7102, corresponding to a request to move cursor 7034 to the right in user interface 7050. In response to detecting the movement of input 7060 to the right, by at least a distance $d_3$ and with a velocity $v_3$, where $d_3 > D_{th}$ and/or $v_3 > V_{th}$ so as to meet criteria for moving cursor 7034 across a gap between user interface regions, cursor 7034 is moved from location 7062, optionally first to the right in user interface region E4 until reaching the right edge of user interface region E4, across the gap between user interface region E4 and user interface region E1 to a location in user interface region E1 as shown in FIG. 8H. In some embodiments, computer system 101 is enabled to move cursor 7034 from user interface region E4 across the gap to user interface region E1 because the starting location 7062 of cursor 7034 is within the threshold distance $D_{offset}$ of a boundary of user interface region E1 (e.g., a portion of the boundary of user interface region E1 that is nearest the starting location 7062 of cursor 7034 in the direction of the movement of input 7060, such as the top edge of user interface region E1 indicated by dashed line 7064). Accordingly, cursor 7034 is moved from location 7062 to the right, in accordance with the movement of input 7060 to the right, and, in ceasing to be displayed at the boundary of user interface region E4 and being displayed instead in user interface region E1, cursor 7034 is also moved downward in user interface region 7050, in accordance with the boundary of user interface element E1 being offset downward from the location indicated by dashed outline 7062 (e.g., even though the movement of input 7060 does not include movement in a direction other than to the right). In some embodiments, the threshold distance $D_{gap}$ is used to determine whether two user interface regions are close enough to each other in order for a cursor to be moved across a gap between the two user interface regions (e.g., based on the width of the gap), whereas the threshold distance $D_{offset}$ is used to determine whether the movement of a cursor would deviate too much from a direction of cursor movement requested by the direction of input movement in order for the cursor to be moved across a gap between two user interface regions (e.g., whether, in order to move the cursor between the two user interface regions in response to a corresponding input moving along a trackpad horizontally, the cursor would need to be moved too far downward to adjust for a vertical offset between the regions).

FIGS. 9A-9I illustrate examples of interacting with objects in a user interface using gaze and/or hand input differently for different types of objects, particularly while providing inputs using an input surface such as a touch-sensitive surface. The user interfaces in FIGS. 9A-9I are used to illustrate the processes described below, including the processes in FIG. 13.

Figure 9A:
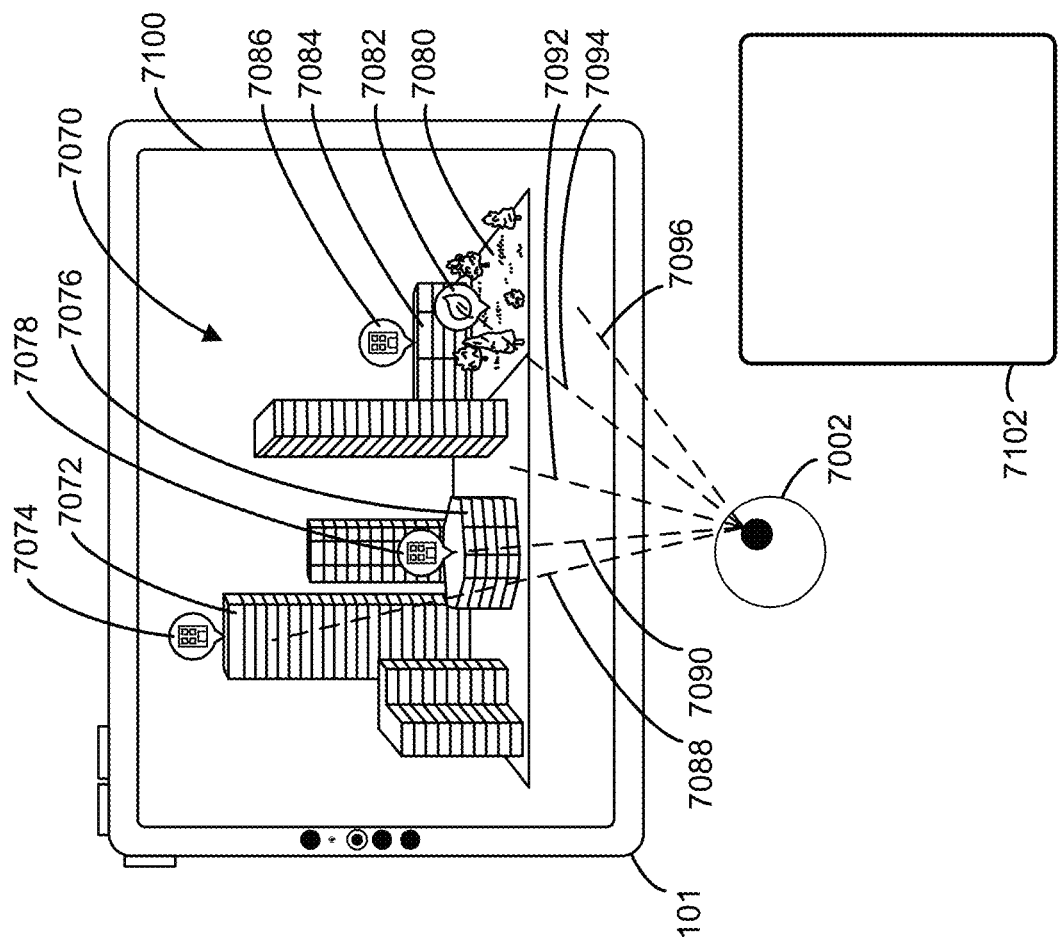
Figure 9D:
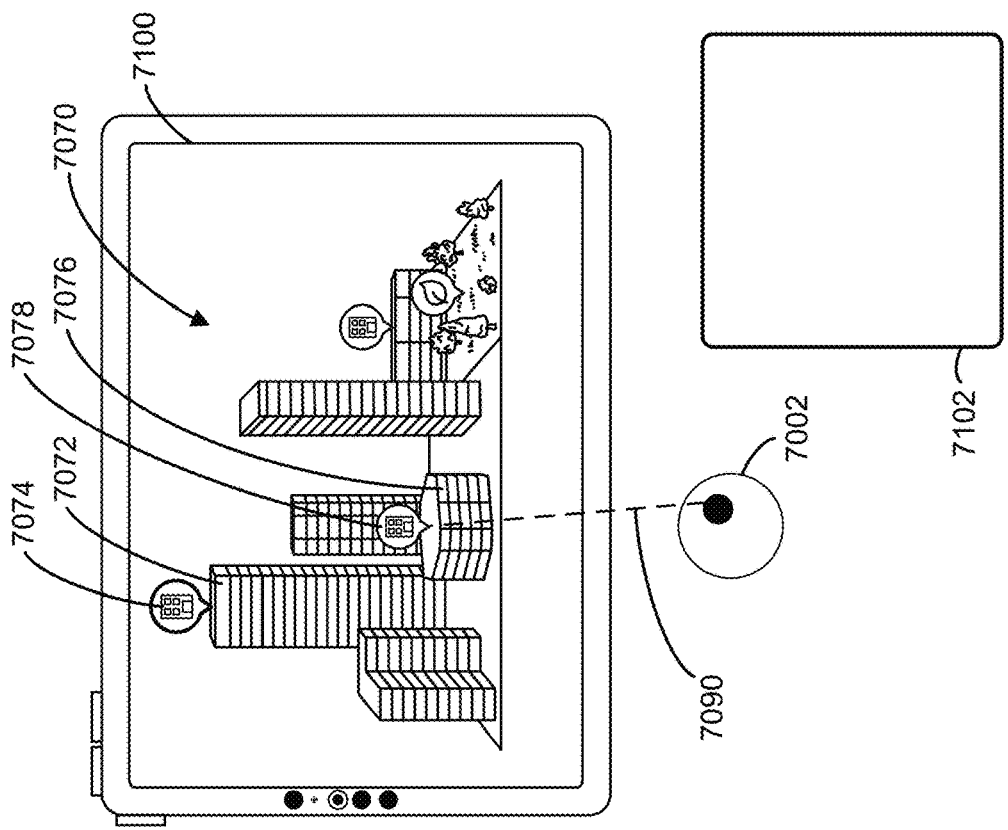

FIG. 9A illustrates a view of a three-dimensional environment that is visible to user 7002 via display generation component 7100 of computer system 101. In some embodiments, one or more portions of the view of the three-dimensional environment are digital passthrough portions that include representations of corresponding portions of physical environment 7000 (FIG. 7A) captured via one or more image sensors of computer system 101. In some embodiments, one or more portions of the view of the three-dimensional environment are optical passthrough portions, in that user 7002 can see one or more portions of physical environment 7000 through one or more transparent or semi-transparent portions of display generation component 7100. For example, the view of the three-dimensional environment that is visible in FIG. 9A optionally includes wall 7004', wall 7006', floor 7008', and/or box 7014' (e.g., as captured by one or more cameras of computer system 101 or visible through one or more transparent or semi-transparent portions of display generation component 7100). As shown in the examples in FIGS. 9A-9I, content that is visible via display generation component 7100 of computer system 101 is displayed on a touchscreen positioned in front of user 7002. In some embodiments, display generation component 7100 of computer system 101 is a head-mounted display worn on user 7002's head (e.g., what is shown in FIGS. 9A-9I as being visible via display generation component 7100 of computer system 101 corresponds to user 7002's field of view when wearing a head-mounted display).

FIG. 9A illustrates that the view of the three-dimensional environment that is visible via display generation component 7100 includes user interface 7070 with three-dimensional content. Specifically, user interface 7070 in FIGS. 9A-9I includes a three-dimensional view of a cityscape with a plurality of landmarks, including landmark 7072 indicated by icon 7074, landmark 7076 indicated by icon 7078, landmark 7080 indicated by icon 7082, and landmark 7084 indicated by icon 7086. FIG. 9A also illustrates multiple different scenarios in which user 7002 is gazing at a location in the three-dimensional environment (e.g., looking at different locations at different times). Dashed line 7088 represents user 7002 gazing at landmark 7072. Dashed line 7090 represents user 7002 gazing at landmark 7076. Dashed line 7092 represents user 7002 gazing at a location in user interface 7070 not designated as a landmark or other point of interest (e.g., a location on a representation of the ground in the cityscape). Dashed line 7094 represents user 7002 gazing at landmark 7080. Dashed line 7096 represents user 7002 gazing at a location in the three-dimensional environment that is outside of user interface 7070. The dashed elements (e.g., lines, outlines, or the like) described herein with reference to FIGS. 9A-9I are included in FIGS. 9A-9I for illustrative purposes and optionally not displayed via display generation component 7100.

FIGS. 9A-9B illustrate conditionally giving focus to a user interface element displayed in the three-dimensional environment based on whether user 7002's hand (e.g., hand 7020 or hand 7022 shown in FIG. 7A) is engaged in interaction with computer system 101. In FIG. 9A, an input is not detected on trackpad 7102 (e.g., no input is shown on trackpad 7102). In some embodiments, in the absence of an input on trackpad 7102, computer system 101 considers user 7002's hand to not be engaged in interaction. Accordingly, no element in user interface 7070 in FIG. 9A is displayed with an indication that that element has focus in any of the scenarios illustrated in FIG. 9A, regardless of where user 7002's gaze is directed.

FIG. 9B (e.g., FIGS. 9B1-9B3) (e.g., where a user interface analogous to the user interface described in FIG. 9B3 is shown on HMD 7100a in FIG. 9B1) illustrates user 7002 gazing at landmark 7072 in user interface 7070 (e.g., indicated by dashed line 7088) while input 7068 (e.g., a touch input by a hand of user 7002, such as hand 7020 or hand 7022 shown in FIG. 7A) is detected on trackpad 7102. In some embodiments, while user 7002's hand is in contact with trackpad 7102 (e.g., while providing input 7068), computer system 101 considers user 7002's hand to be engaged in interaction. Also, landmark 7072, to which user 7002's gaze is directed, is configured to receive focus (e.g., akin to being a valid location for displaying a cursor or other focus indicator). Accordingly, while detecting input 7068, computer system 101 displays an indication that landmark 7072 has focus, by displaying icon 7074 corresponding to landmark 7072 with visual emphasis (e.g., by increasing a size of icon 7074, displaying icon 7074 with a more prominent outline, and/or other visual emphasis) (e.g., akin to displaying a cursor or other focus indicator corresponding to landmark 7072).

Figure 9C:
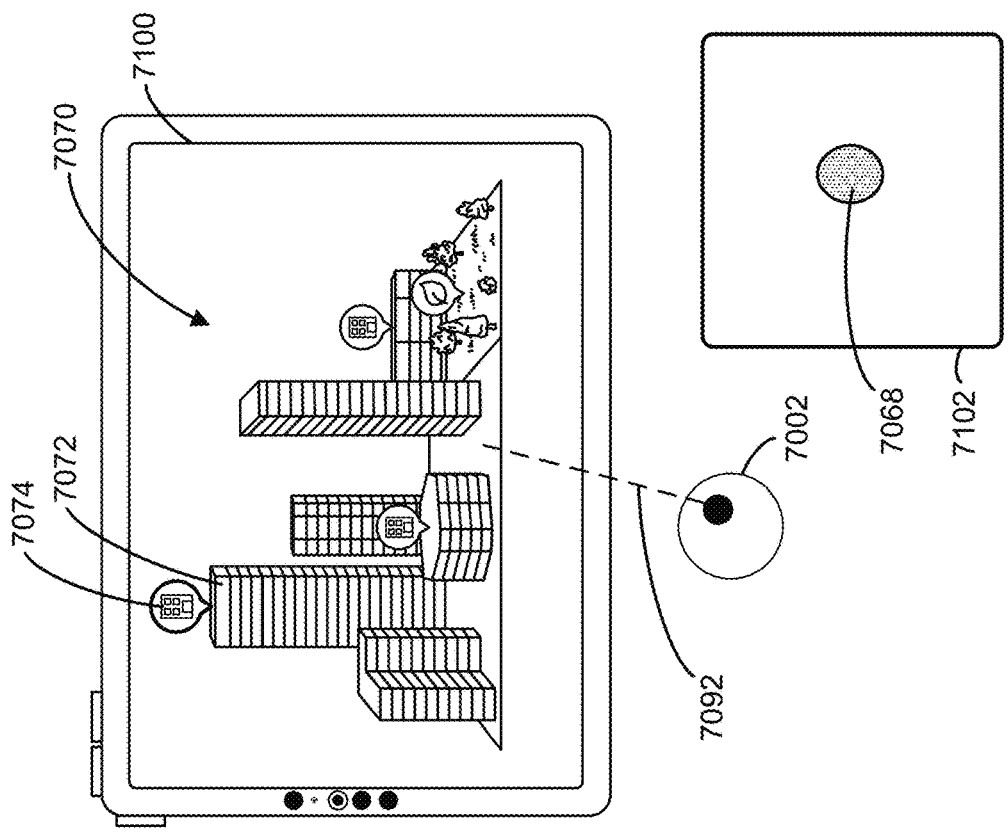

FIG. 9C illustrates user 7002 gazing at the location in user interface 7070 that is not designated as a landmark or other point of interest (e.g., the location on the representation of the ground in the cityscape) (e.g., indicated by dashed line 7092) while input 7068 continues to be detected on trackpad 7102 (e.g., a transition from FIG. 9B). The location at which user 7002 is gazing in FIG. 9C is not configured to receive focus (e.g., akin to not being a valid location for displaying a cursor or other focus indicator). Because the location to which user 7002's gaze is directed in FIG. 9C is not configured to receive focus, computer system 101 does not display an indication that that location has focus. Moreover, because the location or object that has focus in the three-dimensional environment has not changed, computer system 101 continues to display the indication that landmark 7072 has focus, by continuing to display icon 7074 with the visual emphasis described with reference to FIG. 9B (e.g., optionally in accordance with input 7068 continuing to be detected on trackpad 7102).

FIG. 9D illustrates that user 7002's gaze has moved to landmark 7076 (e.g., indicated by dashed line 7090) and that input 7068 is not detected on (e.g., has been lifted off from) trackpad 7102 (e.g., as a transition from FIG. 9B or 9C). Accordingly, although landmark 7076 is configured to receive focus, because user 7002's hand is not detected as being engaged in interaction with computer system 101 (e.g., as described herein with reference to FIGS. 9A-9B), computer system 101 does not display an indication that landmark 7076 has focus. Moreover, because the location or object that has focus in the three-dimensional environment has not changed, computer system 101 continues to display the indication that landmark 7072 has focus, by continuing to display icon 7074 with the visual emphasis shown in and described with reference to FIG. 9B (e.g., FIGS. 9B1-9B3). In some embodiments, after a threshold amount of time has passed since ceasing to detect input 7068 on trackpad 7102, computer system 101 automatically ceases to display even the indication that landmark 7072 has focus (e.g., by ceasing to display icon 7074 with the visual emphasis described with reference to FIGS. 9B, and reverting the appearance of icon 7074 to the appearance of icon 7074 in FIG. 9A) (e.g., analogously to cursor 7034 automatically ceasing to be displayed after a threshold amount of time since detecting liftoff of an input from trackpad 7102, as described herein with reference to FIG. 7G).

Figure 9F:
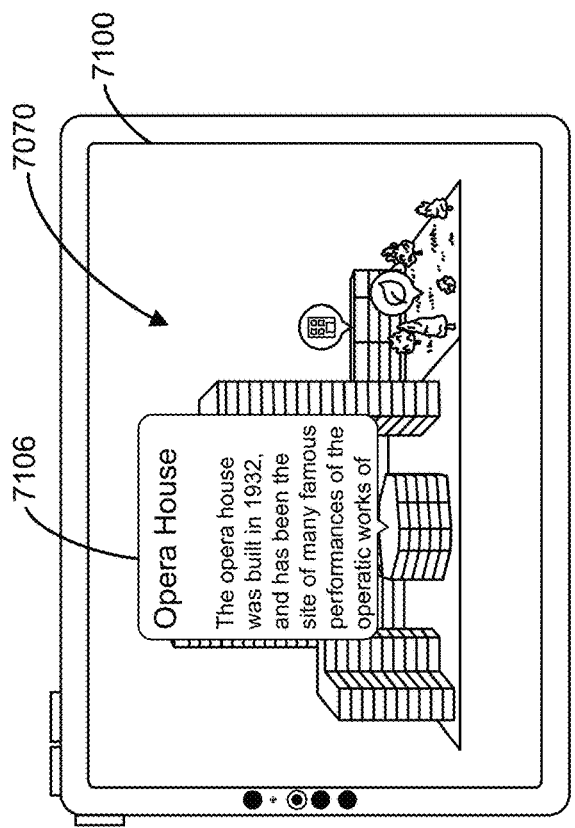
Figure 9F:
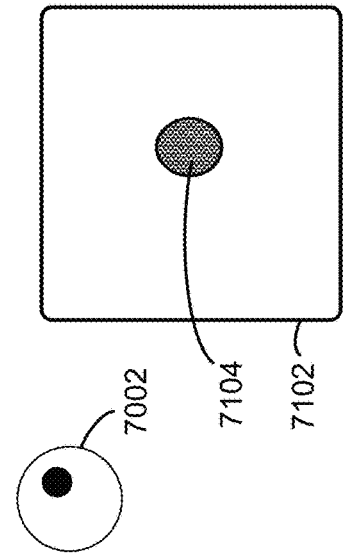
Figure 9E:
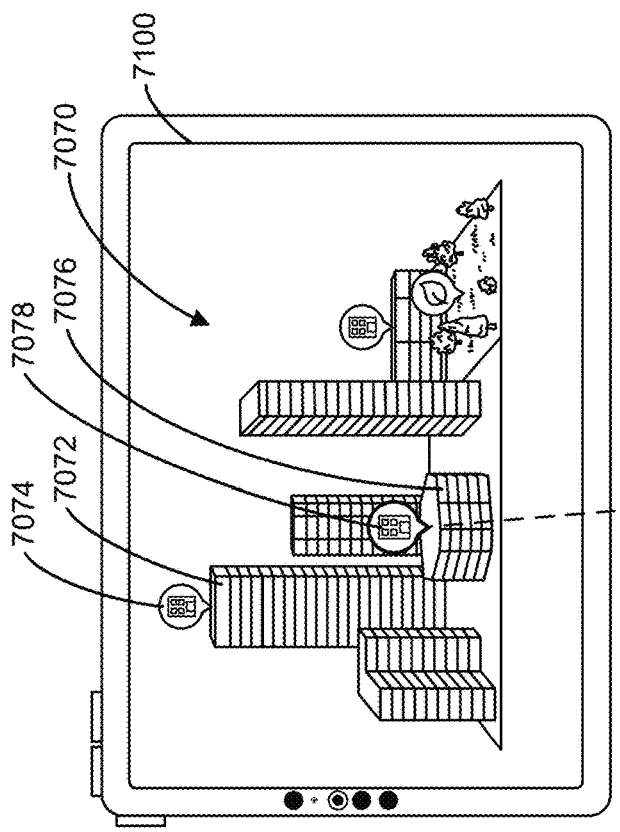
Figure 9E:
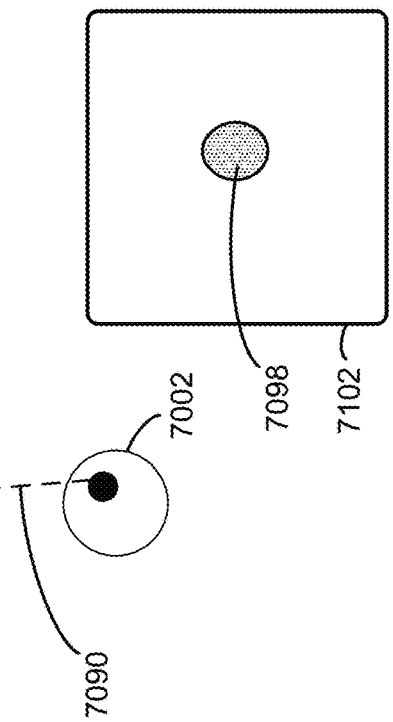

FIG. 9E illustrates that user 7002's gaze has moved to landmark 7076 (e.g., indicated by dashed line 7090) and that input 7098 is detected on trackpad 7102 (e.g., user 7002's hand is detected as being engaged in interaction with computer system 101). In response to user 7002 gazing at landmark 7076 while input 7098 is detected on trackpad 7102, and because landmark 7076 is configured to receive focus, computer system 101 moves the indication of focus from landmark 7072 to landmark 7076, optionally by ceasing to display the indication that landmark 7072 has focus (e.g., by ceasing to display icon 7074 with the visual emphasis described with reference to FIGS. 9B, and reverting the appearance of icon 7074 to the appearance of icon 7074 in FIG. 9A) and instead displaying an indication that landmark 7076 has focus (e.g., displaying icon 7079 with visual emphasis analogous to the visual emphasis described with reference to icon 7074 in FIG. 9B).

FIG. 9E also illustrates that, for a three-dimensional user interface, computer system 101 changes which location in the user interface has focus in one or more different ways from how computer system 101 moves a focus indicator in a two-dimensional user interface. For example, as a transition directly from FIG. 9B (e.g., skipping FIGS. 9C and 9D), FIG. 9E illustrates user 7002's gaze having moved from landmark 7072 to landmark 7076 while input 7098, as a continuation of input 7068 in FIG. 9B (e.g., without detecting an intervening liftoff of input 7068), continues to be detected on trackpad 7102. Because landmark 7076 is configured to receive focus, computer system 101, while still detecting input 7068, moves the indication of focus from landmark 7072 to landmark 7076. In contrast, as described herein with reference to FIGS. 7D, while computer system 101 continues to detect input 7032 on trackpad 7102, mere movement of user 7002's gaze from a current location of cursor 7034 to another location in the two-dimensional user interface that is also a valid cursor location is not enough to cause computer system 101 to move cursor 7034 to the other location (e.g., instead, movement of input 7032 along trackpad 7102 is required). In another example, as a transition from FIG. 9C (e.g., skipping FIG. 9D), and where FIG. 9C is in turn a transition from FIGS. 9B, FIG. 9E illustrates that, while detecting input 7098 as a continuation of input 7068 on trackpad 7102 (e.g., without detecting an intervening liftoff of input 7068), computer system 101 continues to display the indication of focus at a prior valid focus location (e.g., a location that is configured to receive focus), landmark 7072 (as shown in FIGS. 9B), until user 7002's gaze moves to another valid focus location, such as landmark 7076 (as shown in FIG. 9C), without moving the indication of focus if user 7002's gaze moves to one or more intermediate locations that are not valid focus locations (e.g., the location indicated by dashed line 7092 (FIG. 9C)).

FIG. 9F illustrates press input 7104 detected via trackpad 7102 (e.g., an increase in the intensity of the contact of input 7098 (FIG. 9E), optionally to at least a threshold press input intensity threshold that is above a nominal contact detection intensity threshold). Computer system 101 detects press input 7104 while displaying the indication that landmark 7076 has focus in the three-dimensional environment (e.g., press input 7104 corresponds to a request by user 7002 to interact with landmark 7076 after user 7002 has indicated their intent to interact with landmark 7076 by gazing at landmark 7076 with a hand engaged (e.g., a contact on trackpad 7102)). In response to detecting press input 7104 while landmark 7076 has focus, computer system 101 performs an operation (e.g., an activation operation) with respect to landmark 7076. For example, in FIG. 9F, computer system 101 displays two-dimensional popup 7106 (e.g., a user interface region that is part of user interface 7070) with additional information about landmark 7076. In some embodiments, computer system 101 performs the operation with respect to landmark 7076 in response to detecting a different type of selection input, such as an air gesture (e.g., an air tap, air pinch, or other air gesture)).

Figure 9H:
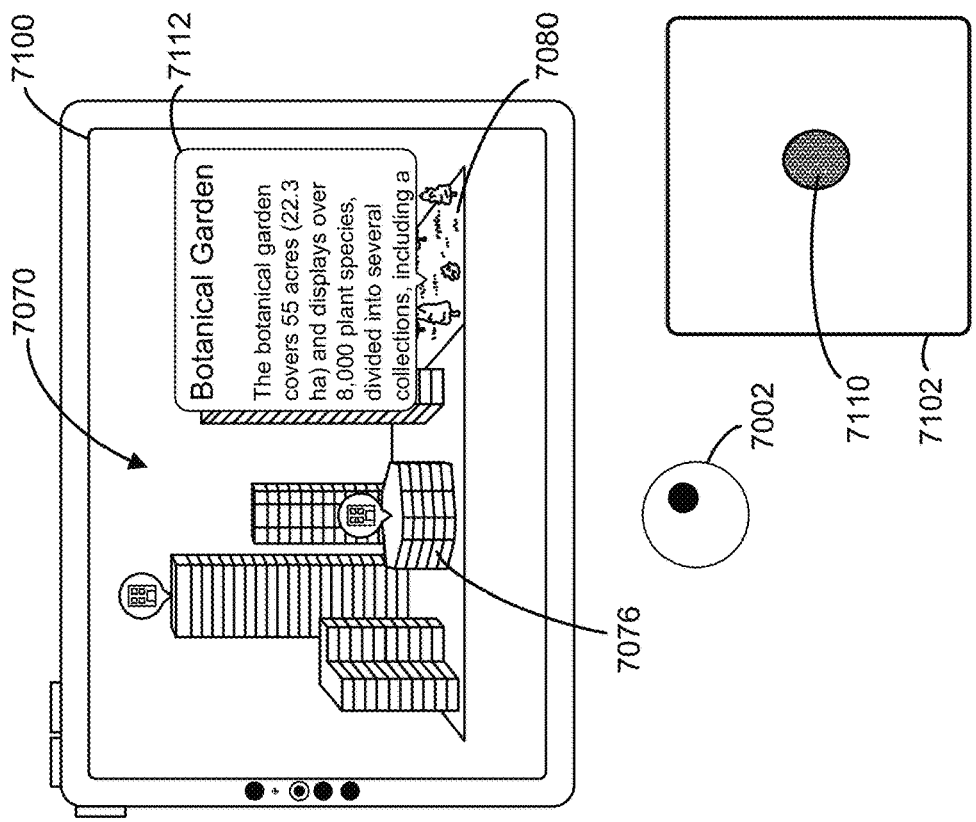
Figure 9G:
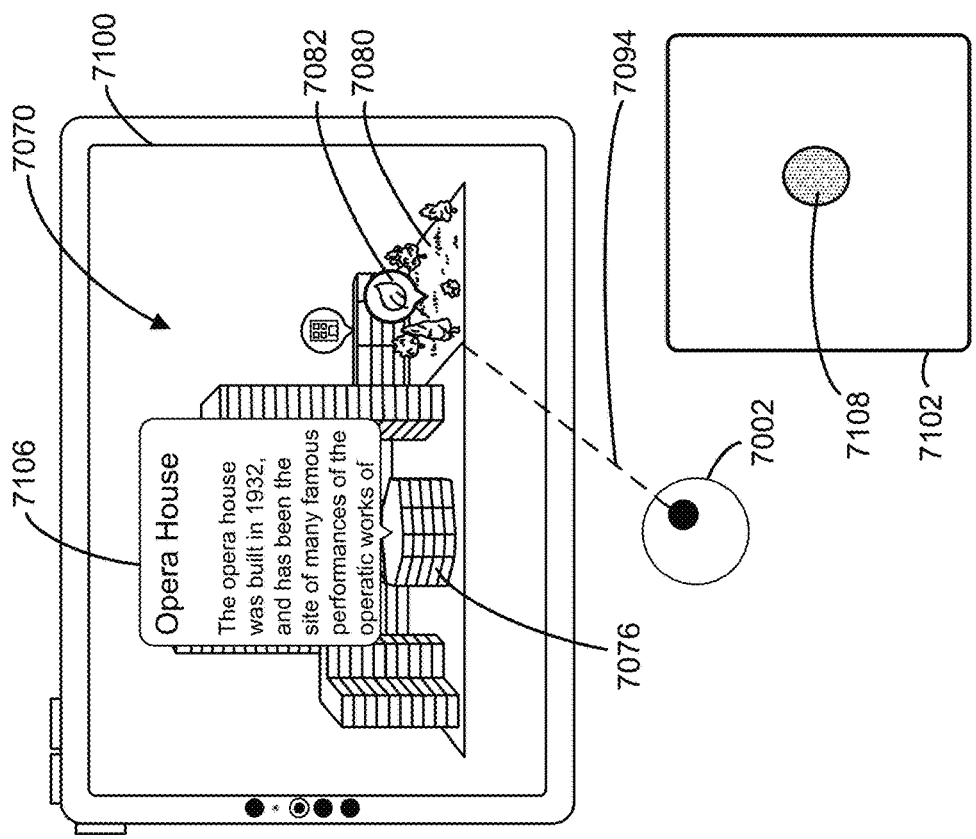

FIG. 9G illustrates input 7108 detected on trackpad 7102 (e.g., a continuation of input 7104, optionally after a decrease of intensity of the contact of input 7104, such as to below the threshold press input intensity threshold yet still above the nominal contact detection intensity threshold; or a subsequent input detected after detecting liftoff of input 7104). FIG. 9G also shows that user 7002's gaze has moved to landmark 7080 while input 7108 is detected on trackpad 7102. In response to detecting user 7002's gaze directed to landmark 7080 while detecting input 7108, computer system 101 displays an indication that landmark 7080 has focus by displaying icon 7082 with visual emphasis analogous to the visual emphasis described with reference to icon 7074 in FIG. 9B. In the example shown in FIG. 9G, computer system 101 continues to display popup 7106 with the additional information about landmark 7076 while displaying the indication that landmark 7080 has focus. In some embodiments, computer system 101 ceases to display popup 7106 upon displaying the indication that landmark 7080 has focus.

FIG. 9H illustrates press input 7110 detected via trackpad 7102 (e.g., an increase in the intensity of the contact of input 7108 (FIG. 9G), optionally to at least the threshold press input intensity threshold). Computer system 101 detects press input 7110 while displaying the indication that landmark 7080 has focus in the three-dimensional environment (e.g., press input 7110 corresponds to a request by user 7002 to interact with landmark 7080 after user 7002 has indicated their intent to interact with landmark 7080 by gazing at landmark 7076 with a hand engaged (e.g., a contact on trackpad 7102)). In response to detecting press input 7110 (or other type of selection input, such as an air gesture) while landmark 7080 has focus, computer system 101 performs an operation (e.g., an activation operation) with respect to landmark 7080. For example, in FIG. 9H, computer system 101 displays two-dimensional popup 7112 (e.g., a user interface region that is part of user interface 7070) with additional information about landmark 7080. In the example shown in FIG. 9H, computer system 101 ceases to display popup 7106 with the additional information about landmark 7076 upon displaying popup 7112 with the additional information about landmark 7080 in response to press input 7110. In some embodiments, computer system 101 continues to display popup 7106 while (e.g., even after) displaying popup 7112 (and optionally provides a different mechanism for dismissing popup 7106, such as a close button).

Figure 9I:
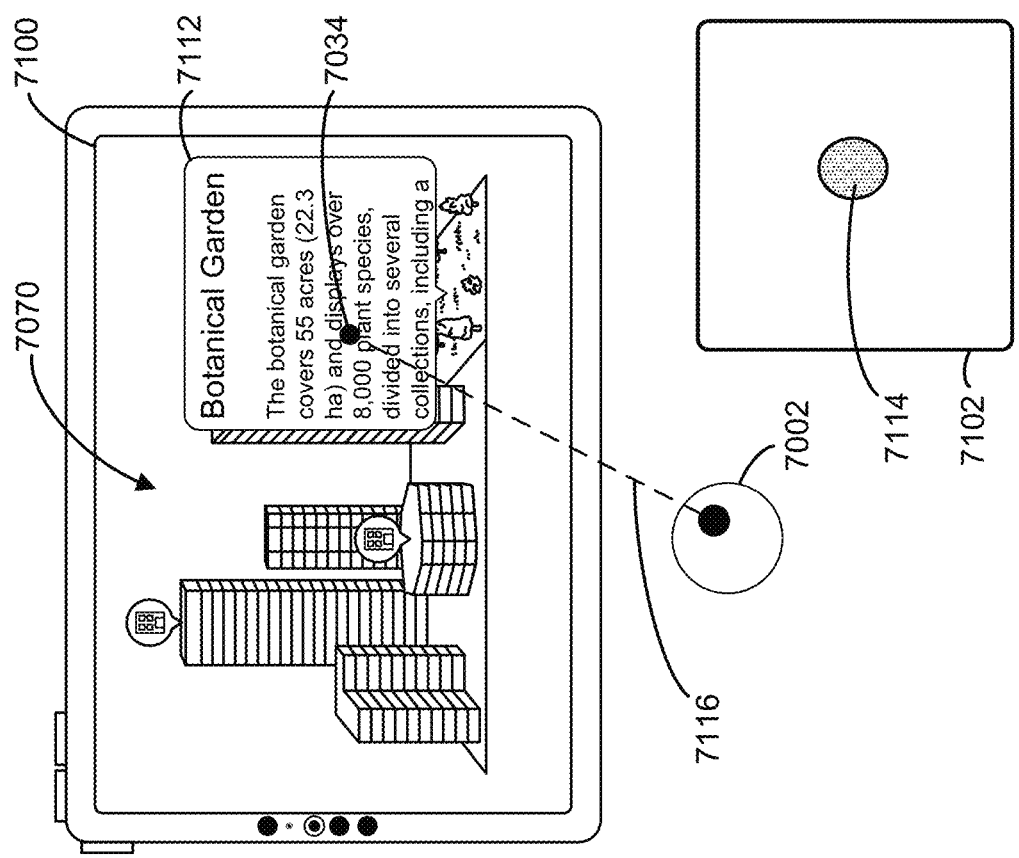

FIG. 9I illustrates that user 7002's gaze has moved to a location in popup 7112 (e.g., indicated by dashed line 7116) and that input 7114 is detected on trackpad 7102 (e.g., a continuation of input 7110, optionally after a decrease of intensity of the contact of input 7110, such as to below the threshold press input intensity threshold yet still above the nominal contact detection intensity threshold; or a subsequent input detected after detecting liftoff of input 7110). In response to detecting user 7002's gaze at a location in popup 7112, a two-dimensional user interface region, computer system 101 displays cursor 7034 at the location to which user 7002's gaze is directed.

FIGS. 10A-10E (e.g., FIGS. 10E1-10E3) illustrate examples of gaze-assisted dragging and dropping of content across different regions in an environment, particularly in response to inputs provided using an input surface such as a touch-sensitive surface. The user interfaces in FIGS. 10A-10E are used to illustrate the processes described below, including the processes in FIG. 14.

FIG. 10A illustrates a view of a three-dimensional environment that is visible to user 7002 via display generation component 7100 of computer system 101. In some embodiments, one or more portions of the view of the three-dimensional environment are digital passthrough portions that include representations of corresponding portions of physical environment 7000 (FIG. 7A) captured via one or more image sensors of computer system 101. In some embodiments, one or more portions of the view of the three-dimensional environment are optical passthrough portions, in that user 7002 can see one or more portions of physical environment 7000 through one or more transparent or semi-transparent portions of display generation component 7100. In FIG. 10A, the view of the three-dimensional environment that is visible includes wall 7004', wall 7006', floor 7008', and box 7014' (e.g., as captured by one or more cameras of computer system 101 or visible through one or more transparent or semi-transparent portions of display generation component 7100). As shown in the examples in FIGS. 10A-10E3, content that is visible via display generation component 7100 of computer system 101 is displayed on a touchscreen positioned in front of user 7002. In some embodiments, display generation component 7100 of computer system 101 is a head-mounted display worn on user 7002's head (e.g., what is shown in FIGS. 10A-10E2 as being visible via display generation component 7100 of computer system 101 corresponds to user 7002's field of view when wearing a head-mounted display (e.g., HMD 7100a)).

In FIG. 10A, the view of the three-dimensional environment also includes window 7010 and window 7012. Window 7010 includes element E2 (e.g., content displayed in window 7010, such as an image, also called content E2 for ease of reference). In addition, in FIG. 10A, user 7002 is gazing at content E2 of window 7010 (e.g., indicated by dashed line 7118) while input 7120 is detected on trackpad 7102. In accordance with detecting input 7120 on trackpad 7102 (e.g., indicative of user 7002's hand being engaged in interaction with computer system 101), computer system 101 displays cursor 7034 at the location in content E2 to which user 7002's gaze is directed.

Figure 10B:
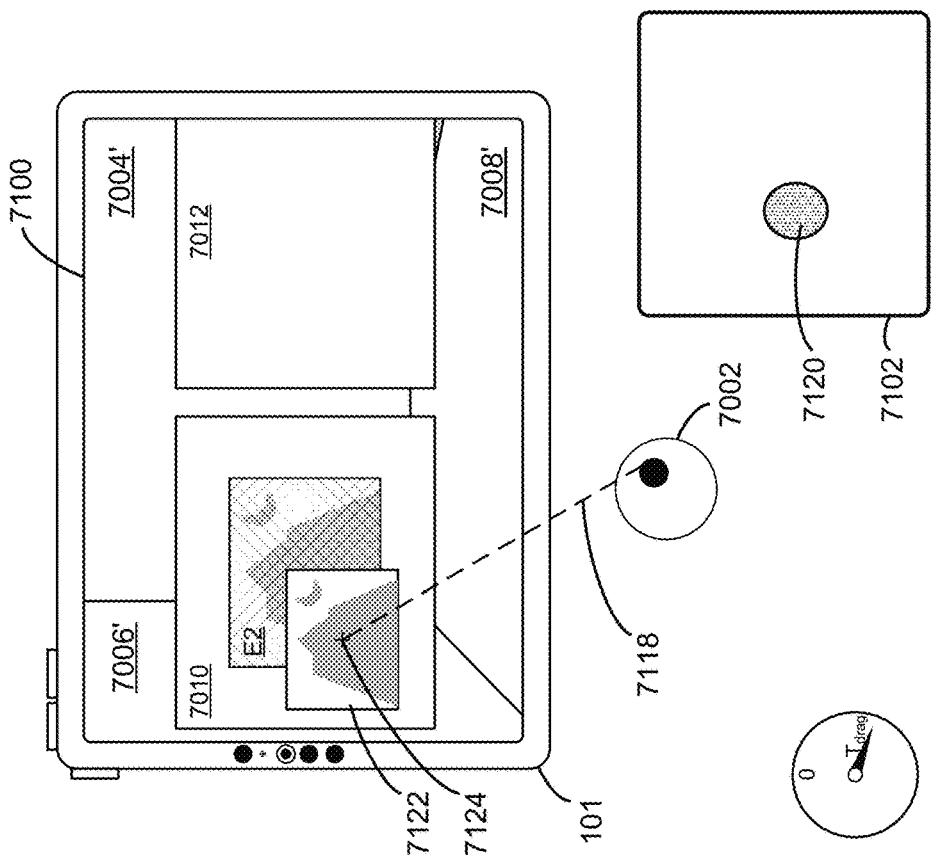
Figure 10A:
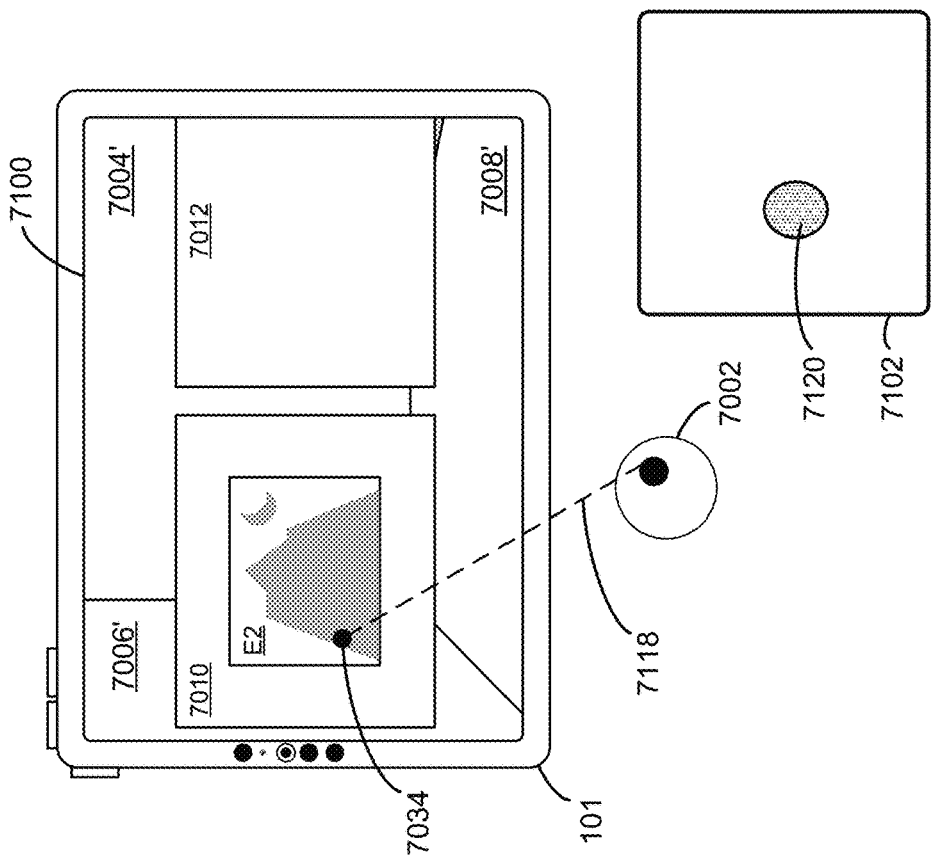

FIG. 10B illustrates initiating a drag operation with respect to content in the three-dimensional environment (e.g., a transition from FIG. 10A). In FIG. 10B, input 7120 has continued to be detected on trackpad 7102 (e.g., without intervening liftoff of input 7120 from trackpad 7102) for at least a threshold amount of time $T_{drag}$ while cursor 7034 is maintained at the location in content E2 as shown in FIG. 10A. The threshold amount of time $T_{drag}$ described herein with reference to FIGS. 10A-10E (e.g., FIGS. 10E1-10E3) is optionally the same as or different from (e.g., greater than or less than) the threshold amount of time $T_{th}$ described herein with reference to FIGS. 7A-7K. In some embodiments, as illustrated in FIG. 10B, input 7120 satisfies criteria for initiating a drag operation if input 7120 has continued to be detected on trackpad 7102 for at least the threshold amount of time $T_{drag}$ (e.g., if input 7120 is a long press input). In response to input 7120 satisfying the criteria for initiating a drag operation, computer 101 initiates a drag operation with respect to content E2 (e.g., the location at which cursor 7034 was displayed when input 7120 was determined to satisfy the drag operation criteria).

In some embodiments, in accordance with initiating the drag operation, computer system 101 visually deemphasizes the target content to be dragged and displays a separate representation of the content, where the separate representation is configured to be moved over different locations in the three-dimensional environment to indicate where the target content will be dropped (e.g., in response to computer system 101 detecting the end of the drag input). For example, FIG. 10B shows content E2 visually deemphasized by being dimmed and/or faded, and separate preview 7122 that is a representation of content E2 at a smaller size (e.g., smaller scale) than content E2. In addition, preview 7122 is displayed centered about location 7124 at which cursor 7034 was displayed when the drag operation was initiated (e.g., indicated by the solid crosshairs that are included in FIG. 10B for illustrative purposes and optionally not displayed via display generation component 7100).

FIGS. 10C-10E illustrate conditionally moving dragged content, or a preview of dragged content, directly to a location in the three-dimensional environment to which the user's gaze is directed (e.g., jumping the dragged content or preview thereof to the user's gaze location) based on whether respective criteria are met. FIG. 10C (e.g., a transition from FIG. 10B) illustrates movement of input 7120 along trackpad 7102 by a distance $d_4$ in a first direction (e.g., to the right and slightly downward) while user 7002 is gazing at a location in window 7010 that is in a first reference direction relative to location 7124 (e.g., the prior location of cursor 7034 and the location of the center of preview 7122, indicated by dashed crosshairs that are included in FIG. 10C for illustrative purposes and optionally not displayed via display generation component 7100). Distance $d_4$ is greater than a threshold distance $D_{drag}$ that is an amount (e.g., a magnitude) of input movement required in order for the respective criteria for jumping preview 7122 to user 7002's gaze location to be met. In addition, the first direction of movement of input 7120 corresponds to a request to move preview 7122 in a corresponding first direction in the three-dimensional environment that is sufficiently towards the location to which user 7002's gaze is directed in FIG. 10C, in that the first direction of input movement (or the corresponding first direction of movement in the three-dimensional environment) is within a directional threshold of the first reference direction (e.g., the first direction is within a range of directions that include and is optionally centered about the first reference direction (e.g., indicated by dashed lines 7130-1 that are included in FIG. 10C for illustrative purposes and optionally not displayed via display generation component 7100), the first direction is within a threshold angular distance of the first reference direction, or another way of defining the directional threshold), thereby satisfying another aspect of the respective criteria.

However, because user 7002 is gazing at a location that is in the same user interface region (e.g., window 7010) as preview 7122 (or in some embodiments as content E2), the respective criteria are not met, and thus preview 7122 is moved in the three-dimensional environment by an amount that corresponds to the amount of movement of input 7120, optionally displaying preview 7122 moving through a plurality of intermediate locations until ultimately being centered at location 7126 (e.g., location 7126 being indicated by solid crosshairs and the amount of movement of preview 7122 being indicated by the arrow, both of which are included in FIG. 10C for illustrative purposes and optionally not displayed via display generation component 7100), rather than being moved directly (e.g., jumped) to the location at which user 7002 is gazing in FIG. 10C (e.g., without regard to whether the magnitude of movement of input 7120 meets the threshold distance $D_{drag}$ or whether the direction of movement of input 7120 is within the directional threshold of the first reference direction).

FIG. 10D (e.g., an alternate transition from FIG. 10B, skipping FIG. 10C) illustrates movement of input 7120 along trackpad 7102 by the distance $d_4$ in a second direction (e.g., to the right and upward) while user 7002 is gazing at a location in window 7012 that is in a second reference direction relative to location 7124 (e.g., the prior location of cursor 7034 and the location of the center of preview 7122, indicated by dashed crosshairs that are included in FIG. 10D for illustrative purposes and optionally not displayed via display generation component 7100). The respective criteria for jumping preview 7122 to user 7002's gaze location in FIG. 10D are not met because the second direction of movement of input 7120 corresponds to a request to move preview 7122 in a corresponding second direction in the three-dimensional environment that is not sufficiently towards the location to which user 7002's gaze is directed in FIG. 10D, in that the second direction of input movement (or the corresponding second direction of movement in the three-dimensional environment) is beyond the directional threshold from the reference direction (e.g., the second direction is outside of the range of directions that include and is optionally centered about the reference direction (e.g., indicated by dashed lines 7130-2 that are included in FIG. 10D for illustrative purposes and optionally not displayed via display generation component 7100), the second direction is outside of the threshold angular distance of the reference direction, or another way of defining the directional threshold) (e.g., even though the corresponding second direction of movement in the three-dimensional environment is otherwise towards window 7012 to which user 7002's gaze is directed).

Thus, even though user 7002 is gazing at a location that is in a different user interface region (e.g., window 7012) from preview 7122 (or in some embodiments from content E2) (e.g., in window 7010), and even though distance $d_4$ is greater than the threshold distance $D_{drag}$, preview 7122 is moved in the three-dimensional environment by an amount that corresponds to the amount of movement of input 7120, optionally displaying preview 7122 moving through a plurality of intermediate locations until ultimately being centered at location 7128 (e.g., location 7128 being indicated by solid crosshairs and the amount of movement of preview 7122 being indicated by the arrow, both of which are included in FIG. 10D for illustrative purposes and optionally not displayed via display generation component 7100), rather than being moved directly (e.g., jumped) to the location at which user 7002 is gazing in FIG. 10D (e.g., without regard to whether the magnitude of movement of input 7120 meets the threshold distance $D_{drag}$ or whether user 7002's gaze is directed to the same or a different user interface region than the region over which preview 7122 was positioned).

FIG. 10E (e.g., FIGS. 10E1-10E3) (e.g., where a user interface analogous to the user interface described in FIG. 10E3 is shown on HMD 7100a in FIG. 10E1) illustrates a scenario in which the respective criteria for jumping a preview of dragged content (or in some embodiments the dragged content itself) to user 7002's gaze location are met. In FIG. 10E (e.g., an alternate transition from FIG. 10B, skipping FIGS. 10C and 10D), input 7120 has moved along trackpad 7102 by the distance $d_4$ in a third direction (e.g., to the right and slightly upward) while user 7002 is gazing at a location in window 7012 that is in a third reference direction relative to location 7124 (e.g., the prior location of cursor 7034 and the location of the center of preview 7122, indicated by dashed crosshairs that are included in FIG. 10E for illustrative purposes and optionally not displayed via display generation component 7100).

Distance $d_4$ is greater than the threshold distance $D_{drag}$, the amount of input movement required in order for the respective criteria for jumping preview 7122 to user 7002's gaze location to be met. Window 7012, to which user 7002's gaze is directed in FIG. 10E (e.g., FIGS. 10E1-10E3), is a different window from window 7010 over which preview 7122 was displayed as shown in FIG. 10B. In addition, the third direction of movement of input 7120 corresponds to a request to move preview 7122 in a corresponding third direction in the three-dimensional environment that is sufficiently towards the location to which user 7002's gaze is directed in FIGS. 10E, in that the third direction of input movement (or the corresponding third direction of movement in the three-dimensional environment) is within the directional threshold of the third reference direction (e.g., the third direction is within a range of directions that include and is optionally centered about the third reference direction (e.g., indicated by dashed lines 7130-3 that are included in FIG. 10E for illustrative purposes and optionally not displayed via display generation component 7100), the third direction is within a threshold angular distance of the third reference direction, or another way of defining the directional threshold). Accordingly, in response to detecting the movement of input 7120 and because the respective criteria are met, computer system 101 ceases to display preview 7122 over window 7010 and centered at location 7124 and instead displays preview 7122 over window 7012 and centered at location 7132 (e.g., moving preview 7122 directly to being centered at location 7132 without displaying preview 7122 moving through a plurality of intermediate locations). Preview 7122 in FIG. 10E is displayed with badge 7134 indicating that preview 7122 represents content being dragged (e.g., copied or moved) from elsewhere in the three-dimensional environment, such as from a different user interface region (e.g., window 7010) than the user interface region over which preview 7122 is currently displayed (or in some embodiments the user interface region in which content E2 is located) (e.g., window 7012).

In some embodiments, if the respective criteria are met, preview 7122 would cease to be displayed centered at location 7124 and would be displayed centered at the location to which user 7002's gaze is directed. In some embodiments, as illustrated in FIGS. 10E, preview 7122 is moved to be centered at a location, such as location 7132, that is near the location in window 7012 to which user 7002's gaze is directed yet offset from the gaze location (e.g., by moving preview 7122 to a location slightly before user 7002's gaze location in the direction that preview 7122 is moved) (e.g., because momentum of the input movement could continue to move preview 7122 closer to or even past user 7002's gaze location).

Additional descriptions regarding FIGS. 7A-7K, 8A-8H, 9A-9I, and 10A-10E3 are provided below in reference to methods 1100, 1200, 1300, and 1400 described with respect to FIGS. 7A-7K, 8A-8H, 9A-9I, and 10A-10E3.

FIGS. 11A-11B are flow diagrams of an exemplary method 1100 for gaze-assisted display and movement of a focus indicator in an environment, in accordance with some embodiments. In some embodiments, method 1100 is performed at a computer system (e.g., computer system 101 in FIG. 1) that is in communication with a display generation component (e.g., display generation component 120 in FIGS. 1A, 3, and 4) (e.g., a hardware element, comprising one or more display devices, such as a display, a touch-screen, a projector, a heads-up display, a head-mounted display, or the like) and one or more input devices (e.g., one or more optical sensors such as cameras (e.g., color sensors, infrared sensors, structured light scanners, and/or other depth-sensing cameras) that point downward at a user's hand, forward from the user's head, and/or that faces the user; eye-tracking devices; user-held and/or user-worn controllers; and/or other input hardware) that include a touch-sensitive surface (e.g., a trackpad, touchscreen, or the like). In some embodiments, the one or more input devices include a surface that is not touch-sensitive, and inputs via the non-touch-sensitive surface are detected via one or more sensors that track the location and/or movement of the inputs (e.g., optical sensors tracking the user's hands and/or fingers relative to the non-sensitive surface, such as by tracking movement of the user's hands on a desk, table, or on another portion of the user's body such as their leg or arm). In some embodiments, the method 1100 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1100 are, optionally, combined and/or the order of some operations is, optionally, changed.

As described herein, method 1100 provides an improved input mechanism for controlling placement of a focus indicator (e.g., a cursor) in an environment such as a mixed reality three-dimensional environment. Placement and/or movement of the focus indicator in the environment are controlled by a user's gaze and contact (or lack of contact) (e.g., a touch input via one or more fingers) with a touch-sensitive surface (e.g., a touchpad). In particular, a contact with the touch-sensitive surface is interpreted in some circumstances by the computer system as a request to move the focus indicator to a location that corresponds to a location of user's gaze. Further, depending on whether the contact with the touch-sensitive surface is maintained, placement of the focus indicator is constrained to a currently active application (e.g., one that has focus) or allowed to be placed to a non-active application (e.g., one that does not have focus). The described improved input mechanism provides an additional input modality (e.g., use of touch input in addition to input using gaze and/or air gestures) for performing target selection in the environment, thereby allowing a user to efficiently perform complex input gestures in the environment and quickly move a focus indicator across larger distances in the environment in some circumstances. Controlling placement and/or movement of a focus indicator based on location of a user's gaze and a type of contact with a touch sensitive surface (e.g., a touch, a press, touch and lift off, and other types of touch inputs) reduces the number and complexity of inputs and/or amount of time needed to relocate a focus indicator, select a target, or switch from active to inactive applications in an environment.

While a view of an environment is visible via the display generation component (e.g., the environment being a two-dimensional or three-dimensional environment that includes one or more computer-generated portions and optionally one or more passthrough portions), the computer system detects (1102), via the one or more input devices, a gaze input (e.g., a gaze of a user) directed to the environment. While detecting the gaze input, the computer system detects (1104), via the touch-sensitive surface, a first touch input.

In response to detecting the first touch input: in accordance with a determination that a first portion (e.g., an initial portion) of the first touch input is detected while the gaze input is directed to a first region in the environment (e.g., a first location, a first user interface object, or other portion of the environment), the computer system displays (1108) a focus indicator (e.g., a cursor, reticle, highlight, outline, or other visual marker indicating a current location in the environment to which the user has directed input and/or with which the user has indicated intent to interact, and that optionally has focus for further interaction) at a location corresponding to the first region in the environment (e.g., the focus indicator is displayed at the first region, or within the first region at the location to which the gaze input is directed when the first portion of the first touch input is detected (e.g., when the first touch input is first detected)); and, in accordance with a determination that the first portion of the first touch input is detected while the gaze input is directed to a second region in the environment (e.g., a second location, a second user interface object, or other portion of the environment), the computer system displays (1110) the focus indicator at a location corresponding to the second region in the environment (e.g., the focus indicator is displayed at the second region, or within the second region at the location to which the gaze input is directed when the first portion of the first touch input is detected). For example, as described herein with reference to FIGS. 7C, in response to detecting input 7032 on trackpad 7102, computer system 101 displays cursor 7034 at the location to which user 7002's gaze is directed (e.g., the location in element E2 of window 7010 indicated by dashed line 7024 in the example of FIG. 7C, or another location).

The computer system detects (1112) a continuation of the first touch input that includes movement of the first touch input along the touch-sensitive surface while the first touch input is maintained on the touch-sensitive surface (e.g., while continuously detecting the first touch input via the touch-sensitive surface before the first touch input is lifted off the touch-sensitive surface (e.g., without an intervening liftoff and touchdown of the first touch input)).

In response to detecting the movement of the first touch input along the touch-sensitive surface during the continuation of the first touch input, the computer system moves (1114) the focus indicator in accordance with a magnitude (and, optionally, in accordance with a direction) of the movement of the first touch input, including: in accordance with a determination that the magnitude of the movement of the first touch input during the continuation of the first touch input corresponds to a request to move the focus indicator within a user interface of a first application (e.g., if the gaze input is directed to the first region when the first touch input is first detected, the first region is part of the user interface of the respective application; if the gaze input is directed to the second region when the first touch input is first detected, the second region is part of the user interface of the respective application), moving (1116) the focus indicator within the user interface of the first application in accordance with the movement of the first touch input; and, in accordance with a determination that the magnitude of the movement of the first touch input during the continuation of the first touch input corresponds to a request to move the focus indicator outside of a boundary of the user interface of the first application (e.g., to a user interface of a second application that is different from the first application), moving (1118) the focus indicator within the user interface of the first application in accordance with the movement of the first touch input without moving the focus indicator outside of the boundary of the user interface for the first application (e.g., forgoing moving the focus indicator to the user interface of the second application).

In some embodiments, the focus indicator is moved in the environment in accordance with a portion of the movement of the first touch input, through one or more intermediate locations in the environment, until the focus indicator reaches a limit of the user interface of the first application (e.g., an edge or boundary).

For example, as described herein with reference to FIG. 7E, cursor 7034 is progressively moved within window 7010 in accordance with the movement of input 7032 (e.g., cursor 7034 is moved along trackpad 7102 from the previous location of cursor 7034 in FIG. 7D to intermediate cursor location 7037 in FIG. 7E as input 7032 is moved from the initial location in FIG. 7D to the intermediate location 7036 in FIG. 7E) until being stopped at the boundary of window 7010. In another example, as described herein with reference to FIG. 7H, cursor 7034 is progressively moved within window 7012 in accordance with the movement of input 7040 (e.g., cursor 7034 is moved from location 7042 to the location of cursor 7034 in FIG. 7H as input 7032 is moved along trackpad 7102 from location 7040-1 to location 7040-2) until being stopped at the boundary of window 7012.

Constraining movement of the focus indicator to a currently active application when a contact with the touch-sensitive surface is maintained, and allowing the focus indicator to move to a different application if liftoff of the contact followed by placement of a subsequent contact is detected, makes user-device interaction in the environment more efficient by reducing accidental inputs and unwanted movements (e.g., relocations) of the focus indicator outside of the currently active application and by reducing the number of inputs and/or amount of time needed to move the focus indicator to a different application.

In some embodiments, the computer system detects liftoff of the first touch input and, in response to detecting the liftoff of the first touch input, ceases to display the focus indicator. For example, as described herein with reference to FIG. 7G, computer system 101 optionally ceases to display cursor 7034 in response to detecting the liftoff of input 7032 from trackpad 7102. Hiding the focus indicator after contact with the touch-sensitive surface ends (e.g., a liftoff event is detected, where contact with the touch-sensitive surface ceases) automatically reduces clutter in the user interface when a cursor is not being actively controlled with a touch input. Displaying the focus indicator in response to detecting a touch input and hiding the focus indicator in response to detecting liftoff of the touch input assists and/or guides the user in placing and controlling the focus indicator in an environment.

In some embodiments, the computer system detects liftoff of the first touch input; and, in response to detecting the liftoff of the first touch input: in accordance with a determination that a (e.g., non-zero) threshold amount of time has elapsed since detecting the liftoff of the first touch input (e.g., 0.5 sec, 1 sec, 2 sec, 4 sec, 5 sec, or other length of time, optionally system-defined or user-selected) (e.g., in addition to a determination that a touch input is not currently being detected via the touch-sensitive surface), the computer system ceases to display the focus indicator; and, in accordance with a determination that the threshold amount of time has not elapsed since detecting the liftoff of the first touch input, the computer system maintains display of the focus indicator. For example, as described herein with reference to FIG. 7G, computer system 101 optionally continues to display cursor 7034 after detecting the liftoff of input 7032 from trackpad 7102 until a threshold amount of time $T_{th}$ has elapsed since detecting the liftoff of input 7032 from trackpad 7102, at which time computer system 101 automatically ceases to display cursor 7034. Hiding the focus indicator after a threshold amount of time has elapsed since contact with the touch-sensitive surface has ended (e.g., after a liftoff event is detected) provides improved visual feedback to the user that placement and/or movement of the cursor is controlled with touch input while providing the user with a window of opportunity (for the duration of the threshold amount of time) to further manipulate the focus indicator (e.g., by reestablishing contact with the touch-sensitive surface). Displaying the focus indicator in response to detecting a touch input and hiding the focus indicator after a threshold amount of time has elapsed since liftoff of the touch input has been detected assists and/or guides the user in placing and controlling the focus indicator in an environment.

In some embodiments, while displaying the focus indicator, the computer system detects initiation of an air gesture (e.g., at least an initial portion of an air pinch gesture, air tap gesture, or other air gesture) and, in response to detecting the initiation of the air gesture, ceases to display the focus indicator (optionally, even if the first touch input continues to be detected). For example, as described herein with reference to FIG. 7K, computer system 101 ceases to display cursor 7034 in response to detecting the gesture by hand 7022. Hiding the focus indicator when an air gesture is performed or at least initiated provides improved visual feedback initially indicating a target location for interaction and then indicating that a selection and/or activation of the target is initiated (e.g., activation of a user interface element, selection of a link, or other user interface targets), and allows the user to employ different modes of input when interacting with the environment (e.g., touch input, gaze input, and/or air gestures), thereby reducing the number and/or extent of inputs needed to place the focus indicator at a target location and interact with the target.

In some embodiments, the movement of the first touch input during the continuation of the first touch input includes movement in a first direction. In some circumstances, during the movement of the first touch input in the first direction, the computer system detects movement of the gaze input in a second direction that is different from the first direction (e.g., beyond a directional threshold, such as more than a threshold angular distance, from the first direction). In some embodiments, the movement of the focus indicator in accordance with the magnitude of the movement of the first touch input is in the first direction (e.g., without regard to the movement of the gaze input in the second direction). For example, as described herein with reference to FIG. 7E, cursor 7034 is moved toward the upper right portion of window 7010 in accordance with the movement of input 7032 along trackpad 7102, even though user 7002's gaze is directed to element E3 in the bottom portion of window 7010, and even if user 7002's gaze moved in the opposite direction, to speaker 7016. Analogously, as described herein for example with reference to FIG. 7D, cursor 7034 continues to be displayed at the same location in the three-dimensional environment in accordance with input 7032 being maintained at the same location on trackpad 7102, even as user 7002 moves their gaze around to different locations in the three-dimensional environment. Controlling movement of the focus indicator in accordance with movement of one or more fingers on the touch-sensitive surface (e.g., the focus indicator is moved in accordance with direction and/or magnitude of movement of the one or more fingers) even if a user's gaze is moving in a different direction, disambiguates a user's intent to move the focus indicator or to look at different portions of the environment and/or reduces the amount of time needed to move the focus indicator (e.g., by reducing errors and/or unintended relocations of the focus indicator).

In some circumstances, the computer system detects movement of the gaze input to a location within a user interface of a second application that is different from the first application; detects liftoff of the first touch input; and, while the gaze input is directed to the location within the user interface of the second application, detects, via the touch-sensitive surface, a second touch input. In some embodiments, in response to detecting the second touch input, the computer system displays the focus indicator at the location outside of the boundary of the user interface of the first application. For example, although cursor 7034 is stopped at the boundary of window 7010 while input 7032 continues to be detected on trackpad 7102, as described herein with reference to FIGS. 7E-7F, cursor 7034 is displayed in window 7012 in response to detection of the liftoff of input 7032 and detection of subsequent input 7040, as described herein with reference to FIGS. 7G-7H. In another example, as described herein with reference to FIG. 7J, cursor 7034 is moved from the boundary of window 7012 to element E3 in window 7010 in response to detection of the liftoff of the prior input (e.g., input 7040 of FIG. 7H or, in an alternate transition, input 7044 of FIG. 7I) and detection of a subsequent input 7046. Controlling whether a focus indicator is relocated from a location within an active application (e.g., one that is in focus) to a location within a different, optionally inactive application (e.g., one that is not in focus but to which a user's gaze is directed), depending on whether contact with the touch-sensitive surface ceases and is then reestablished, makes user-device interaction in the environment more efficient by reducing accidental inputs and unwanted relocations of the focus indicator and by reducing the number and/or extent of inputs and amount of time needed to move the focus indicator between applications.

In some circumstances, while the focus indicator is displayed at a location within a user interface of a third application (e.g., the first application or the second application or another application), the computer system detects liftoff of the first touch input; detecting, via the touch-sensitive surface, a third touch input; and detects movement of the gaze input. In some embodiments, in response to detecting the third touch input: in accordance with a determination that the third touch input is detected while the focus indicator remains displayed (e.g., the same instance of the focus indicator is still displayed, before the current instance of the focus indicator has ceased to be displayed) and while the gaze input is directed to the user interface of a fourth application that is different from the third application, the computer system ceases to display the focus indicator at the location within the user interface of the third application and displays the focus indicator at a location within the user interface of the fourth application (e.g., a location corresponding to the location to which the gaze input is directed) (e.g., as described herein with reference to FIG. 7J, computer system 101 moves cursor 7034 from window 7012 to window 7010 in response to detecting input 7046 while user 7002's gaze is directed to element E3 in window 7010). In some embodiments, in response to detecting the third touch input: in accordance with a determination that the third touch input is detected while the focus indicator remains displayed and while the gaze input is directed to the user interface of the third application, the computer system maintains the focus indicator at the location within the user interface of the third application (e.g., without moving the focus indicator to a location corresponding to the location to which the gaze input is directed) (e.g., as described herein with reference to FIG. 7J, if user 7002's gaze were directed to another location in window 7012 when input 7046 is detected, in response to detecting input 7046, computer system 101 would not jump cursor 7034 to the other location to which user 7002's gaze is directed). Controlling relocation of a focus indicator from one application to another when contact with the touch-sensitive surface ceases and then is reestablished while a user is gazing at the other application, and maintaining the position of the focus indicator when the location of user's gaze is within the same application, makes user-device interaction in the environment more efficient by reducing accidental inputs and unwanted relocations of the focus indicator and by reducing the number and/or extent of inputs and amount of time needed to move the focus indicator between applications.

In some embodiments, in response to detecting the third touch input: in accordance with a determination that the third touch input is detected while the focus indicator is not displayed (e.g., the focus indicator has ceased to be displayed), the computer system displays the focus indicator at a location corresponding to a respective location to which the gaze input is directed when the third touch input is detected. For example, as described herein with reference to FIGS. 7G-7H, in response to detecting input 7040 while user 7002's gaze is directed to location 7042 in window 7012, and because cursor 7034 was not displayed when input 7040 was initially detected, computer system 101 displays cursor 7034 initially at location 7042 (e.g., even if cursor 7034 had previously been displayed at a different location in window 7012). In another example, as described herein with reference to FIG. 7J, if input 7046 were detected while user 7002's gaze is directed to another location in window 7012 and while cursor 7034 is not displayed, in response to detecting input 7046, computer system 101 would display cursor 7034 at the other location in window 7012 to which user 7002's gaze is directed). In some embodiments, after detecting the liftoff of the first touch input, the focus indicator ceases to be displayed (e.g., after a predetermined period of time or in response to initiation or performance of another type of input such as an air gesture). In some embodiments, in response to detecting the third touch input: in accordance with a determination that the third touch input is detected while the focus indicator is not displayed and while the gaze input is directed to a location within the user interface of the third application, the computer system displays the focus indicator at the location within the user interface of the third application. In some embodiments, in response to detecting the third touch input: in accordance with a determination that the third touch input is detected while the focus indicator is not displayed and while the gaze input is directed to a location within the user interface of the fourth application, the computer system displays the focus indicator at the location within the user interface of the fourth application. Controlling placement of a focus indicator with a user's gaze after the focus indicator was hidden makes user-device interaction in the environment more efficient by reducing the number and complexity of inputs needed to place the focus indicator at a target location.

In some circumstances, while displaying the focus indicator within the user interface of the first application, and while detecting the gaze input directed to a location within a user interface of a fifth application that is different from the first application, the computer system detects, via the touch-sensitive surface, a respective touch input that includes movement of the respective touch input along the touch-sensitive surface. In some embodiments, in response to detecting the respective touch input: in accordance with a determination that the respective touch input is a continuation of the first touch input without detecting liftoff of the first touch input, the computer system continues to display the focus indicator within the user interface of the first application, including moving the focus indicator within the user interface of the first application in accordance with the movement of the respective touch input (e.g., without moving the focus indicator outside of the boundary of the user interface for the first application); and, in accordance with a determination that the respective touch input is detected after detecting liftoff of the first touch input, the computer system displays the focus indicator at the location within the user interface of the fifth application to which the gaze input is directed. For example, as described herein with reference to FIGS. 7E-7H, cursor 7034 is constrained to move within window 7010 while input 7032 continues to be detected on trackpad 7102; in order for cursor 7034 to be displayed in window 7012, computer system 101 must detect liftoff of input 7032 from trackpad 7102 followed by detecting subsequent input 7040 on trackpad 7102. When the location of the focus indicator and the location to which a user's gaze is directed are within different applications, there is a need to determine the intended target location of an input that relocates the focus indicator. In such circumstances, relocating the focus indicator within the boundaries of a currently active application (e.g., one within which the focus indicator is located) in accordance with movement of a contact along the touch-sensitive surface and relocating outside the boundaries of the currently active application, to a different application, in response to detecting a liftoff followed by a touch down event (e.g., contact reestablished with a touch-sensitive surface), makes user-device interaction in the environment more efficient by reducing accidental inputs and unwanted relocations of the focus indicator and by reducing the number and/or extent of inputs and amount of time needed to move the focus indicator.

In some embodiments, while the focus indicator corresponds to a user interface element within the user interface of the first application, the computer system detects a press of the touch-sensitive surface (e.g., a press input that includes an increase of an intensity of a contact detected on the touch-sensitive surface above a threshold intensity) and, in response to detecting the press of the touch-sensitive surface, performs a selection operation with respect to the user interface element (e.g., as described herein with reference to FIG. 7J). Performing a selection with a press input (e.g., rather than movement of a touch input), disambiguates user's intent to select a target or to relocate the focus indicator and makes user-device interaction in the environment more efficient by reducing the number and complexity of inputs needed to activate or otherwise interact with a target.

In some circumstances, the computer system detects movement of the gaze input to a respective location in the environment; detects liftoff of the touch input; and, while the gaze input is directed to the respective location in the environment, detects, via the touch-sensitive surface, a fourth touch input. In some embodiments, in response to detecting the fourth touch input, in accordance with a determination that the respective location in the environment is capable of displaying a focus indicator, the computer system displays the focus indicator at the respective location in the environment. For example, as described herein with reference to FIG. 7J as a transition from FIG. 7H or from FIG. 7I, cursor 7034 is displayed at the valid cursor location in element E3 in FIG. 7J in response to computer system 101 detecting liftoff of the prior input (e.g., input 7040 of FIG. 7H or input 7044 of FIG. 7I) from trackpad 7102 and detecting subsequent input 7046 on trackpad 7102. In some embodiments, if the focus indicator was displayed when the fourth touch input is detected, in response to detecting the fourth touch input, the focus indicator is moved from its prior location (e.g., within the boundary of the user interface of the first application) to the respective location in the environment (e.g., as described herein with reference to FIG. 7J, cursor 7034 is moved from the prior location of cursor 7034 at the boundary of window 7012 in FIG. 7H or FIG. 7I to the location in element E3 of window 7010). Using a liftoff followed by a touch down event as a condition for relocating a focus indicator to a location to which a user's gaze is directed, and ignoring such input by not relocating the focus indicator when the user's gaze is directed to a location that is interpreted by the computer system as invalid for displaying a focus indicator (e.g., outside the bounds of a currently active user interface), makes user-device interaction in the environment more efficient by reducing accidental inputs and unwanted relocations of the focus indicator and by reducing the number and/or extent of inputs and amount of time needed to move the focus indicator.

In some embodiments, in response to detecting the fourth touch input, in accordance with a determination that the respective location in the environment is not capable of displaying a focus indicator, the computer system forgoes displaying the focus indicator at the respective location in the environment. In some embodiments, if the focus indicator was displayed when the fourth touch input is detected, in response to detecting the fourth touch input, the focus indicator is maintained at its prior location (e.g., within the boundary of the user interface of the first application). For example, as described herein with reference to FIGS. 7H-7I, cursor 7034 continues to be displayed at the boundary of window 7012 in response to computer system 101 detecting liftoff of prior input 7040 from trackpad 7102 and detecting subsequent input 7044 on trackpad 7102, because, as shown in FIG. 7I, the location on floor 7008' to which user 7002's gaze is directed when input 7044 is detected an invalid cursor location. In some embodiments, if the focus indicator was not displayed when the fourth touch input is detected, the focus indicator continues to not be displayed (e.g., as described herein with reference to FIG. 7I). Maintaining a focus indicator as hidden or at a current location when a user's gaze is directed to a location that is interpreted by the computer system as an invalid focus indicator location makes user-device interaction in the environment more efficient by reducing accidental inputs and unwanted relocations of the focus indicator.

In some embodiments, the computer system detects, via the touch-sensitive surface, a fifth touch input; and, in response to detecting the fifth touch input: in accordance with a determination that the fifth touch input includes a chorded gesture (e.g., including multiple concurrent touches) detected while the gaze input is directed to a third region in the environment, the computer system provides information about the fifth touch input to the third region (e.g., to enable the third region to determine whether to perform an operation associated with the chorded gesture, such as whether to perform a zoom operation associated with a pinch or depinch gesture, a scrolling operation associated with a two-finger swipe or drag gesture, or other operation-gesture mapping). In some embodiments, in response to detecting the fifth touch input: in accordance with a determination that the fifth touch input includes the chorded gesture detected while the gaze input is directed to a fourth region in the environment, the computer system provides information about the fifth touch input to the fourth region (e.g., to enable the fourth region to determine whether to perform an operation associated with the chorded gesture, such as whether to perform a zoom operation associated with a pinch or depinch gesture, a scrolling operation associated with a two-finger scroll gesture, or other operation-gesture mapping). In some embodiments, in response to and while detecting the chorded gesture, and optionally for a threshold amount of time after an end of (e.g., a current instance of) the chorded gesture, the computer system forgoes (e.g., ceases to and continues to forgo) displaying the focus indicator. For example, as described herein with reference to FIG. 7K, information about a chorded gesture detected on trackpad 7102 is delivered to software associated with whichever window user 7002 is gazing at when the chorded gesture is detected. Determining a target of a gesture input (e.g., a target application user interface that is to receive the gesture input) based on the location to which a user's gaze is directed when the gesture input is detected, if the gesture input includes multiple contact points with the touch-sensitive surface (e.g., a multi-finger touch input), without requiring that a focus indicator be first moved to the target, makes user-device interaction in the environment more efficient by reducing the amount of time needed to perform certain types of operations (e.g., scrolling, zooming in and out, or other types of operations that are associated with multi-finger touch inputs).

In some embodiments, in response to detecting the fifth touch input, in accordance with a determination that the fifth touch input does not include a chorded gesture (e.g., the fifth touch input includes a single touch rather than multiple concurrent touches), the computer system displays and moving the focus indicator at least partially in accordance with movement of the fifth touch input (e.g., subject to being constrained by the boundary of an application user interface) (e.g., as described herein with reference to the movement of cursor 7034 at least partially in accordance with the movement of input 7032 in FIGS. 7E-7F and the movement of cursor 7034 at least partially in accordance with the movement of input 7040 in FIG. 7H). Relocating a focus indicator in accordance with movement along the touch-sensitive surface when a single contact point with the touch-sensitive surface (e.g., only one finger in contact) is detected makes user-device interaction in the environment more efficient by reducing the number and complexity of inputs and/or amount of time needed to relocate the focus indicator.

In some embodiments, in response to detecting the fifth touch input, in accordance with a determination that the fifth touch input includes the chorded gesture, the computer system forgoes displaying (e.g., ceasing to display, if displayed) the focus indicator (e.g., as described herein with reference to FIG. 7K). In some embodiments, in response to and while detecting the chorded gesture, and optionally for a threshold amount of time after an end of (e.g., a current instance of) the chorded gesture, the computer system forgoes (e.g., ceases to and continues to forgo) displaying the focus indicator (e.g., a user can continue to scroll a user interface with repeated instances of a two-finger scroll gesture on a trackpad, if the instances of the gesture are within the threshold amount of time of each other, without a cursor being displayed during the scrolling, and especially without a cursor being intermittently displayed during the scrolling). During a gesture input that includes multiple contact points with the touch-sensitive surface, hiding the focus indicator, optionally in conjunction with (e.g., before, after, in response to, or caused by) determining a target of the gesture input based on a location of a user's gaze, provides improved visual feedback that the target of the gesture input has been determined and automatically reduces clutter in the user interface, which makes user-device interaction in the more efficient by reducing accidental inputs.

In some embodiments, while forgoing displaying the focus indicator in response to detecting the fifth touch input (e.g., while the focus indicator is not displayed after detecting the fifth touch input), the computer system detects a sixth touch input and, in response to detecting the sixth touch input: in accordance with a determination that the sixth touch input is detected while the gaze input is directed to a location within the user interface of a sixth application, displays the focus indicator at the location within the user interface of the sixth application; and, in accordance with a determination that the sixth touch input is detected while the gaze input is directed to a location within the user interface of a seventh application, displays the focus indicator at the location within the user interface of the seventh application. For example, as described herein with reference to FIGS.

7G-7H, in response to detecting input 7040 while cursor 7034 is not displayed (e.g., had computer system 101 ceased to display cursor 7034 in response to detecting a chorded gesture as described herein with reference to FIG. 7K), computer system 101 displays cursor 7034 at the location in window 7012 to which user 7002's gaze is directed when input 7040 is detected. Redisplaying the focus indicator at a location of user's gaze after the focus indicator was hidden makes user-device interaction in the environment more efficient by reducing the number and complexity of inputs needed to place the focus indicator at a target location.

In some embodiments, the fifth touch input includes a chorded gesture associated with performing a zoom operation (e.g., a pinch or depinch gesture, or other zoom gesture) (e.g., as described herein with reference to FIG. 7K). In some embodiments, providing the information about the fifth touch input to the third or fourth region enables the third or fourth region, respectively, to determine whether to perform the zoom operation. Determining a target of a gesture input (e.g., a target application user interface that is to receive the gesture input), for a chorded gesture input requesting that a zooming operation be performed, based on a location of a user's gaze without requiring that a focus indicator be first moved to the target makes user-device interaction in the environment more efficient by reducing accidental inputs and reduces the number of inputs and/or amount of time needed to zoom in or out.

In some embodiments, the fifth touch input includes a chorded gesture associated with performing a scrolling operation (e.g., a two-finger swipe or drag gesture, or other scrolling gesture) (e.g., as described herein with reference to FIG. 7K). In some embodiments, providing the information about the fifth touch input to the third or fourth region enables the third or fourth region, respectively, to determine whether to perform the scrolling operation. Determining a target of a gesture input (e.g., a target application user interface that is to receive the gesture input), for a chorded gesture input requesting that a scrolling operation be performed, based on a location of a user's gaze without requiring that a focus indicator be first moved to the target makes user-device interaction in the environment more efficient by reducing accidental inputs and reduces the number of inputs and/or amount of time needed to scroll a user interface.

In some embodiments, aspects/operations of methods 1200, 1300, and 1400 may be interchanged, substituted, and/or added between these methods. For example, the focus indicators (or other indications of focus) of method 1100 optionally also move across gaps between user interface regions as described in method 1200 and/or are used during interactions with some types of objects (e.g., two-dimensional objects) as described in method 1300. For brevity, these details are not repeated here.

FIG. 12 is a flow diagram of an exemplary method 1200 for moving focus indicators across gaps between user interface regions in an environment, in accordance with some embodiments. In some embodiments, method 1200 is performed at a computer system (e.g., computer system 101 in FIG. 1) that is in communication with a display generation component (e.g., display generation component 120 in FIGS. 1A, 3, and 4) (e.g., a hardware element, comprising one or more display devices, such as a display, a touchscreen, a projector, a heads-up display, a head-mounted display, or the like) and one or more input devices (e.g., one or more cameras (e.g., color sensors, infrared sensors, structured light scanners, and/or other depth-sensing cameras) that point downward at a user's hand, forward from the user's head, and/or that faces the user; eye-tracking devices; user-held and/or user-worn controllers; touch-sensitive surfaces; and/or other input hardware), and optionally one or more tactile output generators (e.g., tactile output generators 170 in FIG. 1). In some embodiments, the method 1200 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1200 are, optionally, combined and/or the order of some operations is, optionally, changed.

As described herein, method 1200 automatically relocates a focus indicator across user interfaces (or other regions) that are spatially separated in an environment such as a mixed-reality three-dimensional environment when certain movement criteria are satisfied. In particular, when a user requests to relocate the focus indicator from a first user interface to a second user interface and a respective movement input satisfies one or more movement criteria (e.g., distance, speed, velocity, acceleration, and other criteria), the focus indicator is automatically relocated from a position within boundaries of the first user interface to a position within boundaries of the second user interface, without displaying the focus indicator in or moving through the space in between the first and the second user interface. To put it differently, the focus indicator appears to "jump" or "teleport" across the user interfaces. Automatically "teleporting" the focus indicator across regions in the environment that are spatially separated, reduces the amount of movement and/or the amount of time needed to move a focus indicator in environments. These and other benefits of method 1200 are especially beneficial when the space between the regions is large (e.g., one application is displayed in a foreground closer to user's point of view compared to the other application, which is displayed further away from the user's point of view in the background and/or periphery).

While a view of an environment is visible via the display generation component (e.g., the environment being a two-dimensional or three-dimensional environment that includes one or more computer-generated portions and optionally one or more passthrough portions) (1202), the computer system displays (1204) a user interface (e.g., user interface 7050 (FIG. 8A) that includes a first user interface region (e.g., user interface region E1 (FIG. 8A)) and a second user interface region (e.g., user interface region E2-E3 (FIG. 8A)). The first user interface region and the second user interface region are separated by a third region (e.g., the first region of the user interface is not contiguous with the second region, and the third region creates a gap between the first region and the second region). In some embodiments, the third region is capable of displaying content and in some circumstances optionally displays content that is not part of the user interface that includes the first and second user interface regions (e.g., as described herein with reference to FIG. 8A, the gap between user interface region E1 and user interface region E2-E3 includes a view of a portion of wall 7004' that is part of the view of the three-dimensional environment and not part of user interface 7050). The computer system also displays (1206) a focus indicator within the first user interface region (e.g., cursor 7034 (FIG. 8A)).

The computer system detects (1208), via the one or more input devices, an input to move the focus indicator relative to the user interface (e.g., movement of an input manipulator such as a user's gaze, a hand of the user, a contact on a touch-sensitive surface, or other input movement). The input is associated with movement toward the second user interface region (e.g., as described herein with reference to FIGS. 8A-8D, the movement of input 7048 along trackpad 7102 is associated with movement of cursor 7034 toward user interface region E2-E3).

In response to detecting the input that is associated with the movement toward the second user interface region (1210): in accordance with a determination that the input meets a first set of one or more criteria based on the movement associated with the input (e.g., for moving the focus indicator from the first user interface region to the second user interface region) (1212), the computer system moves (1214) the focus indicator from the first user interface region to the second user interface region in accordance with the movement associated with the input, including transitioning directly from displaying the focus indicator at a position corresponding to a boundary of the first user interface region to displaying the focus indicator at a position corresponding to the second user interface region (e.g., and ceasing to display the focus indicator in or corresponding to the first user interface region) without displaying the focus indicator in the third region between the first user interface region and the second user interface region (e.g., moving the focus indicator directly from a position corresponding to a boundary of the first user interface region to a position corresponding to a boundary, or other portion, of the second user interface region, without displaying the focus indicator in or moving through the third region). For example, as described herein with reference to FIG. 8D (e.g., FIGS. 8D1-8D2), as a transition from FIG. 8B, in response to detecting the movement of input 7048 requesting movement of cursor 7034 toward user interface region E2-E3, and in accordance with a determination that input 7048 meets criteria for moving cursor 7034 across the gap between user interface region E1 and user interface region E2-E3 (e.g., input 7048 moves by at least the threshold distance $D_{th}$ and/or with at least a threshold velocity $V_{th}$), computer system 101 ceases to display cursor 7034 at the boundary of user interface region E1 and instead displays cursor 7034 in user interface region E2-E3 (e.g., at or near the boundary of user interface region E2-E3).

In response to detecting the input that is associated with the movement toward the second user interface region (1210): in accordance with a determination that the input does not meet the first set of one or more criteria based on the movement associated with the input (1216), the computer system changes (1218) an appearance of the focus indicator in accordance with the movement associated with the input while continuing to display at least a portion of the focus indicator within the first user interface region (e.g., moving the focus indicator within the first user interface region in accordance with movement of the input, without displaying the focus indicator in or moving through the third user interface region and without moving the focus indicator to the second user interface region). In some embodiments, if the input does not meet the movement criteria, the focus indicator is restricted from moving beyond the boundary of the first user interface region. For example, as described herein with reference to FIG. 8B, in response to detecting the movement of input 7048 requesting movement of cursor 7034 toward user interface region E2-E3, and in accordance with a determination that input 7048 has not met criteria for moving cursor 7034 across the gap between user interface region E1 and user interface region E2-E3 (e.g., input 7048 has moved by less than the threshold distance $D_{th}$ and/or moves with less than the threshold velocity $V_{th}$), computer system 101 continues to display cursor 7034 in window 7010, with an appearance of being clipped or masked by the boundary of user interface region E1 when cursor 7034 is positioned at the boundary of user interface region E1, without allowing cursor 7034 to be moved beyond the boundary of user interface region E1.

In some embodiments, the computer system detects an end of the input (e.g., liftoff of a touch input or completion of an air gesture) and, in response to detecting the end of the input, in accordance with a determination that the input did not meet the first set of one or more criteria based on the movement associated with the input, displays the focus indicator entirely within the first user interface region (e.g., without having moved the focus indicator from the first user interface region to the second user interface region). For example, as described herein with reference to FIG. 8C (e.g., FIGS. 8C1-8C2), in response to detecting liftoff of input 7048, cursor 7034 is shifted slightly downward so that cursor 7034 is fully visible in window 7010 instead of being partially clipped or masked by the boundary of window 7010. In some embodiments, the focus indicator is moved back to a position the focus indicator was in before (e.g., immediately before, right before) the relocation of the focus indicator was initiated, and optionally a visual effect of the focus indicator bouncing back to a prior position is provided to indicate that the focus indicator has been returned to the prior position. In some embodiments, the focus indicator is moved back to a position the focus indicator was in before (e.g., immediately before, right before) the relocation was initiated when the focus indicator has reached a respective boundary of the first user interface region without satisfying one or more of the movement criteria (e.g., when the velocity threshold is not satisfied). In some embodiments, the focus indicator is moved to a predefined position (e.g., different from the position the focus indicator was in before the relocation process was initiated or different from a position the focus indicator was when termination of the process was detected) when the focus indicator has reached a respective boundary of the first user interface region without satisfying one or more of the movement criteria. In some embodiments, the focus indicator remains at a position the focus indicator was in when the relocation process is terminated (e.g., when a touch input stops moving across the touch-sensitive surface; when a lift off from the touch-sensitive surface is detected; and/or when a hand stops moving through space). Adjusting a position of the focus indicator that is at a boundary of a user interface region and only partially visible so that the focus indicator is fully visible within the user interface region, in response to a respective movement input terminating before movement criteria for relocating the focus indicator to a different user interface region are satisfied, assists and/or guides the user with relocating the focus indicator through gaps in user interfaces in environments and/or provides visual feedback that the computer system is responsive to the user's input but that the relocation process has not been completed (e.g., due to insufficient magnitude or velocity of the movement input).

In some embodiments, the computer system moves the focus indicator from a first location in the first user interface region to a second location in the first user interface region in accordance with a first magnitude of movement of the input, and moves the focus indicator from the second location in the first user interface region to a third location in the first user interface region in accordance with the first magnitude of movement of the input. In some embodiments, the third location is closer to the second user interface region than the second location is to the second user interface region; and a distance between the third location and the second location is less than a distance between the second location and the first location. In other words, as the focus indicator moves closer to the second user interface region (e.g., closer to the boundary of the first user interface region near the second user interface region), the amount of movement of the focus indicator for a given increment of movement of the input decreases (e.g., the ratio of focus indicator movement to input movement decreases) as the focus indicator approaches the second user interface region and/or as the amount of movement of the input (or focus selector) approaches a threshold amount of movement required in order for the input to meet the first set of one or more criteria (e.g., for moving the focus indicator from the first user interface region across the gap to the second user interface region). For example, as described herein with reference to FIG. 8B, as the amount of movement of input 7048 approaches the distance threshold Din for moving cursor 7034 across the gap between user interface region E1 and user interface region E2-E3, the amount of movement of cursor 7034 decreases (e.g., for the same increment of movement, distance $d_1$, of input 7048). Decreasing a ratio of focus indicator movement to a respective input movement (e.g., one that requests the relocation of the focus indicator), makes user-device interaction more efficient by reducing the amount of movement and/or time needed to relocate the focus indicator in the environment (e.g., the focus indicator jumps intuitively between spatially separated regions with reduced amount of movement compared to without the jump).

In some embodiments, determining that the input meets the first set of one or more criteria based on the movement associated with the input includes determining that a velocity of the input satisfies a threshold velocity (e.g., threshold velocity Vin, as described herein with reference to FIGS. 8A-8H). In some embodiments, the input meets the first set of one or more criteria if the velocity of the input is greater than, or alternatively less than, the threshold velocity. Automatically relocating the focus indicator from a first position within a first region (e.g., first application user interface) to a second position within a second region (e.g., second application user interface) without displaying the focus moving through space in between the first and the second regions when a respective movement input satisfies a velocity threshold criterion (optionally in addition to other criteria), makes the user-device interaction more efficient by reducing the amount of movement and/or the amount of time needed to move the focus indicator in three-dimensional environments In some embodiments, determining that the input meets the first set of one or more criteria based on the movement associated with the input includes determining that a magnitude of movement of the input satisfies a threshold distance (e.g., threshold velocity $D_{th}$, as described herein with reference to FIGS. 8A-8H). In some embodiments, the input meets the first set of one or more criteria if the magnitude of the movement of the input is greater than, or alternatively less than, the threshold distance. Automatically relocating the focus indicator from a first position within a first region (e.g., first application user interface) to a second position within a second region (e.g., second application user interface) without displaying the focus moving through space between the first and the second regions when a respective movement input satisfies a movement threshold criterion (optionally in addition to other criteria), makes the user-device interaction more efficient by reducing the amount of movement and/or the amount of time needed to move the focus indicator in three-dimensional environments.

In some embodiments, moving the focus indicator from the first user interface region to the second user interface region in accordance with the movement associated with the input includes ceasing to display the focus indicator in the first user interface region and displaying the focus indicator in the second user interface region. For example, as described herein with reference to FIGS. 8D, as a transition from FIG. 8B, in moving cursor 7034 from user interface region E1, across the gap between user interface region E1 and user interface region E2-E3, to user interface region E2-E3, computer system 101 ceases to display cursor 7034 at the boundary of user interface region E1 and instead displays cursor 7034 in user interface region E2-E3 (e.g., at or near the boundary of user interface region E2-E3). Ceasing to display the focus indicator within the first region and directly displaying the focus indicator in the second region (e.g., without displaying the focus moving through the space or gap between the two regions), provides ongoing improved visual feedback to a user of a current location of the focus indicator.

In some embodiments, changing the appearance of the focus indicator (e.g., in accordance with the determination that the input does not meet the first set of one or more criteria based on the movement associated with the input) includes forgoing displaying a portion of the focus indicator that is outside of the first user interface region (e.g., that is past the boundary of the first user interface region) (e.g., while continuing to display at least a portion of the focus indicator within the first user interface region). For example, as described herein with reference to 8B, cursor 7034, when positioned at the boundary of user interface region E1, has an appearance of being clipped or masked by the boundary of user interface region E1, in that a portion of cursor 7034 (e.g., that is within window 7010) is displayed and a portion of cursor 7034 (e.g., that would be outside of window 7010 if displayed) is not displayed. Other examples of a cursor being clipped or masked by the boundary of a user interface region are illustrated in and described herein with reference to FIGS. 7E-7F and 7H-7I and method 1100. Masking a portion of the focus indicator when the focus indicator reaches a boundary within the first region without satisfying the one or more input movement criteria, provides visual feedback that the computer system is responding to the input movement but that the input movement is insufficient to directly relocate (or "teleport") across the spatially separated user interfaces, thereby by reducing the amount of movement and/or the amount of time needed to move the focus indicator in three-dimensional environments (e.g., by reducing errors or improper inputs).

In some embodiments, the first user interface region corresponds to (e.g., is part of a user interface of) a respective application, and the second user interface region corresponds to the respective application. In some embodiments, the first user interface region and the second user interface region correspond to the same application, and are optionally different regions of a user interface of the application, such as a content region and a toolbar or menu bar. For example, as described herein with reference to FIG. 8A, user interface regions E1, E2-E3, and E4 are different regions of user interface 7050 corresponding to an application executing on computer system 101. Automatically relocating (or "teleporting") the focus indicator across regions of the same application that are spatially separated, reduces the amount of movement and/or the amount of time needed to move a focus indicator in three-dimensional environments.

In some embodiments, the first user interface region corresponds to a first application, and the second user interface region corresponds to a second application that is different from the first application. For example, user interface regions E1, E2-E3, and E4 in FIGS. 8A-8H are different regions optionally corresponding to different applications. In another example, window 7010 and window 7012 of FIGS. 7A-7K correspond to different applications, and in some embodiments, user 7002 is enabled to move cursor 7034 from window 7010 to window 7012 or vice versa in response to an input analogous to input 7048 of FIG. 8D (e.g., an input that satisfies distance threshold $D_{th}$ and/or velocity threshold $V_{th}$). Automatically relocating (or "teleporting") the focus indicator across regions of the same application that are spatially separated, reduces the amount of movement and/or the amount of time needed to move a focus indicator in three-dimensional environments.

In some embodiments, displaying the focus indicator at the position corresponding to the second user interface region (e.g., in accordance with the determination that the input meets the first set of one or more criteria based on the movement associated with the input) includes displaying the focus indicator entirely within the second user interface region (e.g., without being masked or truncated by a boundary of the second user interface region). For example, as described herein with reference to FIGS. 8D, when cursor 7034 is moved from user interface region E1 to user interface region E2-E3, cursor 7034 is initially displayed at a location in user interface region E2-E3 where cursor 7034 is fully visible (e.g., rather than appearing clipped or masked by the boundary of user interface region E2-E3). Fully displaying the focus indicator once directly relocated (or "teleported") to the second region, provides visual feedback that the computer system is responding to the user's inputs and that the relocation process has been completed successfully (e.g., making it easier for the user to find the current location of the focus indicator).

In some embodiments, moving the focus indicator from the first user interface region to the second user interface region in accordance with the movement associated with the input is performed in accordance with a determination that the first user interface region and the second user interface region are separated by less than a (second) threshold distance (e.g., a width of the third region that creates the gap between the first region and the second region is greater than the (second) threshold distance) (e.g., in addition to the determination that the input meets the first set of one or more criteria based on the movement associated with the input). For example, as described herein with reference to FIG. 8F, cursor 7034 is enabled to be moved from user interface region E4 across a gap to user interface region E1 because the width of the gap between user interface region E4 and user interface region E1 is less than a threshold distance $D_{gap}$; similarly, cursor 7034 is enabled to be moved from user interface region E1 across the gap to user interface region E2-E3 as illustrated in FIG. 8D optionally because the width of the gap between user interface region E1 and user interface region E2-E3 is less than the threshold distance $D_{gap}$. In some embodiments, in accordance with a determination that the first user interface region and the second user interface region are separated by more than the threshold distance (e.g., the width of the third region that creates the gap between the first region and the second region is greater than the threshold distance) (e.g., whether or not the input meets the first set of one or more criteria based on the movement associated with the input), the computer system changes the appearance of the focus indicator in accordance with the movement associated with the input while continuing to display at least a portion of the focus indicator within the first region. For example, as described herein with reference to FIG. 8F, cursor 7034 is not enabled to be moved from user interface region E2-E3 across a gap to user interface region E4 because the width of the gap, or distance, between user interface region E2-E3 and user interface region E4 is greater than the threshold distance $D_{gap}$; accordingly, cursor 7034, if displayed as a circle instead of as the element fill shown in FIG. 8F, would be displayed at the left boundary of user interface region E2-E3 and would have the appearance of being clipped or masked by the left boundary of interface region E2-E3. Preventing "teleportation" of the focus indicator if a distance between the two spatially separated regions is more than a predetermined amount, makes the user-device interaction more efficient by reducing improper movement inputs that that would relocate the focus indicator too far away where it is hard to see and/or operate because of the large distance from user's point of view.

In some embodiments, the input is associated with movement in a first direction toward the second user interface region. In some embodiments, moving the focus indicator from the first user interface region to the second user interface region in accordance with the movement associated with the input includes: moving the focus indicator in the first direction; and, in accordance with a determination that a boundary of the second user interface region is offset from the boundary of the first user interface region in a second direction that is different from (e.g., more than a threshold angular distance from, such as substantially orthogonal to) the first direction (and optionally in accordance with a determination that the offset is less than a threshold offset), moving the focus indicator in the second direction. In some embodiments, after the movement of the focus indicator in both the first and second directions, the focus indicator is displayed at the position corresponding to the second user interface region without having been displayed in the third region between the first user interface region and the second user interface region. For example, as described herein with reference to FIG. 8H, cursor 7034 is enabled to be moved from user interface region E4 across a gap to user interface region E1 even though the location of cursor 7034, when cursor 7034 reaches the boundary of user interface region E4, is offset from the nearest edge of user interface region E1, because the amount of offset is less than a threshold distance $D_{offset}$ (e.g., delineated by dashed lines 7064 and 7066 in FIG. 8H). In some embodiments, in accordance with a determination that the boundary of the second user interface region is not offset from the boundary of the first user interface region in the second direction, the computer system moves the focus indicator from the first user interface region to the second user interface region in the first direction in accordance with the movement associated with the input, without moving the focus indicator in the second direction (e.g., and without displaying the focus indicator in the third region). For example, as described herein with reference to FIGS. 8D, cursor 7034 is moved upward from user interface region E1 to user interface region E2-E3 without being moved to the left or right, in accordance with input 7048 moving upward. In some embodiments, in accordance with a determination that the boundary of the second user interface region is offset from the boundary of the first user interface region in the second direction by more than a threshold offset, the computer system moves the focus indicator within the first user interface region in the first direction in accordance with the movement associated with the input without moving the focus indicator to the second user interface region (e.g., without moving the focus indicator in the second direction). Allowing some degree of misalignment between movement trajectory of the focus indicator and a boundary of the second region, reduces the number of inputs and/or the amount of time needed to move a focus indicator across the two spatially separated regions by reducing the need for aligning the focus indicator and allows the focus indicator to be relocated more easily without the need for precision.

In some embodiments, changing the appearance of the focus indicator in accordance with the movement associated with the input includes, in accordance with a determination that the movement associated with the input moves the focus indicator to a location in the user interface that corresponds to an activatable user interface element (e.g., a button or other activatable control), ceasing to display the focus indicator and displaying a visual emphasis of the activatable user interface element (e.g., with a selection outline, highlight, spotlight, and/or other visual emphasis). For example, as described herein with reference to FIG. 8E, when cursor 7034 is moved over activatable element E2, cursor 7034 ceases to be displayed and is replaced with a visual emphasis that fills element E2 (or described another way, cursor 7034 changes from a circle to an element fill). Changing an appearance of the focus indicator from its original form (or image) into a shape of a button (or other activatable control) (e.g., "morphing" the focus indicator into the button) provides ongoing visual feedback of the location of the focus indicator while also indicating the presence of an activatable control at the current location of the focus indicator, thereby reducing the amount of time and/or the number of inputs needed to interact with a variety of objects in the mixed-reality three dimensional environment (e.g., by making it easier to distinguish objects that can be activated from objects that are not activatable).

In some embodiments, while detecting the input to move the focus indicator relative to the user interface, the computer system changes an appearance of the visual emphasis of the activatable user interface element in accordance with a location of the input during the movement associated with the input (e.g., including centering the visual emphasis at the location of the input). For example, as described herein with reference to FIG. 8F, when cursor 7034 is moved over activatable element E2 and changes to a visual emphasis that fills element E2, a portion of the element fill that represents the current location of cursor 7034 is more visually emphasized than other portions of the element fill, such that the location of increased visual emphasis in the element fill moves as input 7048 moves. In some embodiments, while the input to move the focus indicator relative to the user interface is not detected, the computer system changes an appearance of the visual emphasis of the activatable user interface element in accordance with a location of a gaze of a user (e.g., including during movement of the gaze of the user) (e.g., including centering the visual emphasis at the gaze location). While displaying a focus indicator as the shape of a button (or other activatable control) over which the focus indicator is positioned, visually emphasizing a portion of the button that corresponds to a current location of a corresponding input (e.g., a portion at which the focus indicator in another form would have been discretely displayed) provides ongoing visual feedback of the location of the focus indicator while also indicating the presence of an activatable control at the current location of the focus indicator, thereby reducing the amount of time and/or the number of inputs needed to interact with a variety of objects in the mixed-reality three dimensional environment (e.g., by making it easier to distinguish objects that can be activated from objects that are not activatable).

In some embodiments, in response to detecting the input that is associated with the movement toward the second user interface region, in accordance with the determination that the input meets the first set of one or more criteria based on the movement associated with the input, the computer system, in conjunction with moving the focus indicator from the first user interface region to the second user interface region in accordance with the movement associated with the input, generates, via the one or more tactile output generators, a tactile output (e.g., tactile output 7058, generated in conjunction with cursor 7034 being moved from user interface region E1 past the gap to user interface region E2-E3, as described herein with reference to FIG. 8D, or a tactile output generated in conjunction with cursor 7034 being moved from user interface region E4 past the gap to user interface region E1, as described herein with reference to FIG. 8H). In some embodiments, in response to detecting the input that is associated with the movement toward the second user interface region, in accordance with the determination that the movement of the first input does not meet the first set of one or more criteria, the computer system forgoes generating a tactile output in conjunction with moving the content within the first region of the environment and not to the second region of the environment to which the gaze input has been moved (e.g., as described herein with reference to FIGS. 8B-8C, in which a tactile output was optionally not generated in accordance with cursor 7034 not being moved from user interface region E1 past the gap to user interface region E2-E3). Providing haptic feedback when the focus indicator is moving through respective boundaries of the two spatially separated regions improves the user-device interaction by improving accuracy user's input and reducing thereby by reducing the amount of movement and/or the amount of time needed to move the focus indicator in three-dimensional environments (e.g., by reducing errors or improper inputs).

In some embodiments, aspects/operations of methods 1100, 1300, and 1400 may be interchanged, substituted, and/or added between these methods. For example, the focus indicators (or other indications of focus) of method 1200 optionally also are displayed and/or moved as described in method 1100 and/or are used during interactions with some types of objects (e.g., two-dimensional objects) as described in method 1300. For brevity, these details are not repeated here.

FIG. 13 is a flow diagram of an exemplary method 1300 for interacting with objects in a user interface using gaze and/or hand input differently for different types of objects, in accordance with some embodiments. In some embodiments, method 1300 is performed at a computer system (e.g., computer system 101 in FIG. 1) that is in communication with a display generation component (e.g., display generation component 120 in FIGS. 1A, 3, and 4) (e.g., a hardware element, comprising one or more display devices, such as a display, a touchscreen, a projector, a heads-up display, a head-mounted display, or the like) and one or more input devices (e.g., one or more cameras (e.g., color sensors, infrared sensors, structured light scanners, and/or other depth-sensing cameras) that point downward at a user's hand, forward from the user's head, and/or that faces the user; eye-tracking devices; user-held and/or user-worn controllers; touch-sensitive surfaces; and/or other input hardware). In some embodiments, the method 1300 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1300 are, optionally, combined and/or the order of some operations is, optionally, changed.

As described herein, method 1300 provides an improved input mechanism for interacting with different types of objects in a mixed reality three-dimensional environment. In particular, when a user's hand is in an engaged state (e.g., one or more fingers are in contact with a touch-sensitive surface), placement and/or movement of the focus indicator is controlled by gaze input or hand input depending on the type of object that is being interacted with (e.g., a two-dimensional object or a three-dimensional object). The new input mechanism provides an additional input modality (e.g., use of touch input in addition to gaze input and/or air gestures) for interacting with target objects in a complex environment and allows efficient interaction with a variety of objects in the mixed reality three-dimensional (e.g., by reducing the number and complexity of inputs and/or amount of time needed to select one or more objects of different type).

While displaying a user interface (e.g., an environment such as the environment illustrated in FIGS. 9A-9I, the environment being a two-dimensional or three-dimensional environment that includes one or more computer-generated portions and optionally one or more passthrough portions), the computer system detects (1302) an input via the one or more input devices, including detecting a hand of a user. The input is directed to a first location in the user interface (e.g., the user's hand is engaged in interaction with (e.g., in a predefined configuration relative to) an input device of the one or more input devices, such as by being held in a ready state in front of one or more cameras or with one or more fingers in contact with a touch-sensitive surface (e.g., resting thereon, optionally with less than a non-zero threshold amount of contact intensity for a press input)).

In response to detecting the input, the computer system displays (1304) a focus indicator corresponding to a user interface object at the first location in the user interface (e.g., a focus indicator overlaid on or otherwise indicating a first control or interaction point of the user interface object). In some embodiments, the focus indicator corresponding to the user interface object is displayed at the first location in the user interface.

While displaying the focus indicator corresponding to the user interface object, the computer system detects (1306) a continuation of the input that includes movement of the hand of the user and movement of a gaze of the user.

In response to detecting the continuation of the input, the computer system moves (1308) the focus indicator in accordance with the continuation of the input, including: in accordance with a determination that the user interface object is a first type of user interface object, moving (1310) the focus indicator to a second location in the user interface that is selected based on the movement of the gaze of the user (e.g., without being selected based on the movement of the hand of the user), wherein the second location in the user interface is different from the first location in the user interface; and, in accordance with a determination that the user interface object is a second type of user interface object, different from the first type of user interface object, moving (1312) the focus indicator to a third location in the user interface that is selected based on the movement of the hand of the user (e.g., without being selected based on the movement of the gaze of the user), wherein the third location in the user interface is different from the first location in the user interface and the second location in the user interface.

The above-described aspects of method 1300 are described in more detail herein with reference to example user interface 7070, illustrated in FIGS. 9A-9I, that is a first type of user interface object (e.g., three-dimensional content), in comparison with window 7010 and window 7012, illustrated in FIGS. 7A-7K, and user interface 7050, illustrated in FIGS. 8A-8H, that are a second type of user interface object (e.g., two-dimensional content).

Specifically, for the first type of user interface object illustrated in FIGS. 9A-9I, computer system 101 is enabled to change where the indication of focus is displayed in an environment or user interface (e.g., user interface 7070) in response to movement of user 7002's gaze to different locations in the user interface without requiring movement of user 7002's hand (e.g., without requiring movement of an input on trackpad 7102, yet optionally conditioned on user 7002's hand being engaged on (e.g., in contact with) trackpad 7102). For example, as described herein with reference to FIGS. 9B, in response to detecting input 7068 that includes detection of a hand of user 7002 on trackpad 7102 and detection of user 7002's gaze directed to landmark 7072 in user interface 7070, computer system 101 displays an indication that landmark 7072 has focus, by visually emphasizing icon 7074 corresponding to landmark 7072. In an example transition from FIGS. 9B, as described herein with reference to FIG. 9E, in response to detecting input 7098 that is optionally a continuation of input 7068 and that includes detection of a hand of user 7002 on trackpad 7102 and detection of user 7002's gaze moving from landmark 7072 to landmark 7076 in user interface 7070, computer system 101 displays an indication that landmark 7076 has focus instead of landmark 7072, by visually emphasizing icon 7078 corresponding to landmark 7076 and reversing the visual emphasis of icon 7074 corresponding to landmark 7072.

In contrast, for the second type of user interface object, computer system 101 is enabled to require movement of user 7002's hand to change where the indication of focus is displayed (e.g., to move a focus indicator) in an environment or user interface. For example, movement of cursor 7034 (e.g., within an environment more generally, as described herein with reference to FIG. 7D, or within a specific user interface such as within window 7010 or within window 7012, as described herein with reference to FIG. 7J) while cursor 7034 continues to be displayed requires movement of user 7002's hand (e.g., movement of an input along trackpad 7102), rather than movement of user 7002's gaze without movement of an input along trackpad 7102.

In some embodiments, for the first type of user interface object, the movement of the focus indicator, which is based on the movement of the user's gaze, is not based on movement of the user's hand (e.g., movement of the user's hand, without movement of the user's gaze, does not move a focus indicator that corresponds to the first type of user interface object). In some embodiments, for the second type of user interface object, the movement of the focus indicator, which is based on the movement of the user's hand, is not based on movement of the user's gaze (e.g., movement of the user's gaze, without movement of the user's hand, does not move a focus indicator that corresponds to the second type of user interface object).

In some embodiments, the one or more input devices include a touch-sensitive surface, and the hand of the user is detected as engaged in interaction (e.g., with the environment or one or more user interface objects in the environment) when a contact is detected on the touch-sensitive surface (e.g., if a contact is not detected on the touch-sensitive surface, a hand of the user is not detected as engaged in interaction). For example, user 7002's hand is detected as engaged in interaction with computer system 101 when an input is detected on trackpad 7102 (e.g., as described herein for a first type of user interface object with reference to FIG. 9E, in which the indication of focus is moved in accordance with input 7098 being detected on trackpad 7102, in contrast to FIG. 9D, in which the indication of focus is not moved in accordance with an input not being detected on trackpad 7102). Using a contact with a touch-sensitive surface to determine whether an object can be selected with a hand input in addition to gaze input, improves the human-device interaction by reducing the number and complexity of inputs and/or amount of time needed to relocate a focus indicator, select a target, or otherwise interact with a variety of objects in a complex environment.

In some embodiments, the computer system detects a press of the touch-sensitive surface (e.g., an increase of the intensity of the contact detected on the touch-sensitive surface above a threshold intensity) and, in response to detecting the press of the touch-sensitive surface: in accordance with a determination that the press is detected while the focus indicator is displayed at the second location in the user interface, performs a first operation (e.g., a selection or interaction operation) with respect to the second location in the user interface; and, in accordance with a determination that the press is detected while the focus indicator is displayed at the third location in the user interface, performs a second operation (e.g., a selection or interaction operation) with respect to the third location in the user interface. In some embodiments, the second operation is the same as the first operation. For example, for a first type of user interface object (e.g., three-dimensional content) as described herein with reference to FIGS. 9F and 9H, in response to detecting press input 7104 while displaying the indication that landmark 7076 has focus, computer system 101 performs an activation operation with respect to landmark 7076 (FIG. 9F); and, in response to detecting press input 7110 while displaying the indication that landmark 7080 has focus, computer system 101 performs an activation operation with respect to landmark 7080 (FIG. 9H) (e.g., the same type of activation operation as that performed with respect to landmark 7076 in FIG. 9F). In another example, for a second type of user interface object (e.g., two-dimensional content), as described herein with reference to FIG. 7J, in response to detecting a press input while displaying cursor 7034 over element E3, computer system 101 performs an activation operation with respect to element E3 (e.g., the same type of activation operation as that performed with respect to landmark 7076 in FIG. 9F and/or landmark 7080 in FIG. 9H, or a different type of activation operation). Activating a selected object in the environment with a press input on the touch-sensitive surface, helps disambiguate user's intent to activate the selected object or to move the focus indicator, thereby reducing the number and complexity of inputs and/or amount of time needed to relocate a focus indicator and/or activate a selected object in a complex environment that includes a variety of objects.

In some embodiments, determining that the user interface object is the first type of user interface object includes determining that the user interface object is a three-dimensional object (e.g., three-dimensional user interface 7070 (FIGS. 9A-9E)); and determining that the user interface object is the second type of user interface object includes determining that the user interface object is a two-dimensional object (e.g., two-dimensional user interfaces such as window 7010 and window 7012 (FIGS. 7A-7K) and user interface 7050 (FIGS. 8A-8H)). Controlling placement of the focus indicator within a selected object by gaze input when the object is three-dimensional and by hand input when the object is two-dimensional, improves interaction with objects of different dimensionality in the mixed reality three-dimensional, e.g., by reducing the number and complexity of inputs and/or amount of time needed to select an object, activate an object, and/or move the focus selector in the environment.

In some embodiments, while displaying the focus indicator at the first location in the user interface, the computer system detects a first selection input and, in response to detecting the first selection input, performs a third operation (e.g., a selection operation) with respect to the first location in the user interface. In some embodiments, while displaying the focus indicator at the second location in the user interface that is selected based on the movement of the gaze of the user (e.g., in response to detecting the continuation of the input and in accordance with the determination that the user interface object is the first type of user interface object), the computer system detects a second selection input and, in response to detecting the second selection input, performs the third operation (e.g., the selection operation) with respect to the second location in the user interface. For example, as described herein with reference to FIGS. 9F-9H, in response to detecting press input 7104 while displaying the indication that landmark 7076 has focus, computer system 101 performs an activation operation with respect to landmark 7076 (FIG. 9F). Then, in an example transition, computer system 101 detects movement of user 7002's gaze from landmark 7076 to landmark 7080 in user interface 7070, displays an indication that landmark 7080 has focus instead of landmark 7076 (FIG. 9G), and then, in response to detecting press input 7110 while displaying the indication that landmark 7080 has focus, performs an activation operation with respect to landmark 7080 (FIG. 9H) (e.g., the same type of activation operation as that performed with respect to landmark 7076 in FIG. 9F). Selecting multiple objects of the same dimensionality (e.g., three-dimensional objects) first with a gaze input and then using a type of selection input (e.g., a press on a touch-sensitive surface), reduces the number and complexity of inputs and/or amount of time needed to select multiple objects of the same dimensionality in the environment.

In some embodiments, the continuation of the input that includes the movement of the hand of the user and the movement of the gaze of the user is a first continuation of the input that includes first movement of the gaze of the user. In some embodiments, while displaying the focus indicator at the third location in the user interface, the computer system detects a second continuation of the input that includes second movement of the gaze of the user and, in response to detecting the second continuation of the input, in accordance with a determination that the user interface object is the second type of user interface object, forgoes moving the focus indicator to a fourth location in the user interface that is selected based on the second movement of the gaze of the user until ceasing to detect the hand of the user and subsequently detecting the hand of the user (e.g., again). For example, as described herein with reference to FIG. 7H-7J, computer system 101 does not move cursor 7034 from the boundary of window 7012 (as shown in FIGS. 7H and 7I) to the location in element E3 of window 7010 to which user 7002's gaze is directed (as shown in FIG. 7J) until detecting input 7046 following detection of the liftoff of the prior input (e.g., input 7040 of FIG. 7H or, in an alternate transition, input 7044 of FIG. 7I). In some embodiments, prior to ceasing to detect the hand of the user (and in some circumstances before detecting the hand of the user again), the focus indicator continues to be displayed at the third location in the user interface. In some embodiments, in response to detecting the second continuation of the input, in accordance with a determination that the user interface object is the first type of user interface object, the computer system moves the focus indicator to the fourth location in the user interface that is selected based on the second movement of the gaze of the user (e.g., without requiring ceasing to detect the hand of the user and subsequently detecting the hand of the user again, or optionally without regard to whether the hand of the user is detected or not). Moving a focus indicator between different objects of the same dimensionality (e.g., two-dimensional objects) by requiring both that a user gaze at another object and a type of input that includes disengaging and then reengaging user's hand (e.g., liftoff of fingers that are in contact with the touch-sensitive surface and then reestablishing contact with the touch-sensitive surface) reduces accidental inputs and unwanted relocations of the focus indicator while reducing the number and complexity of inputs and/or amount of time needed to move the focus indicator between objects.

In some embodiments, while the focus indicator is displayed at a respective location in the user interface, the computer system detects a selection input via the one or more input devices (e.g., a touch input such as a press of a touch-sensitive surface, an air gesture such as an air tap or air pinch gesture, or other selection input) and, in response to detecting the selection input, performs a fourth operation (e.g., a selection operation) with respect to the respective location in the user interface. For example, as described herein with reference to FIG. 9F, in response to detecting press input 7104 while displaying the indication that landmark 7076 has focus, computer system 101 performs an activation operation with respect to landmark 7076. In another example, as described herein with reference to FIG. 9H, in response to detecting press input 7110 while displaying the indication that landmark 7080 has focus, computer system 101 performs an activation operation with respect to landmark 7080 (e.g., the same type of activation operation as that performed with respect to landmark 7076 in FIG. 9F). While a location in a user interface object has focus, performing a selection or activation operation with respect to the location that has focus, in response to a simple activation of an input device, reduces the number and complexity of inputs and/or amount of time needed to interact with user interface objects and enables such interaction without displaying additional controls.

In some embodiments, performing the fourth operation with respect to the respective location in the user interface includes displaying a two-dimensional user interface region corresponding to the respective location. In some embodiments, the two-dimensional user interface region includes application content associated with the respective location in the user interface. For example, as described herein with reference to FIG. 9F, in response to detecting press input 7104 while displaying the indication that landmark 7076 has focus, computer system 101 performs an activation operation with respect to landmark 7076 by displaying two-dimensional popup 7106 with additional information about landmark 7076. In another example, as described herein with reference to FIG. 9H, in response to detecting press input 7110 while displaying the indication that landmark 7080 has focus, computer system 101 performs an activation operation with respect to landmark 7080 by displaying two-dimensional popup 7112 with additional information about landmark 7080. While a location in a user interface object has focus, displaying a two-dimensional user interface region corresponding to the location in the user interface object, optionally by displaying additional information or context about the location, in response to a simple activation of an input device reduces the number and complexity of inputs and/or amount of time needed to interact with user interface objects.

In some circumstances, the computer system detects an input corresponding to a request to move the focus indicator to a fifth location in the user interface (e.g., the fifth location being selected based on movement of the gaze of the user, such as when moving the focus selector with respect to a user interface object that is the first type of user interface object, or selected based on movement of the hand of the user, such as when moving the focus selector with respect to a user interface object that is the second type of user interface object). In some embodiments, in response to detecting the input corresponding to the request to move the focus indicator to the fifth location in the user interface: in accordance with a determination that the fifth location in the user interface is capable of displaying a focus indicator, the computer system moves the focus indicator to the fifth location in the user interface; and, in accordance with a determination that the fifth location in the user interface is not capable of displaying a focus indicator, the computer system forgoes moving the focus indicator to the fifth location in the user interface (e.g., maintaining the focus indicator at its current position). For example, as described herein with reference to FIG. 9C, computer system 101 does not switch from displaying the indication that landmark 7072 has focus (e.g., as described with reference to FIG. 9B) in response to detecting the movement of user 7002's gaze from landmark 7072 to the location indicated in FIG. 9C by dashed line 7092 while input 7068 continues to be detected, because the location indicated by dashed line 7092 is not a valid focus location. In contrast, as described herein with reference to FIG. 9E, computer system 101 switches from displaying the indication that landmark 7072 has focus (e.g., as described with reference to FIGS. 9B) to displaying the indication that landmark 7076 has focus in response to detecting the movement of user 7002's gaze from landmark 7072 to landmark 7076 while input 7068 continues to be detected, because landmark 7076 is a valid focus location. For example, moving the focus indicator to the second location in the user interface that is selected based on the movement of the gaze of the user, as described herein with reference to operation 1310 of method 1300, is performed in accordance with a determination that the second location in the user interface is capable of displaying a focus indicator (e.g., and in accordance with a determination that the hand of the user is detected (e.g., engaged in interaction)). Maintaining a focus indicator hidden or at a current location when user's gaze is directed to a location that is interpreted by the computer system as invalid (e.g., outside the bounds of the mixed reality three-dimensional environment), makes user-device interaction in the environment more efficient by reducing accidental inputs and unwanted relocations of the focus indicator.

In some embodiments, aspects/operations of methods 1100, 1200, and 1400 may be interchanged, substituted, and/or added between these methods. For example, the focus indicators (or other indications of focus) displayed during interactions with some types of objects (e.g., two-dimensional objects) described in method 1300 optionally also exhibit the gaze-assisted display and movement behavior of method 1100 and/or move across gaps between user interface regions as described in method 1200. For brevity, these details are not repeated here.

FIG. 14 is a flow diagram of an exemplary method 1400 for gaze-assisted dragging and dropping of content across different regions in an environment, in accordance with some embodiments. In some embodiments, method 1400 is performed at a computer system (e.g., computer system 101 in FIG. 1) that is in communication with a display generation component (e.g., display generation component 120 in FIGS. 1A, 3, and 4) (e.g., a hardware element, comprising one or more display devices, such as a display, a touchscreen, a projector, a heads-up display, a head-mounted display, or the like) and one or more input devices (e.g., one or more cameras (e.g., color sensors, infrared sensors, structured light scanners, and/or other depth-sensing cameras) that point downward at a user's hand, forward from the user's head, and/or that faces the user; eye-tracking devices; user-held and/or user-worn controllers; touch-sensitive surfaces, and/or other input hardware). In some embodiments, the method 1400 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1400 are, optionally, combined and/or the order of some operations is, optionally, changed.

As described herein, method 1400 provides an improved input mechanism for performing a drag-and-drop operation in a complex mixed reality three-dimensional environment that includes a variety of objects and multiple application user interfaces (or other regions) that are spatially separated. In particular, a selected object that is dragged within a first region (e.g., a first application user interface) is automatically relocated (e.g., without the need for additional movement input) to a second region (e.g., a second application user interface) when a respective movement input satisfies one or more movement criteria (e.g., distance, speed, velocity, acceleration, and other criteria) and user's gaze is directed towards a location within the second region. Using a gaze input and one or more movement criteria as conditions to automatically relocate a selected object from a first region to a second region without the need to provide additional movement input, reduces the amount of movement and/or the amount of time needed to move a selected object across different regions (e.g., dragging an object from a first application user interface and dropping the object to a different region in the mixed reality three-dimensional environment). Optionally, the selected object is moved through the space between the two regions with increased speed relative to the speed when only moved within the boundaries of the first region, thereby providing ongoing and improved visual feedback to a user of location of the selected object and the accelerated nature of the relocation. Optionally, the selected object is automatically relocated (or "teleported") without displaying the selected object in or moving through the space in between the first and the second regions, thereby reducing the amount of movement and/or the amount of time needed to move selected object and providing ongoing visual feedback of the accelerated nature of the relocation.

While a view of an environment is visible via the display generation component (e.g., the environment being a two-dimensional or three-dimensional environment that includes one or more computer-generated portions and optionally one or more passthrough portions), the computer system detects (1402), via the one or more input devices, a first input corresponding to a request to initiate a drag operation with respect to content of an application. The content is displayed in a first region of the environment. For example, as described herein with reference to FIGS. 10A-10B, in response to detecting input 7120 (e.g., a long press input), computer system 101 initiates a drag operation with respect to content E2 of window 7010.

In response to detecting the first input, the computer system initiates (1404) the drag operation. In accordance with a determination that the first input is detected while first content of the application is selected, the drag operation is (1406) initiated with respect to the first content; and, in accordance with a determination that the first input is detected while second content of the application is selected, the drag operation is (1408) initiated with respect to the second content. For example, the drag operation of FIG. 10B is initiated with respect to content E2 because content E2 had focus when the drag operation was initiated (e.g., in response to input 7120 being detected or meeting criteria for initiating a drag operation). In another example, if other content had focus when the drag operation was initiated, the drag operation would be initiated with respect to the other content.

While continuing to detect the first input, the computer system detects (1410), via the one or more input devices, movement of a gaze input to a respective location in a second region of the environment, different from the first region (e.g., movement of user 7002's gaze to a location in window 7012 (FIGS. 10D and 10E)), and detects movement of the first input (e.g., movement of input 7120 along trackpad 7102 (FIGS. 10D and 10E)). In some embodiments, movement of the first input includes movement of an input manipulator relative to an input device (e.g., movement of a contact on a touch-sensitive surface such as trackpad 7102 (FIGS. 10A-10E), movement of a hand or other body part performing an air gesture detected by one or more optical sensors, or other input movement that does not require movement of the input device itself). In some embodiments, movement of the first input includes movement of an input device (e.g., movement of a mouse, rotation of a wheel, or other electro-mechanical actuation, or movement of one or more cameras) optionally while another type of input is detected (e.g., while a contact is maintained on a touch-sensitive surface or while a button or key is pressed).

In response to detecting the movement of the first input (1412): in accordance with a determination that the movement of the first input meets a first set of one or more criteria, wherein the first set of one or more criteria include a requirement that the movement of the first input is in a direction that is within a directional threshold of the direction of the respective location in the second region of the environment in order for the first set of one or more criteria to be met, the computer system moves (1414) (e.g., a representation of) the content from the first region of the environment to the second region of the environment (e.g., moving the content, or representation thereof, to or near the respective location in the second region of the environment to which the gaze input has been moved). For example, as described herein with reference to FIGS. 10E, in response to detecting the movement of input 7120, and in accordance with a determination that the movement of input 7120 meets the respective criteria for jumping preview 7122 to user 7002's gaze location (e.g., in that input 7120 moves by at least the threshold distance $D_{drag}$ and corresponds to a request to move preview 7122 within a directional threshold to a different user interface region), computer system 101 jumps preview 7122 from location 7124 over window 7010 to location 7132 over window 7012.

In response to detecting the movement of the first input (1412): in accordance with a determination that the movement of the first input does not meet the first set of one or more criteria, the computer system moves (1416) (e.g., a representation of) the content within the first region of the environment (e.g., without moving the content to the second region of the environment to which the gaze input has been moved). For example, as described herein with reference to FIGS. 10C and 10D, in response to detecting the movement of input 7120, and in accordance with a determination that the movement of input 7120 does not meet the respective criteria for jumping preview 7122 to user 7002's gaze location (e.g., because user 7002 is not gazing at a different user interface region from that over which preview 7122 is currently displayed, as described herein with reference to FIG. 10C, or because the movement of input 7120 corresponds to a request to move preview 7122 outside of a directional threshold, as described herein with reference to FIG. 10D, or any other combination of one or more criteria that fail to be met), computer system 101 moves preview 7122 by an amount corresponding to the amount of movement of input 7120 (e.g., to location 7126 (FIG. 10C) or location 7128 (FIG. 10D), and optionally gradually moving preview 7122 through a plurality of intermediate locations) rather than jumping preview 7122 to a location over window 7012.

In some embodiments, the first set of one or more criteria include a requirement that the first input move by at least a threshold amount in order for the first set of one or more criteria to be met (e.g., threshold distance $D_{drag}$, as described herein with reference to FIGS. 10C-10E). Using a gaze input directed at the second region and a threshold amount of movement criteria as conditions to automatically relocate the selected object from the first region to the second region without the need to provide additional movement inputs, reduces the amount of movement and/or the amount of time needed to move a selected object across different regions (e.g., to drag an object from a first application user interface and/or drop the object to a different region, which is spatially separated).

In some embodiments, determining that the movement of the first input is in a direction that is within the directional threshold of the direction of the respective location in the second region of the environment includes determining that the movement of the first input corresponds to a request to move the content from a first location to a second location, that the second location is closer than the first location to the respective location of the gaze input (e.g., from a current location that is a first distance from the respective location of the gaze input to a second location that is a second, shorter distance from the respective location of the gaze input), and that a direction from the first location to the second location is within a threshold angular distance of a direction from the first location to the respective location of the gaze input. For example, as described herein with reference to FIGS. 10C-10E, the respective criteria for jumping preview 7122 to the location to which user 7002's gaze is directed require that preview 7122 be moved towards (e.g., closer to) user 7002's gaze location within a directional threshold, indicated by dashed lines 7130, of user 7002's gaze location. In addition to requiring that the movement input starts at a location of the focus indicator and is directed to a location of a gaze input, requiring that the movement input moves within a threshold angular distance of a direction from the starting position to the position of the gaze in the second region, reduces the amount of movement and/or the amount of time needed to move the object in three-dimensional environment (e.g., by reducing the number of errors, accidental input, and/or unwanted relocations while at the same time allowing easy relocation of the object without the need for precision).

In some embodiments, initiating the drag operation with respect to respective content (e.g., the first content or the second content, depending on which content is selected when the first input is detected) includes displaying a representation of the respective content that is visually emphasized relative to the respective content (optionally by visually deemphasizing the respective content in response to selection of the respective content for the drag operation). For example, as described herein with reference to FIG. 10B, initiating the drag operation with respect to content E2 includes displaying preview 7122 as a representation of content E2 and visually deemphasizing content E2, such that preview 7122 is visually emphasized relative to the visually deemphasized content E2. In some embodiments, the content that is moved while detecting the movement of the first input is a representation of the original content with respect to which the drag operation is initiated, and the original content continues to be displayed in the first region of the environment until an end of the first input, at which point the original content continues to be displayed in the first region of the environment (e.g., if the drag operation copies the original content to the second region of the environment) or ceases to be displayed in the first region of the environment (e.g., if the drag operation moves the original content to the second region of the environment). When the object is selected to be dragged and/or while a separate representation of the object is dragged through the environment, the object itself is visually deemphasized (e.g., faded, dimmed, or otherwise made less prominent relative to the appearance of the object prior to selection). Visually deemphasizing the object when the object is selected and/or while a separate representation of the object is dragged provides ongoing visual feedback to the user that the computer system is responding to the user's input and about the type of operation that is being performed with respect to the object, thereby improving efficiency of the human-device interaction (e.g., by reducing errors and/or reducing the number of inputs needed to select and drag an object in the environment).

In some embodiments, initiating the drag operation with respect to respective content (e.g., the first content or the second content, depending on which content is selected when the first input is detected) includes displaying a representation of the respective content at a smaller size (e.g., scale) than the respective content (e.g., decreasing a size of the respective content in response to selection of the respective content for the drag operation). For example, as described herein with reference to FIG. 10B, initiating the drag operation with respect to content E2 includes displaying preview 7122 as a representation of content E2 that is smaller than content E2. Shrinking the object when the object is selected and/or while the object is dragged provides ongoing visual feedback to the user that the computer system is responding to the user's input and about the type of operation that is being performed with respect to the object, thereby improving efficiency of the human-device interaction (e.g., by reducing errors and/or reducing the number of inputs needed to select and drag an object in the environment).

In some embodiments, initiating the drag operation with respect to respective content (e.g., the first content or the second content, depending on which content is selected when the first input is detected) includes displaying a representation of the respective content centered at a location corresponding to the first input (e.g., a location at which a focus indicator corresponding to the first input is displayed or was displayed prior to displaying the representation of the respective content). For example, as described herein with reference to FIG. 10B, initiating the drag operation with respect to content E2 includes displaying preview 7122 centered at location 7124, the location of previously displayed cursor 7034. Automatically centering the object around the focus indicator even when the focus selector was not positioned at the center of the object when the object was selected, reduces the number of inputs and/or the amount of time needed to select and/or relocate the object (e.g., by making it easier to select the object without the need for precision).

In some embodiments, the drag operation is initiated in accordance with a determination that the first input is a long press input (e.g., a contact detected via a touch-sensitive surface that meets at least a nominal contact detection intensity threshold (and optionally a higher press input intensity threshold) and that is maintained on and continues to be detected via touch-sensitive surface for at least a threshold amount of time, optionally with less than a threshold amount of movement) (e.g., as described herein with reference to input 7120 and threshold amount of time $T_{drag}$ in FIG. 10B). In some embodiments, in response to detecting the first input, in accordance with a determination that the first input is not a long press input, the computer system forgoes initiating the drag operation (e.g., if input 7120 were not maintained with respect to content E2 for at least the threshold amount of time $T_{drag}$, the drag operation of FIGS. 10B-10E would not be initiated). Using a long press input to select the object that is to be dragged, improves the operation efficiency of the device by disambiguating user's intent to select an object or to perform another operation (e.g., placing a focus indicator), thereby reducing the number of inputs and/or amount of time needed to drag-and-drop objects in the environment.

In some embodiments, moving the content from the first region of the environment to the second region of the environment (e.g., in accordance with the determination that the movement of the first input meets the first set of one or more criteria) includes displaying a representation of the content at least partially over the second region of the environment (e.g., as described herein with reference to preview 7122 displayed over window 7012 in FIGS. 10E) and displaying an indication that the representation of the content is from a region of the environment other than the second region (e.g., as described herein with reference to badge 7134 in FIG. 10E). In some embodiments, in response to detecting an end of the first input, if the first input met the first set of one or more criteria, the content is copied to the second region of the environment (e.g., and thus continues to be displayed in the first region of the environment as well as being displayed in the second region of the environment) or moved to the second region of the environment (e.g., and thus ceases to be displayed in the first region of the environment). While the selected object is being relocated and when it is moved through a respective boundary (and optionally remains within respective boundaries) of the second region, a visual indicator (e.g., a badge with a plus sign) is displayed. The visual indicator provides visual feedback that an operational context has changed and/or provides ongoing visual feedback (at least while the object is moved within the boundaries of the second region and prior a drop operation is detected) to indicate that the object can be added to content in the second region (e.g., that the object can be dropped in the second region).

In some embodiments, in response to detecting the movement of the first input: in accordance with a determination that the movement of the first input meets the first set of one or more criteria, the computer system moves the content to a third location in the second region that corresponds to the respective location of the gaze input in the second region (e.g., as part of moving the content from the first region of the environment to the second region of the environment). For example, as described herein with reference to FIGS. 10E, because the movement of input 7120 in FIG. 10E meets the respective criteria for jumping preview 7122 to user 7002's gaze location in window 7012, preview 7122 is moved to location 7132 in window 7012 corresponding to user 7002's gaze location. In some embodiments, in circumstances in which the respective location of the gaze input in the second region is a first gaze location in the second region, the content is moved to a location in the second region that corresponds to the first gaze location (e.g., in response to detecting the movement of the first input and in accordance with the determination that the movement of the first input meets the first set of one or more criteria); whereas, in circumstances in which the respective location of the gaze input in the second region is a second gaze location in the second region, the content is moved to a location in the second region that corresponds to the second gaze location (e.g., in response to detecting the movement of the first input and in accordance with the determination that the movement of the first input meets the first set of one or more criteria). Using a gaze input directed at the second region and a threshold amount of movement criteria as conditions to automatically relocate the selected object from the first region to a location in the second region that is selected based on a location to which the user's gaze is directed without the need to provide additional movement inputs, reduces the amount of movement and/or the amount of time needed to move a selected object across different regions (e.g., to drag an object from a first application user interface and/or drop the object to a different region, which is spatially separated).

In some embodiments, the third location in the second region is offset from the respective location of the gaze input in the second region (e.g., as described herein with reference to location 7132 in FIG. 10E). In some embodiments, the content is moved to a location in the second region that is almost but not quite to the location to which the user's gaze is directed in the second region (e.g., the content is moved to a location in the second region that is offset from the user's gaze location in a direction opposite from a direction of movement of the content (e.g., such that momentum of the input would continue to move the content in the direction of movement of the content towards and closer to the user's gaze location)). In some embodiments, the amount of offset is based on a velocity of movement of the first input. In some embodiments, the amount of offset is a predefined offset regardless of the velocity of movement of the first input. When the selected object is relocated, the object is automatically moved to a location in the second region that is almost but not quite to the location to which the user's gaze is directed in the second region. Automatically relocating the selected object to a nearby location of the location to which the user's gaze is directed, allows the user to control relocation based on a gaze input without preventing visibility of what the user's gaze is focused on, thereby improving operational efficiency of the device and/or reducing visual clutter.

In some embodiments, the third location in the second region is the respective location of the gaze input in the second region (e.g., as described herein with reference to FIG. 10E). Using a gaze input directed at the second region and a threshold amount of movement criteria as conditions to automatically relocate the selected object from the first region to a location to which the user's gaze is directed in the second region without the need to provide additional movement inputs, reduces the amount of movement and/or the amount of time needed to move a selected object across different regions (e.g., to drag an object from a first application user interface and/or drop the object to a different region, which is spatially separated).

In some embodiments, in response to detecting the movement of the first input: in accordance with a determination that the movement of the first input is in a direction that is beyond the directional threshold of the direction of the respective location in the second region of the environment (e.g., even if the movement of the first input otherwise moves the content closer to the second region), the computer system moves the content within the first region of the environment (e.g., without moving the content to the second region of the environment to which the gaze input has been moved). For example, as described herein with reference to FIG. 10D, although the movement of input 7120 in FIG. 10D meets some of the respective criteria for jumping preview 7122 to user 7002's gaze location (e.g., user 7002 is gazing at window 7012 which is a different window from window 7010 where content E2 is located and/or where preview 7122 is currently displayed, and the movement of input 7120 meets the threshold distance $D_{drag}$), preview 7122 is not moved to user 7002's gaze location because the movement of input 7120 is not toward user 7002's gaze location within a directional threshold, despite being otherwise toward window 7012. In some embodiments, determining that the movement of the first input is in a direction that is beyond the directional threshold of the direction of the respective location (e.g., of the gaze input) in the second region of the environment establishes that the movement of the first input does not meet the first set of one or more criteria. To automatically relocate the selected object, it is additionally required that the movement input moves within a threshold angular distance of a direction from a starting position (e.g., a respective location of the focus indicator when the object was selected) to a position of the gaze in the second region. This additional condition makes the user-device more efficient by reducing the number of errors, accidental input, and/or unwanted relocations while at the same time allowing easy relocation of the object without the need for precision.

In some embodiments, moving the content from the first region of the environment to the second region of the environment moves the content by a first magnitude (e.g., distance); moving the content within the first region of the environment moves the content by a second magnitude (e.g., distance); and the first magnitude is greater than the second magnitude (e.g., moving preview 7122 from location 7124 over window 7010 to location 7132 over a different window 7012, as described herein with reference to FIG. 10E, moves preview 7122 by a greater distance than moving preview 7122 from location 7124 over window 1010 to location 7126 (as described herein with reference to FIG. 10C) or to location 7128 (as described herein with reference to FIG. 10D) over the same window 7010. Using a gaze input directed at the second region and one or more input movement criteria as conditions to automatically relocate the selected object from the first region to the second region without the need to provide additional movement inputs, reduces the amount of movement and/or the amount of time needed to move a selected object across different regions and is especially beneficial when the distance between the first region and second region is greater.

In some embodiments, the first region and the second region are different regions of a same window (e.g., of an application). For example, window 7010 could instead be called a "first user interface region 7010" and window 7012 could instead be called a "second user interface region 7012" so as to optionally be different user interface regions of a same window rather than separate windows, while still exhibiting all of the gaze-assisted dragging and dropping behavior described herein with respect to "window 7010" and "window 7012" in FIGS. 10A-10E as well as optionally the cursor placement behavior described with respect to "window 7010" and "window 7012" in FIGS. 7B-7K. In some embodiments, the first set of one or more criteria include a requirement that the first region and the second region be different regions of a same window in order for the first set of one or more criteria to be met. Using a gaze input and one or more movement criteria as conditions to automatically relocate a selected object from a first region to a second region of the same window without the need to provide additional movement input, reduces the amount of movement and/or the amount of time needed to move a selected object across spatially separated regions of the same window.

In some embodiments, the first region is a first window of a respective application, and the second region is a second window of the respective application (e.g., windows 7010 and 7012, described herein with reference to FIGS. 10A-10E as well as FIGS. 7B-7K, are optionally different windows of a same respective application). In some embodiments, the first set of one or more criteria include a requirement that the first region and the second region be different windows of a same application in order for the first set of one or more criteria to be met. In some embodiments, such as those in which the first region and the second region are different regions of the same window or different windows of the same application, the first region and the second region are separated by a gap (e.g., a third region), as described for example with reference to method 1300 herein. Using a gaze input and one or more movement criteria as conditions to automatically relocate a selected object from a first window to a second window of the same application without the need to provide additional movement input, reduces the amount of movement and/or the amount of time needed to move a selected object across different windows of the same application.

In some embodiments, the first region is a user interface of a first application, and the second region is a user interface of a second application that is different from the first application (e.g., windows 7010 and 7012, described herein with reference to FIGS. 10A-10E as well as FIGS. 7B-7K, are optionally windows of different applications). In some embodiments, the first set of one or more criteria include a requirement that the first region and the second region be windows of different applications in order for the first set of one or more criteria to be met. Using a gaze input and one or more movement criteria as conditions to automatically relocate a selected object from a first window of a first application to a second window of a second application without the need to provide additional movement input, reduces the amount of movement and/or the amount of time needed to move a selected object across different windows of different applications.

In some embodiments, the computer system detects, via the one or more input devices, a second input corresponding to a request to initiate a drag operation with respect to third content of the application, wherein the third content is displayed in the first region of the environment, and, in response to detecting the second input, initiates the drag operation with respect to the third content. In some circumstances, while continuing to detect the second input, the computer system detects, via the one or more input devices, movement of the gaze input to a fourth location in the environment, and detects movement of the second input that meets the first set of one or more criteria. In some embodiments, in response to detecting the movement of the second input that meets the first set of one or more criteria: in accordance with a determination that the fourth location of the gaze input in the environment is in the second region of the environment, the computer system moves the third content from the first region of the environment to a location in the second region of the environment that is based on the fourth location of the gaze input in the environment; and, in accordance with a determination that the fourth location of the gaze input in the environment is in the first region of the environment, the computer system moves the third content within the first region of the environment based on the movement of the second input and independently of the fourth location of the gaze input in the environment.

For example, as described herein with reference to FIG. 10C, although the movement of input 7120 in FIG. 10C meets some of the respective criteria for jumping preview 7122 to user 7002's gaze location (e.g., the movement of input 7120 in FIG. 10C is toward user 7002's gaze location within a directional threshold and meets the threshold distance $D_{drag}$), preview 7122 is not moved to user 7002's gaze location because user 7002's gaze location is in the same user interface region (e.g., window 7010) as preview 7122. In some embodiments, while the third content is being moved within the same first region of the environment that the user is looking at, the third content is moved within that first region based on movement of the input (e.g., smoothly) without being moved directly (e.g., jumped, discontinuously) directly to the user's gaze location, whereas, if the user looks at a different, second region while moving the third content, the third content is automatically moved directly (e.g., jumped) to the second region if the movement of the input meets sufficient criteria. Moving content more smoothly within the same region to which the user's gaze is directed gives the user finer control and reduces an amount of time needed to move content with precision in the environment, whereas jumping content to a different region to which the user's gaze has moved reduces an amount of time needed to move content across larger distances in the environment. Moreover, using a location of user's gaze within the second region as a condition for relocating the selected object (in conjunction with the one or more movement criteria) makes the user-device more efficient by helping to disambiguate user intent to move the selected object within boundaries of the region where the object is located or to relocate the object to a different region, thereby reducing the number of errors, accidental input, and/or unwanted relocations of the selected object.

In some embodiments, aspects/operations of methods 1100, 1200, and 1300 may be interchanged, substituted, and/or added between these methods. For example, the drag and drop operations of method 1400 are optionally examples of operations performed with respect to objects that have focus as described in methods 1100, 1200, and 1300. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
   at a computer system that is in communication with a display generation component and with one or more input devices that include a touch-sensitive surface:
   while a view of an environment is visible via the display generation component, detecting, via the one or more input devices, a gaze input directed to the environment;
   while detecting the gaze input, detecting, via the touch-sensitive surface, a first touch input; and
   in response to detecting the first touch input:
      in accordance with a determination that a first portion of the first touch input is detected while the gaze input is directed to a first region in the environment, displaying a focus indicator at a location corresponding to the first region in the environment; and
      in accordance with a determination that the first portion of the first touch input is detected while the gaze input is directed to a second region in the environment, displaying the focus indicator at a location corresponding to the second region in the environment;
   detecting a continuation of the first touch input that includes movement of the first touch input along the touch-sensitive surface while the first touch input is maintained on the touch-sensitive surface; and
   in response to detecting the movement of the first touch input along the touch-sensitive surface during the continuation of the first touch input, moving the focus indicator in accordance with a magnitude of the movement of the first touch input, including:
      in accordance with a determination that the magnitude of the movement of the first touch input during the continuation of the first touch input corresponds to a request to move the focus indicator within a user interface of a first application, moving the focus indicator within the user interface of the first application in accordance with the movement of the first touch input; and
      in accordance with a determination that the magnitude of the movement of the first touch input during the continuation of the first touch input corresponds to a request to move the focus indicator outside of a boundary of the user interface of the first application, moving the focus indicator within the user interface of the first application in accordance with the movement of the first touch input without moving the focus indicator outside of the boundary of the user interface for the first application.

2. The method of claim 1, including:
detecting liftoff of the first touch input; and
in response to detecting the liftoff of the first touch input, ceasing to display the focus indicator.

3. The method of claim 1, including:
detecting liftoff of the first touch input; and
in response to detecting the liftoff of the first touch input:
  in accordance with a determination that a threshold amount of time has elapsed since detecting the liftoff of the first touch input, ceasing to display the focus indicator; and
  in accordance with a determination that the threshold amount of time has not elapsed since detecting the liftoff of the first touch input, maintaining display of the focus indicator.

4. The method of claim 1, including, while displaying the focus indicator:
detecting initiation of an air gesture; and
in response to detecting the initiation of the air gesture, ceasing to display the focus indicator.

5. The method of claim 1, wherein:
the movement of the first touch input during the continuation of the first touch input includes movement in a first direction;
the method includes, during the movement of the first touch input in the first direction, detecting movement of the gaze input in a second direction that is different from the first direction; and
the movement of the focus indicator in accordance with the magnitude of the movement of the first touch input is in the first direction.

6. The method of claim 1, including:
detecting movement of the gaze input to a location within a user interface of a second application that is different from the first application;
detecting liftoff of the first touch input; and
while the gaze input is directed to the location within the user interface of the second application, detecting, via the touch-sensitive surface, a second touch input; and
in response to detecting the second touch input, displaying the focus indicator at the location outside of the boundary of the user interface of the first application.

7. The method of claim 1, including:
while the focus indicator is displayed at a location within a user interface of a third application, detecting liftoff of the first touch input;
detecting, via the touch-sensitive surface, a third touch input;
detecting movement of the gaze input; and
in response to detecting the third touch input:
  in accordance with a determination that the third touch input is detected while the focus indicator remains displayed and while the gaze input is directed to the user interface of a fourth application that is different from the third application:
    ceasing to display the focus indicator at the location within the user interface of the third application; and
    displaying the focus indicator at a location within the user interface of the fourth application; and
  in accordance with a determination that the third touch input is detected while the focus indicator remains displayed and while the gaze input is directed to the user interface of the third application, maintaining the focus indicator at the location within the user interface of the third application.

8. The method of claim 7, including:
in response to detecting the third touch input:
  in accordance with a determination that the third touch input is detected while the focus indicator is not displayed:
    displaying the focus indicator at a location corresponding to a respective location to which the gaze input is directed when the third touch input is detected.

9. The method of claim 1, including:
while displaying the focus indicator within the user interface of the first application, and while detecting the gaze input directed to a location within a user interface of a fifth application that is different from the first application, detecting, via the touch-sensitive surface, a respective touch input that includes movement of the respective touch input along the touch-sensitive surface; and
in response to detecting the respective touch input:
  in accordance with a determination that the respective touch input is a continuation of the first touch input without detecting liftoff of the first touch input, continuing to display the focus indicator within the user interface of the first application, including moving the focus indicator within the user interface of the first application in accordance with the movement of the respective touch input; and
  in accordance with a determination that the respective touch input is detected after detecting liftoff of the first touch input, displaying the focus indicator at the location within the user interface of the fifth application to which the gaze input is directed.

10. The method of claim 1, including:
while the focus indicator corresponds to a user interface element within the user interface of the first application, detecting a press of the touch-sensitive surface; and
in response to detecting the press of the touch-sensitive surface, performing a selection operation with respect to the user interface element.

11. The method of claim 1, including:
detecting movement of the gaze input to a respective location in the environment;
detecting liftoff of the first touch input;
while the gaze input is directed to the respective location in the environment, detecting, via the touch-sensitive surface, a fourth touch input; and
in response to detecting the fourth touch input, in accordance with a determination that the respective location in the environment is capable of displaying a focus indicator, displaying the focus indicator at the respective location in the environment.

12. The method of claim 11, including, in response to detecting the fourth touch input, in accordance with a determination that the respective location in the environment is not capable of displaying a focus indicator, forgoing displaying the focus indicator at the respective location in the environment.

13. The method of claim 1, including:
detecting, via the touch-sensitive surface, a fifth touch input; and
in response to detecting the fifth touch input:

in accordance with a determination that the fifth touch input includes a chorded gesture detected while the gaze input is directed to a third region in the environment, providing information about the fifth touch input to the third region; and in accordance with a determination that the fifth touch input includes the chorded gesture detected while the gaze input is directed to a fourth region in the environment, providing information about the fifth touch input to the fourth region.

14. The method of claim 13, including, in response to detecting the fifth touch input, in accordance with a determination that the fifth touch input does not include a chorded gesture, displaying and moving the focus indicator at least partially in accordance with movement of the fifth touch input.

15. The method of claim 13, including, in response to detecting the fifth touch input, in accordance with a determination that the fifth touch input includes the chorded gesture, forgoing displaying the focus indicator.

16. The method of claim 15, including, while forgoing displaying the focus indicator in response to detecting the fifth touch input:
  detecting a sixth touch input; and
  in response to detecting the sixth touch input:
    in accordance with a determination that the sixth touch input is detected while the gaze input is directed to a location within the user interface of a sixth application, displaying the focus indicator at the location within the user interface of the sixth application; and
    in accordance with a determination that the sixth touch input is detected while the gaze input is directed to a location within the user interface of a seventh application, displaying the focus indicator at the location within the user interface of the seventh application.

17. The method of claim 13, wherein the fifth touch input includes a chorded gesture associated with performing a zoom operation.

18. The method of claim 13, wherein the fifth touch input includes a chorded gesture associated with performing a scrolling operation.

19. A non-transitory computer-readable storage medium storing one or more programs configured to be executed by one or more processors of a computer system that is in communication with a display generation component and with one or more input devices that include a touch-sensitive surface, the one or more programs including instructions for:
  while a view of an environment is visible via the display generation component, detecting, via the one or more input devices, a gaze input directed to the environment;
  while detecting the gaze input, detecting, via the touch-sensitive surface, a first touch input; and
  in response to detecting the first touch input:
    in accordance with a determination that a first portion of the first touch input is detected while the gaze input is directed to a first region in the environment, displaying a focus indicator at a location corresponding to the first region in the environment; and
    in accordance with a determination that the first portion of the first touch input is detected while the gaze input is directed to a second region in the environment, displaying the focus indicator at a location corresponding to the second region in the environment;
  detecting a continuation of the first touch input that includes movement of the first touch input along the touch-sensitive surface while the first touch input is maintained on the touch-sensitive surface; and
  in response to detecting the movement of the first touch input along the touch-sensitive surface during the continuation of the first touch input, moving the focus indicator in accordance with a magnitude of the movement of the first touch input, including:
    in accordance with a determination that the magnitude of the movement of the first touch input during the continuation of the first touch input corresponds to a request to move the focus indicator within a user interface of a first application, moving the focus indicator within the user interface of the first application in accordance with the movement of the first touch input; and
    in accordance with a determination that the magnitude of the movement of the first touch input during the continuation of the first touch input corresponds to a request to move the focus indicator outside of a boundary of the user interface of the first application, moving the focus indicator within the user interface of the first application in accordance with the movement of the first touch input without moving the focus indicator outside of the boundary of the user interface for the first application.

20. A computer system that is in communication with a display generation component and with one or more input devices that include a touch-sensitive surface, the computer system comprising:
  one or more processors; and
  memory storing one or more programs configured to be executed by the one or more processors, the one or more programs including instructions for:
    while a view of an environment is visible via the display generation component, detecting, via the one or more input devices, a gaze input directed to the environment;
    while detecting the gaze input, detecting, via the touch-sensitive surface, a first touch input; and
    in response to detecting the first touch input:
      in accordance with a determination that a first portion of the first touch input is detected while the gaze input is directed to a first region in the environment, displaying a focus indicator at a location corresponding to the first region in the environment; and
      in accordance with a determination that the first portion of the first touch input is detected while the gaze input is directed to a second region in the environment, displaying the focus indicator at a location corresponding to the second region in the environment;
    detecting a continuation of the first touch input that includes movement of the first touch input along the touch-sensitive surface while the first touch input is maintained on the touch-sensitive surface; and
    in response to detecting the movement of the first touch input along the touch-sensitive surface during the continuation of the first touch input, moving the focus indicator in accordance with a magnitude of the movement of the first touch input, including:
      in accordance with a determination that the magnitude of the movement of the first touch input during the continuation of the first touch input corresponds to a request to move the focus indicator within a user interface of a first application, moving the focus indicator within the user interface of the first application in accordance with the movement of the first touch input; and in accordance with a determination that the magnitude of the movement of the first touch input during the continuation of the first touch input corresponds to a request to move the focus indicator outside of a boundary of the user interface of the first application, moving the focus indicator within the user interface of the first application in accordance with the movement of the first touch input without moving the focus indicator outside of the boundary of the user interface for the first application.

21. The computer system of claim 20, wherein the one or more programs include instructions for:
   detecting liftoff of the first touch input; and
   in response to detecting the liftoff of the first touch input, ceasing to display the focus indicator.

22. The computer system of claim 20, wherein the one or more programs include instructions for:
   detecting liftoff of the first touch input; and
   in response to detecting the liftoff of the first touch input:
      in accordance with a determination that a threshold amount of time has elapsed since detecting the liftoff of the first touch input, ceasing to display the focus indicator; and
      in accordance with a determination that the threshold amount of time has not elapsed since detecting the liftoff of the first touch input, maintaining display of the focus indicator.

23. The computer system of claim 20, wherein the one or more programs include instructions for, while displaying the focus indicator:
   detecting initiation of an air gesture; and
   in response to detecting the initiation of the air gesture, ceasing to display the focus indicator.

24. The computer system of claim 20, wherein:
   the movement of the first touch input during the continuation of the first touch input includes movement in a first direction;
   the one or more programs include instructions for, during the movement of the first touch input in the first direction, detecting movement of the gaze input in a second direction that is different from the first direction; and
   the movement of the focus indicator in accordance with the magnitude of the movement of the first touch input is in the first direction.

25. The computer system of claim 20, wherein the one or more programs include instructions for:
   detecting movement of the gaze input to a location within a user interface of a second application that is different from the first application;
   detecting liftoff of the first touch input; and
   while the gaze input is directed to the location within the user interface of the second application, detecting, via the touch-sensitive surface, a second touch input; and
   in response to detecting the second touch input, displaying the focus indicator at the location outside of the boundary of the user interface of the first application.

26. The computer system of claim 20, wherein the one or more programs include instructions for:
   while the focus indicator is displayed at a location within a user interface of a third application, detecting liftoff of the first touch input;
   detecting, via the touch-sensitive surface, a third touch input;

detecting movement of the gaze input; and
in response to detecting the third touch input:
   in accordance with a determination that the third touch input is detected while the focus indicator remains displayed and while the gaze input is directed to the user interface of a fourth application that is different from the third application:
      ceasing to display the focus indicator at the location within the user interface of the third application; and
      displaying the focus indicator at a location within the user interface of the fourth application; and
   in accordance with a determination that the third touch input is detected while the focus indicator remains displayed and while the gaze input is directed to the user interface of the third application, maintaining the focus indicator at the location within the user interface of the third application.

27. The computer system of claim 26, wherein the one or more programs include instructions for:
   in response to detecting the third touch input:
      in accordance with a determination that the third touch input is detected while the focus indicator is not displayed:
         displaying the focus indicator at a location corresponding to a respective location to which the gaze input is directed when the third touch input is detected.

28. The computer system of claim 20, wherein the one or more programs include instructions for:
   while displaying the focus indicator within the user interface of the first application, and while detecting the gaze input directed to a location within a user interface of a fifth application that is different from the first application, detecting, via the touch-sensitive surface, a respective touch input that includes movement of the respective touch input along the touch-sensitive surface; and
   in response to detecting the respective touch input:
      in accordance with a determination that the respective touch input is a continuation of the first touch input without detecting liftoff of the first touch input, continuing to display the focus indicator within the user interface of the first application, including moving the focus indicator within the user interface of the first application in accordance with the movement of the respective touch input; and
      in accordance with a determination that the respective touch input is detected after detecting liftoff of the first touch input, displaying the focus indicator at the location within the user interface of the fifth application to which the gaze input is directed.

29. The computer system of claim 20, wherein the one or more programs include instructions for:
   while the focus indicator corresponds to a user interface element within the user interface of the first application, detecting a press of the touch-sensitive surface; and
   in response to detecting the press of the touch-sensitive surface, performing a selection operation with respect to the user interface element.

30. The computer system of claim 20, wherein the one or more programs include instructions for:
   detecting movement of the gaze input to a respective location in the environment;
   detecting liftoff of the first touch input;

while the gaze input is directed to the respective location in the environment, detecting, via the touch-sensitive surface, a fourth touch input; and in response to detecting the fourth touch input, in accordance with a determination that the respective location in the environment is capable of displaying a focus indicator, displaying the focus indicator at the respective location in the environment.

31. The computer system of claim 30, wherein the one or more programs include instructions for, in response to detecting the fourth touch input, in accordance with a determination that the respective location in the environment is not capable of displaying a focus indicator, forgoing displaying the focus indicator at the respective location in the environment.

32. The computer system of claim 20, wherein the one or more programs include instructions for:

detecting, via the touch-sensitive surface, a fifth touch input; and in response to detecting the fifth touch input:
in accordance with a determination that the fifth touch input includes a chorded gesture detected while the gaze input is directed to a third region in the environment, providing information about the fifth touch input to the third region; and
in accordance with a determination that the fifth touch input includes the chorded gesture detected while the gaze input is directed to a fourth region in the environment, providing information about the fifth touch input to the fourth region.

33. The computer system of claim 32, wherein the one or more programs include instructions for, in response to detecting the fifth touch input, in accordance with a determination that the fifth touch input does not include a chorded gesture, displaying and moving the focus indicator at least partially in accordance with movement of the fifth touch input.

34. The computer system of claim 32, wherein the one or more programs include instructions for, in response to detecting the fifth touch input, in accordance with a determination that the fifth touch input includes the chorded gesture, forgoing displaying the focus indicator.

35. The computer system of claim 34, wherein the one or more programs include instructions for, while forgoing displaying the focus indicator in response to detecting the fifth touch input:

detecting a sixth touch input; and
in response to detecting the sixth touch input:
in accordance with a determination that the sixth touch input is detected while the gaze input is directed to a location within the user interface of a sixth application, displaying the focus indicator at the location within the user interface of the sixth application; and
in accordance with a determination that the sixth touch input is detected while the gaze input is directed to a location within the user interface of a seventh application, displaying the focus indicator at the location within the user interface of the seventh application.

36. The computer system of claim 32, wherein the fifth touch input includes a chorded gesture associated with performing a zoom operation.

37. The computer system of claim 32, wherein the fifth touch input includes a chorded gesture associated with performing a scrolling operation.

38. The non-transitory computer-readable storage medium of claim 19, wherein the one or more programs include instructions for:

detecting liftoff of the first touch input; and
in response to detecting the liftoff of the first touch input, ceasing to display the focus indicator.

39. The non-transitory computer-readable storage medium of claim 19, wherein the one or more programs include instructions for:

detecting liftoff of the first touch input; and
in response to detecting the liftoff of the first touch input:
in accordance with a determination that a threshold amount of time has elapsed since detecting the liftoff of the first touch input, ceasing to display the focus indicator; and
in accordance with a determination that the threshold amount of time has not elapsed since detecting the liftoff of the first touch input, maintaining display of the focus indicator.

40. The non-transitory computer-readable storage medium of claim 19, wherein the one or more programs include instructions for, while displaying the focus indicator:

detecting initiation of an air gesture; and
in response to detecting the initiation of the air gesture, ceasing to display the focus indicator.

41. The non-transitory computer-readable storage medium of claim 19, wherein:

the movement of the first touch input during the continuation of the first touch input includes movement in a first direction;
the one or more programs include instructions for, during the movement of the first touch input in the first direction, detecting movement of the gaze input in a second direction that is different from the first direction; and
the movement of the focus indicator in accordance with the magnitude of the movement of the first touch input is in the first direction.

42. The non-transitory computer-readable storage medium of claim 19, wherein the one or more programs include instructions for:

detecting movement of the gaze input to a location within a user interface of a second application that is different from the first application;
detecting liftoff of the first touch input; and
while the gaze input is directed to the location within the user interface of the second application, detecting, via the touch-sensitive surface, a second touch input; and
in response to detecting the second touch input, displaying the focus indicator at the location outside of the boundary of the user interface of the first application.

43. The non-transitory computer-readable storage medium of claim 19, wherein the one or more programs include instructions for:

while the focus indicator is displayed at a location within a user interface of a third application, detecting liftoff of the first touch input;
detecting, via the touch-sensitive surface, a third touch input;
detecting movement of the gaze input; and
in response to detecting the third touch input:
in accordance with a determination that the third touch input is detected while the focus indicator remains displayed and while the gaze input is directed to the user interface of a fourth application that is different from the third application:

ceasing to display the focus indicator at the location within the user interface of the third application; and displaying the focus indicator at a location within the user interface of the fourth application; and in accordance with a determination that the third touch input is detected while the focus indicator remains displayed and while the gaze input is directed to the user interface of the third application, maintaining the focus indicator at the location within the user interface of the third application.

44. The non-transitory computer-readable storage medium of claim 43, wherein the one or more programs include instructions for:

in response to detecting the third touch input:
in accordance with a determination that the third touch input is detected while the focus indicator is not displayed:
displaying the focus indicator at a location corresponding to a respective location to which the gaze input is directed when the third touch input is detected.

45. The non-transitory computer-readable storage medium of claim 19, wherein the one or more programs include instructions for:

while displaying the focus indicator within the user interface of the first application, and while detecting the gaze input directed to a location within a user interface of a fifth application that is different from the first application, detecting, via the touch-sensitive surface, a respective touch input that includes movement of the respective touch input along the touch-sensitive surface; and in response to detecting the respective touch input:
in accordance with a determination that the respective touch input is a continuation of the first touch input without detecting liftoff of the first touch input, continuing to display the focus indicator within the user interface of the first application, including moving the focus indicator within the user interface of the first application in accordance with the movement of the respective touch input; and in accordance with a determination that the respective touch input is detected after detecting liftoff of the first touch input, displaying the focus indicator at the location within the user interface of the fifth application to which the gaze input is directed.

46. The non-transitory computer-readable storage medium of claim 19, wherein the one or more programs include instructions for:

while the focus indicator corresponds to a user interface element within the user interface of the first application, detecting a press of the touch-sensitive surface; and in response to detecting the press of the touch-sensitive surface, performing a selection operation with respect to the user interface element.

47. The non-transitory computer-readable storage medium of claim 19, wherein the one or more programs include instructions for:

detecting movement of the gaze input to a respective location in the environment;
detecting liftoff of the first touch input;
while the gaze input is directed to the respective location in the environment, detecting, via the touch-sensitive surface, a fourth touch input; and in response to detecting the fourth touch input, in accordance with a determination that the respective location in the environment is capable of displaying a focus indicator, displaying the focus indicator at the respective location in the environment.

48. The non-transitory computer-readable storage medium of claim 47, wherein the one or more programs include instructions for, in response to detecting the fourth touch input, in accordance with a determination that the respective location in the environment is not capable of displaying a focus indicator, forgoing displaying the focus indicator at the respective location in the environment.

49. The non-transitory computer-readable storage medium of claim 19, wherein the one or more programs include instructions for:

detecting, via the touch-sensitive surface, a fifth touch input; and in response to detecting the fifth touch input:
in accordance with a determination that the fifth touch input includes a chorded gesture detected while the gaze input is directed to a third region in the environment, providing information about the fifth touch input to the third region; and
in accordance with a determination that the fifth touch input includes the chorded gesture detected while the gaze input is directed to a fourth region in the environment, providing information about the fifth touch input to the fourth region.

50. The non-transitory computer-readable storage medium of claim 49, wherein the one or more programs include instructions for, in response to detecting the fifth touch input, in accordance with a determination that the fifth touch input does not include a chorded gesture, displaying and moving the focus indicator at least partially in accordance with movement of the fifth touch input.

51. The non-transitory computer-readable storage medium of claim 49, wherein the one or more programs include instructions for, in response to detecting the fifth touch input, in accordance with a determination that the fifth touch input includes the chorded gesture, forgoing displaying the focus indicator.

52. The non-transitory computer-readable storage medium of claim 51, wherein the one or more programs include instructions for, while forgoing displaying the focus indicator in response to detecting the fifth touch input:

detecting a sixth touch input; and
in response to detecting the sixth touch input:
in accordance with a determination that the sixth touch input is detected while the gaze input is directed to a location within the user interface of a sixth application, displaying the focus indicator at the location within the user interface of the sixth application; and
in accordance with a determination that the sixth touch input is detected while the gaze input is directed to a location within the user interface of a seventh application, displaying the focus indicator at the location within the user interface of the seventh application.

53. The non-transitory computer-readable storage medium of claim 49, wherein the fifth touch input includes a chorded gesture associated with performing a zoom operation.

54. The non-transitory computer-readable storage medium of claim 49, wherein the fifth touch input includes a chorded gesture associated with performing a scrolling operation.

* * * * *